(12) United States Patent
Itou et al.

(10) Patent No.: US 12,280,665 B2
(45) Date of Patent: Apr. 22, 2025

(54) PRESENTATION CONTROL DEVICE AND NON-TRANSITORY COMPUTER READABLE STORAGE MEDIUM

(71) Applicant: DENSO CORPORATION, Kariya (JP)

(72) Inventors: Yukari Itou, Kariya (JP); Takuya Kume, Kariya (JP); Kazuki Kojima, Kariya (JP); Shiori Maneyama, Kariya (JP)

(73) Assignee: DENSO CORPORATION, Kariya (JP)

(*) Notice: Subject to any disclaimer, the term of this patent is extended or adjusted under 35 U.S.C. 154(b) by 325 days.

(21) Appl. No.: 17/946,593

(22) Filed: Sep. 16, 2022

(65) Prior Publication Data
US 2023/0018303 A1   Jan. 19, 2023

Related U.S. Application Data

(63) Continuation of application No. PCT/JP2021/011734, filed on Mar. 22, 2021.

(30) Foreign Application Priority Data

Apr. 1, 2020  (JP) .................................. 2020-066153
Feb. 24, 2021  (JP) .................................. 2021-027773

(51) Int. Cl.
*B60K 35/00*   (2024.01)
*B60W 30/095*   (2012.01)
(Continued)

(52) U.S. Cl.
CPC ......... *B60K 35/00* (2013.01); *B60W 30/0956* (2013.01); *B60W 40/04* (2013.01);
(Continued)

(58) Field of Classification Search
CPC ........ B60K 35/00; B60K 35/28; B60K 35/29; B60K 35/81; B60K 2360/178;
(Continued)

(56) References Cited

U.S. PATENT DOCUMENTS

2018/0046185 A1   2/2018 Sato et al.
2019/0039618 A1   2/2019 Mori
(Continued)

FOREIGN PATENT DOCUMENTS

JP   2005324661 A   11/2005
JP   2017107502 A   6/2017
(Continued)

OTHER PUBLICATIONS

U.S. Appl. No. 19/017,874, filed Jan. 13, 2025, ITOU et al.

*Primary Examiner* — Richard M Camby
(74) *Attorney, Agent, or Firm* — Harness, Dickey & Pierce, P.L.C.

(57) ABSTRACT

A traffic congestion determination unit is configured to determine whether a traffic congestion occurs in an automatic travel period in which the vehicle travels by an automatic driving function. A cut-in prediction unit is configured to detect a sign of cut-in of an adjacent vehicle, which is adjacent to a subject vehicle as the vehicle, on determination by the traffic congestion determination unit that a traffic congestion occurs. A provision restricting unit is configured to restrict display of content provided in the automatic travel period on detection of a sign of cut-in of the adjacent vehicle by the cut-in prediction unit.

17 Claims, 34 Drawing Sheets

(51) Int. Cl.
*B60W 40/04* (2006.01)
*B60W 40/06* (2012.01)
*B60W 40/105* (2012.01)
*B60W 50/14* (2020.01)
*B60W 60/00* (2020.01)
*B60K 35/28* (2024.01)
*B60K 35/29* (2024.01)
*B60K 35/81* (2024.01)

(52) U.S. Cl.
CPC .......... *B60W 40/06* (2013.01); *B60W 40/105* (2013.01); *B60W 50/14* (2013.01); *B60W 60/00274* (2020.02); *B60W 60/0059* (2020.02); *B60K 35/28* (2024.01); *B60K 35/29* (2024.01); *B60K 35/81* (2024.01); *B60K 2360/178* (2024.01); *B60K 2360/195* (2024.01); *B60W 2050/146* (2013.01); *B60W 2554/4044* (2020.02); *B60W 2554/4045* (2020.02); *B60W 2554/406* (2020.02)

(58) Field of Classification Search
CPC .. B60K 2360/195; B60K 35/10; B60K 35/22; B60K 35/26; B60K 2360/175; B60K 35/60; B60K 35/80; B60W 30/0956; B60W 40/04; B60W 40/06; B60W 40/105; B60W 50/14; B60W 60/00274; B60W 60/0059; B60W 2050/146; B60W 2554/4044; B60W 2554/4045; B60W 2554/406; B60W 2554/4046; B60W 60/00; G08G 1/16
See application file for complete search history.

(56) References Cited

U.S. PATENT DOCUMENTS

| | | | |
|---|---|---|---|
| 2019/0187706 A1* | 6/2019 | Zhou | G06N 3/08 |
| 2019/0187707 A1* | 6/2019 | Zheng | B60W 60/00 |
| 2019/0291728 A1* | 9/2019 | Shalev-Shwartz | B60W 30/0953 |
| 2020/0180637 A1* | 6/2020 | Oh | B60W 30/0956 |

FOREIGN PATENT DOCUMENTS

| | | |
|---|---|---|
| JP | 2017207907 A | 11/2017 |
| JP | 2018027726 A | 2/2018 |
| JP | 2019036339 A | 3/2019 |
| JP | 2019043173 A | 3/2019 |
| JP | 2019160136 A | 9/2019 |
| WO | WO-2016052507 A1 | 4/2016 |
| WO | WO-2017154396 A1 | 9/2017 |

* cited by examiner

TRAFFIC CONGESTION PATTERN E
(TRAFFIC CONGESTION PATTERN B)

PRESENTATION CONTROL DEVICE AND NON-TRANSITORY COMPUTER READABLE STORAGE MEDIUM

CROSS REFERENCE TO RELATED APPLICATION

The present application is a continuation application of International Patent Application No. PCT/JP2021/011734 filed on Mar. 22, 2021, which designated the U.S. and claims the benefit of priority from Japanese Patent Applications No. 2020-066153 filed on Apr. 1, 2020 and No. 2021-027773 filed on Feb. 24, 2021. The entire disclosures of all of the above applications are incorporated herein by reference.

TECHNICAL FIELD

The present disclosure relates to a presentation control device and a non-transitory computer readable storage medium storing instructions to control presentation of information for a driver of a vehicle.

BACKGROUND

Conventionally, an automatic driving device, which starts automatic driving in response to occurrence of a traffic congestion, is known.

SUMMARY

According to an aspect of the present disclosure, a presentation control device is for a vehicle, which has an automatic driving function, and configured to control presentation of information for a driver of the vehicle. The presentation control device comprises a traffic congestion determination unit determine whether a traffic congestion occurs in an automatic travel period in which the vehicle travels by the automatic driving function. The presentation control device further comprises a cut-in prediction unit configured to detect a sign of cut-in of an adjacent vehicle which is adjacent to a subject vehicle as the vehicle on determination by the traffic congestion determination unit that a traffic congestion occurs. The presentation control device further comprises a provision restricting unit configured to restrict display of content provided in the automatic travel period on detection of a sign of cut-in of the adjacent vehicle by the cut-in prediction unit.

BRIEF DESCRIPTION OF THE DRAWINGS

The above and other objects, features and advantages of the present disclosure will become more apparent from the following detailed description made with reference to the accompanying drawings. In the drawings:

FIG. 10 is a diagram illustrating an example of display of a second task mode including a notice of possibility of a cut-in.

FIG. 11 is a diagram illustrating an example of display of the second task mode including a notice of prediction of a cut-in.

DETAILED DESCRIPTION

Figure 1:
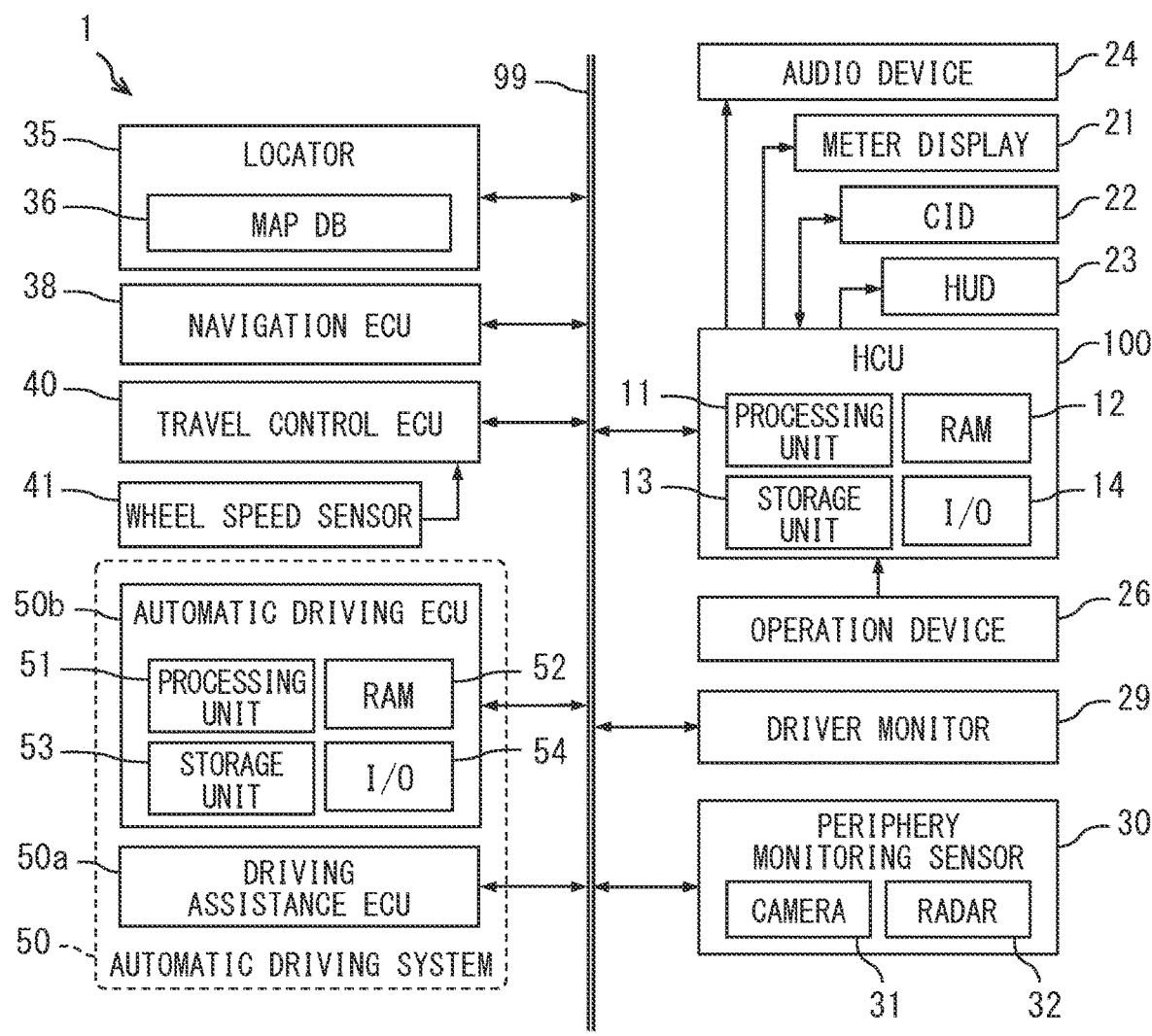
FIG. 1 is a diagram illustrating a whole image of an in-vehicle network including an HCU according to a first embodiment of the present disclosure.

Hereinafter, examples of the present disclosure will be described.

According to an example of the present disclosure,

A vehicle control device has a traffic congestion determination unit determining occurrence of a traffic congestion, and an automatic driving start determination unit staring automatic driving in the case where length of a traffic congestion occurrence section is equal to or larger than a predetermined value.

It is examined to allow provision of content or the like to the driver in a period in which a vehicle automatically travels by an automatic driving function. However, when the attention of the driver is paid to content or the like, a scene that the driver feels anxiety tends to occur. For example, in the case of travel in a traffic congestion, cut-in of another vehicle often occurs. When such cut-in of another vehicle in a traffic congestion occurs during travel by an automatic driving function, it might cause anxiety of the driver.

According to an example of the present disclosure, a presentation control device is for a vehicle, which has an automatic driving function, and configured to control presentation of information for a driver of the vehicle. The presentation control device comprises: a traffic congestion determination unit determine whether a traffic congestion occurs in an automatic travel period in which the vehicle travels by the automatic driving function; a cut-in prediction unit configured to detect a sign of cut-in of an adjacent vehicle which is adjacent to a subject vehicle as the vehicle on determination by the traffic congestion determination unit that a traffic congestion occurs; and a provision restricting unit configured to restrict display of content provided in the automatic travel period on detection of a sign of cut-in of the adjacent vehicle by the cut-in prediction unit.

According to an example of the present disclosure, a non-transitory computer readable storage medium stores instructions to be executed by at least one processor to control presentation of information for a driver of a vehicle having an automatic driving function. The instructions are configured to, when executed by the at least one processor, cause the at least one processor to implement: determining whether a traffic congestion occurs in an automatic travel period in which the vehicle travels by the automatic driving function; on determination that a traffic congestion occurs, detecting a sign of cut-in of an adjacent vehicle which is adjacent to a subject vehicle as the vehicle; and on detection of a sign of cut-in of the adjacent vehicle, restricting display of content provided in the automatic travel period.

In those modes, at the time of travel in a traffic congestion by the automatic driving function, when a sign of cut-in of an adjacent vehicle is detected, display of content provided to the driver is restricted. Therefore, prediction of occurrence of cut-in of the adjacent vehicle is notified to the driver by a display change which occurs in content being provided. By such a notice, at the time of travel in a traffic congestion by the automatic driving function, the driver feels less anxiety.

According to an example of the present disclosure, a presentation control device is for a vehicle, which has an automatic driving function, and configured to control presentation of information for a driver of the vehicle. The presentation control device comprises: a traffic congestion determination unit configured to determine whether a traffic congestion of a specific pattern occurs in an automatic travel period in which the vehicle travels by the automatic driving function, the specific pattern being set as a pattern in which cut-in of an adjacent vehicle adjacent to a subject vehicle as the vehicle tends to occur; and a provision restricting unit configured to strengthen restriction on display of content provided in the automatic travel period on determination by the traffic congestion determination unit that a traffic congestion of the specific pattern occurs.

According to an example of the present disclosure, a non-transitory computer readable storage medium stores instructions to be executed by at least one processor to control presentation of information for a driver of a vehicle having an automatic driving function. The instructions are configured to, when executed by the at least one processor, cause the at least one processor to implement: determining whether a traffic congestion of a specific pattern occurs, the specific pattern being set as a pattern in which cut-in of an adjacent vehicle adjacent to a subject vehicle as the vehicle tends to occur in an automatic travel period in which the vehicle travels by the automatic driving function; and on determination that a traffic congestion of the specific pattern occurs, strengthening restriction on display of content provided in the automatic travel period.

In those modes, at the time of travel in a traffic congestion by the automatic driving function, when a traffic congestion of a specific pattern in which cut-in of an adjacent vehicle tends to occur is determined, display of content provided to the driver is restricted. Therefore, the possibility of occurrence of cut-in of the adjacent vehicle is notified to the driver by a display change which occurs in content being provided. By such a notice, at the time of travel in a traffic congestion by the automatic driving function, the anxiety of the driver is lessened.

According to an example of the present disclosure, a presentation control device is for a vehicle, which has an automatic driving function, and configured to control presentation of information for a driver of the vehicle. The presentation control device comprises: a backward grasping unit configured to grasp existence of a backward vehicle traveling backward of a subject vehicle as the vehicle; a traffic congestion determination unit configured to determine whether a traffic congestion occurs in an automatic travel period in which the vehicle travels by the automatic driving function; and a provision restricting unit configured to restrict display of content provided in the automatic travel period in accordance with a situation of the backward vehicle grasped by the backward grasping unit in a traffic congestion.

According to an example of the present disclosure, a non-transitory computer readable storage medium stores instructions to be executed by at least one processor to control presentation of information for a driver of a vehicle having an automatic driving function. The instructions are configured to, when executed by the at least one processer, cause the at least one processer to implement: grasping existence of a backward vehicle traveling backward of a subject vehicle as the vehicle; determining whether a traffic congestion occurs in an automatic travel period in which the vehicle travels by the automatic driving function; and restricting display of content provided in the automatic travel period in accordance with a situation of the backward vehicle grasped in a traffic congestion.

In those modes, at the time of travel in a traffic congestion by the automatic driving function, according to a situation of a backward vehicle travelling behind a subject vehicle, display of content provided in the automatic travel period is restricted. Therefore, a risk of collision from backward is notified to the driver by a display change which occurs in content being provided. By such a notice, at the time of travel in a traffic congestion by the automatic driving function, the anxiety of the driver is lessened.

According to an example of the present disclosure, a presentation control device is for a vehicle, which has an automatic driving function, and configured to control presentation of information for a driver of the vehicle. The presentation control device comprises: a backward grasping unit configured to grasp existence of a backward vehicle traveling backward of a subject vehicle as the vehicle; a traffic congestion determination unit configured to determine whether a traffic congestion in a specific pattern occurs in an automatic travel period in which the vehicle travels by the automatic driving function, the specific pattern being set as a pattern in which a risk of collision of the backward vehicle tends to increase; and a provision restricting unit configured to strengthen restriction on display of content provided in the automatic travel period on determination by the traffic congestion determination unit that a traffic congestion of the specific pattern occurs.

According to an example of the present disclosure, a non-transitory computer readable storage medium stores instructions to be executed by at least one processor to control presentation of information for a driver of a vehicle having an automatic driving function. The instructions are configured to, when executed by the at least one processor, cause the at least one processor to implement: grasping existence of a backward vehicle travelling backward of a subject vehicle as the vehicle; determining whether a traffic congestion of a specific pattern occurs, the specific pattern being set as a pattern in which a risk of collision of the backward vehicle tends to increase in an automatic travel period in which the vehicle travels by the automatic driving function; and on determination that a traffic congestion of the specific pattern occurs, strengthening restriction on display of the content provided in the automatic travel period.

In those modes, at the time of travel in a traffic congestion by the automatic driving function, when a traffic congestion of a specific pattern in which a risk of collision with a backward vehicle tends to increase is determined, display of content provided to the driver is restricted. Therefore, the risk of collision with a backward vehicle can be notified to the driver by a display change which occurs in content being provided. By such a notice, at the time of travel in a traffic congestion by the automatic driving function, the anxiety of the driver is lessened.

According to an example of the present disclosure, a presentation control device is for a vehicle, which has an automatic driving function, and configured to control presentation of information for a driver of the vehicle. The presentation control device comprises: a traffic congestion determination unit configured to determine whether a traffic congestion occurs in an automatic travel period in which the vehicle travels by the automatic driving function, and determine whether a traffic congestion of a specific pattern occurs, the specific pattern being set as a pattern in which cut-in of an adjacent vehicle adjacent to a subject vehicle as the vehicle tends to occur; and a provision restricting unit configured to, on determination that a traffic congestion of a non-specific pattern other than the specific pattern occurs, set an allowable range of a specific action other than driving allowed to the driver in the automatic travel period, to be wider as compared with a case where a traffic congestion of the specific pattern occurs.

According to an example of the present disclosure, a non-transitory computer readable storage medium stores instructions to be executed by at least one processor to control presentation of information for a driver of a vehicle having an automatic driving function. The instructions are configured to, when executed by the at least one processor, cause the at least one processor to implement: determining whether a traffic congestion of a specific pattern occurs, the specific pattern being set as a pattern in which cut-in of an adjacent vehicle adjacent to a subject vehicle as the vehicle tends to occur in an automatic travel period in which the vehicle travels by the automatic driving function; and on determination that a traffic congestion of a non-specific pattern other than the specific pattern occurs, setting an allowable range of a specific action other than driving allowed to the driver in the automatic travel period to be wider as compared with a case where a traffic congestion of the specific pattern occurs.

In those modes, at the time of travel in a traffic congestion by the automatic driving function, when a traffic congestion of a specific pattern in which cut-in of an adjacent vehicle tends to occur is determined, an allowable range of specific actions allowed to the driver is narrowed. Consequently, when there is the possibility of occurrence of cut-in of an adjacent vehicle, by a change of the allowable range, a specific action which easily brings about anxiety is not allowed. As a result, at the time of travel in a traffic congestion by the automatic driving function, the anxiety of the driver is lessened.

According to an example of the present disclosure, a presentation control device is for a vehicle, which has an automatic driving function, and configured to control presentation of information for a driver of the vehicle. The presentation control device comprises: a backward grasping unit configured to grasp existence of a backward vehicle traveling backward of a subject vehicle as the vehicle; a traffic congestion determination unit configured to determine whether a traffic congestion occurs in an automatic travel period in which the vehicle travels by the automatic driving function; and a provision restricting unit configured to change an allowable range of a specific action other than driving allowed to the driver in the automatic travel period in accordance with a situation of the backward vehicle grasped by the backward grasping unit in a traffic congestion.

According to an example of the present disclosure, a non-transitory computer readable storage medium stores instructions to be executed by at least one processor to control presentation of information for a driver of a vehicle having an automatic driving function. The instructions are configured to, when executed by the at least one processor, cause the at least one processor to implement: grasping existence of a backward vehicle travelling backward of a subject vehicle as the vehicle; and changing an allowable range of a specific action other than driving allowed to the driver in accordance with a situation of the backward vehicle, which is grasped, in an automatic travel period in which the vehicle travels by the automatic driving function in a traffic congestion.

In those modes, at the time of travel in a traffic congestion by the automatic driving function, according to a situation of a backward vehicle travelling backward of a subject vehicle, an allowable range of specific actions allowed to the driver is changed. Consequently, when there is a risk of collision from backward, by a change of the allowable range, a specific action which easily brings about anxiety is not allowed. As a result, at the time of travel in a traffic congestion by the automatic driving function, the anxiety of the driver is lessened.

Hereinafter, a plurality of embodiments of the present disclosure will be described with reference to the drawings. In some cases, by designating the same reference numeral to components corresponding in the embodiments, repetitive description will be omitted. In the case of describing only a part of a configuration in each of the embodiments, the configuration of another embodiment already described can be applied to the other part of the configuration. Not only combinations of components clearly described in the description of the embodiments, as long as any hindrance occurs in combinations, even not clearly described, components of the plurality of embodiments can be partially combined. It is to be understood that not-clearly described combinations of components described in the plurality of embodiments and modifications are disclosed by the following description.

First Embodiment

Figure 2:
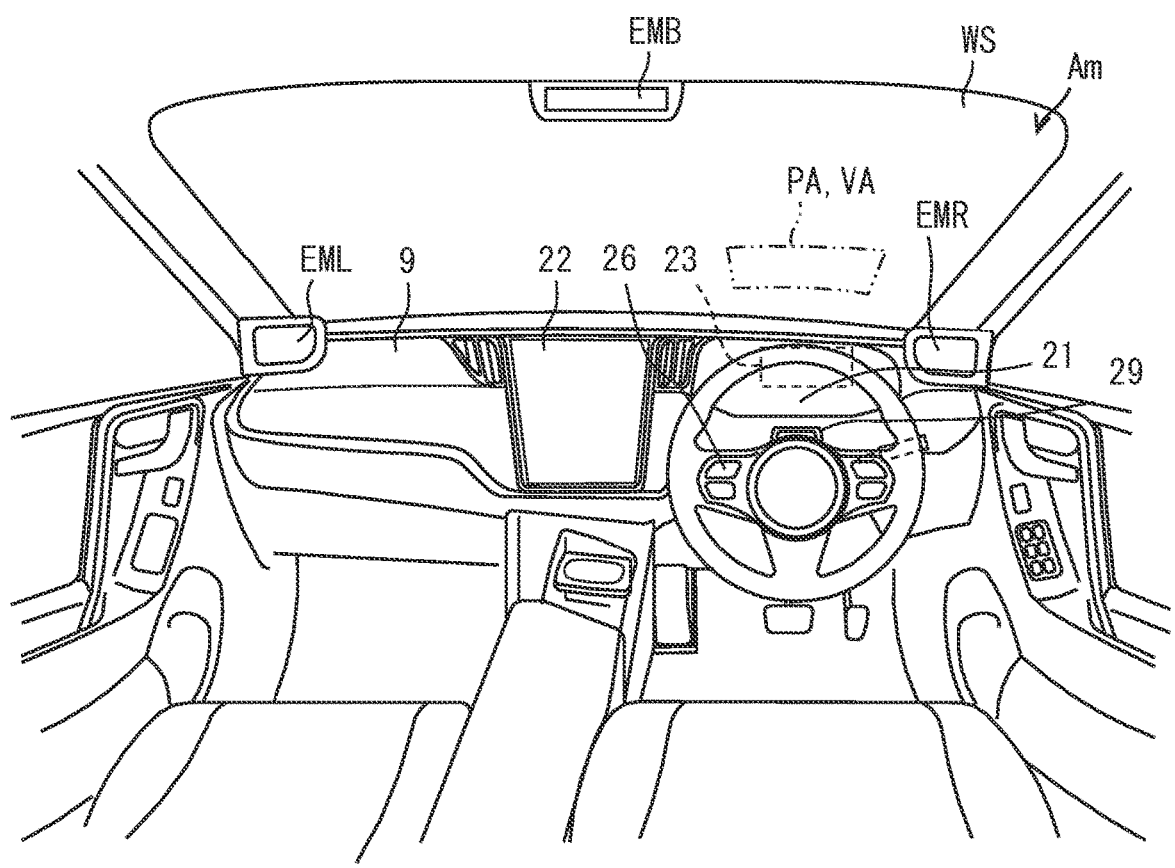
FIG. 2 is a diagram illustrating an example of layout of an interface around a driver's seat.
Figure 3:
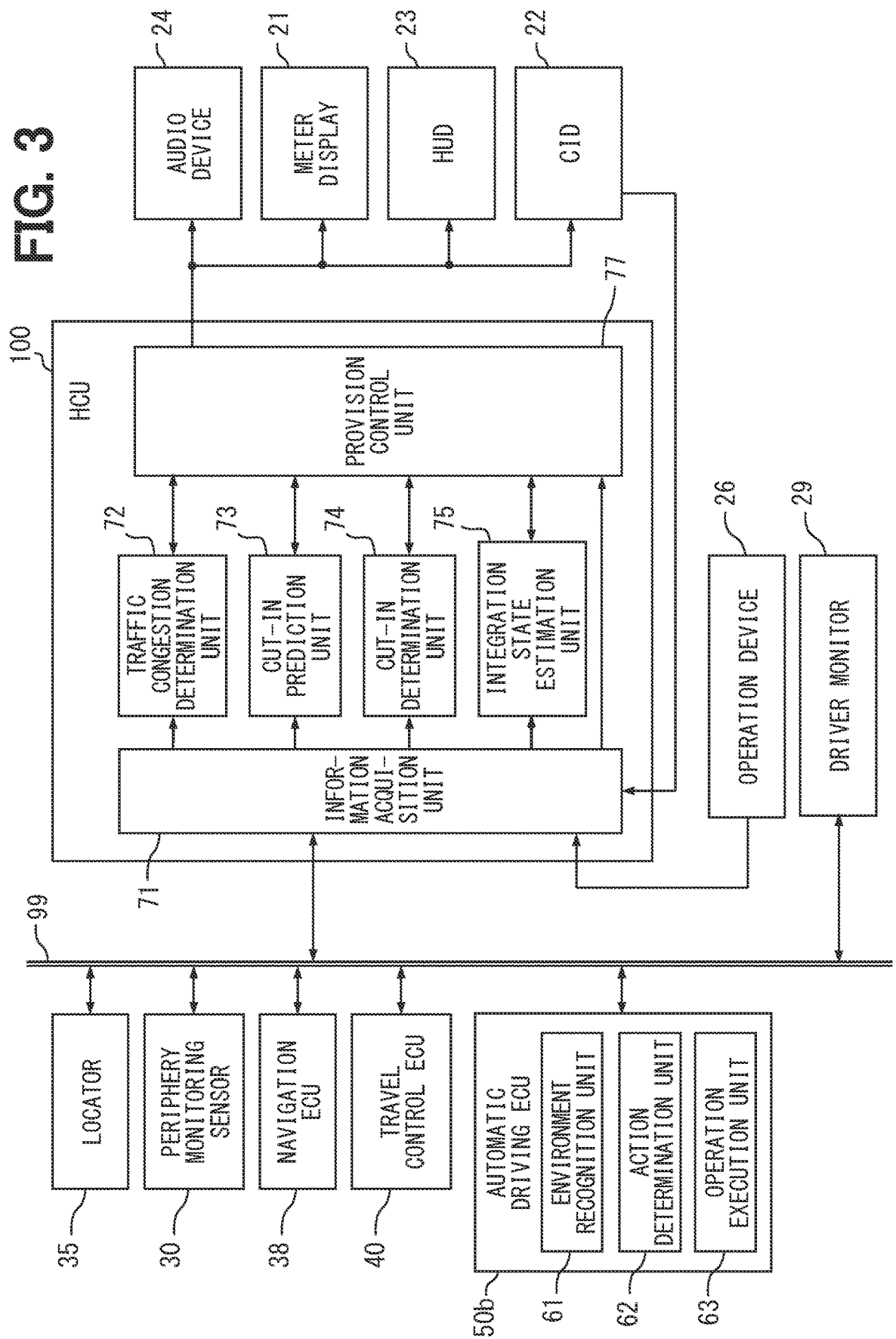
FIG. 3 is a diagram illustrating an example of function units configured in the HCU together with related configurations.

The functions of a presentation control device according to a first embodiment of the present disclosure are realized by an HCU (human machine interface control unit) 100 illustrated in FIG. 1. As illustrated in FIGS. 1 to 3, the HCU 100 constructs an HMI (Human Machine Interface) system used in a vehicle Am, together with a plurality of display devices, an audio device 24, an operation device 26, and the like. The HMI system has an input interface function of receiving an operation of an occupant (for example, the driver or the like) of the vehicle Am and an output interface function of presenting information for the driver.

The HCU 100 is communicably connected to a communication bus 99 of an in-vehicle network 1 mounted in the vehicle Am. The HCU 100 is one of a plurality of nodes provided for the in-vehicle network 1. To the communication bus 99, a driver monitor 29, a periphery monitoring sensor 30, a locator 35, a navigation ECU (Electronic Control Unit) 38, a travel control ECU 40, a driving assistance ECU 50a, an automatic driving ECU 50b, and the like are connected. Those nodes connected to the communication bus 99 of the in-vehicle network 1 can perform communication with one another. Specific nodes in those devices and ECUs are electrically connected mutually directly and can execute communication without using the communication bus 99.

The driver monitor 29 is configured by including a near-infrared light source and a near-infrared camera, and a control unit controlling them. The driver monitor 29 is mounted in a posture that the near-infrared camera is directed to a head rest part of the driver's seat, for example, in the top face of a steering column, the top face of an instrument panel 9, or the like. The near-infrared camera may be configured integrally with a meter display 21 or a center information display (hereinbelow, CID) 22 which will be described later and provided in the screen of any of the displays.

The drive monitor 29 photographs the head of the driver irradiated with near-infrared light of the near-infrared light source by the near-infrared camera. An image taken by the near-infrared camera is analyzed by the control unit. The control unit extracts information of the positions of eye points of the driver, the visual line direction, and the like from the taken image, and provides the extracted driver state information to the HCU 100 and the like via the communication bus 99.

The periphery monitoring sensor 30 is an autonomous sensor monitoring the peripheral environment of the vehicle Am. The periphery monitoring sensor 30 can detect a mobile object and a stationary object which are specified in advance from a detection range of the periphery of the subject vehicle (the vehicle Am). The periphery monitoring sensor 30 can detect at least a forward vehicle (refer to a forward vehicle Af in FIG. 4), a backward vehicle, side vehicles which are forward and backward (refer to adjacent vehicles Ad in FIG. 4), and the like which travel around the subject vehicle. The periphery monitoring sensor 30 provides the detection information of the objects around the vehicle to the driving assistance ECU 50a, the automatic driving ECU 50b, and the like via the communication bus 99.

The periphery monitoring sensor 30 includes, for example, a camera unit 31 and a millimeter-wave radar 32. The camera unit 31 may have a configuration including a monocular camera or a configuration including a compound-eye camera. The camera unit 31 is mounted in the vehicle Am so that the forward range, the side ranges, the rear ranges, and the like of the vehicle Am can be photographed. The camera unit 31 outputs, as detection information, at least one of image data obtained by photographing the vehicle periphery and an analysis result of the image data. The millimeter-wave radar 32 emits millimeter waves or quasi-millimeter waves toward the periphery of the subject vehicle. The millimeter-wave radar 32 outputs detection information generated by a process of receiving reflection waves reflected by the mobile objects, stationary object, and the like. The periphery monitoring sensor 30 may further have a detection configuration such as a LiDAR or a sonar.

The locator 35 has a configuration including a GNSS (Global Navigation Satellite System) receiver, an inertial sensor, and the like. The locator 35 sequentially measures the position of the vehicle Am, the travel direction, and the like by combining a positioning signal received by the GNSS receiver, a measurement result of the inertial sensor, vehicle speed information which is output to the communication bus 99, and the like. The locator 35 sequentially outputs, as locator information, the position information and the direction information of the vehicle Am based on the positioning result to the communication bus 99.

The locator 35 further has a map database 36. The map database 36 has a configuration whose main body is a large-capacity storage medium storing a number of pieces of three-dimensional map data and two-dimensional map data. The three-dimensional map data is so-called high-precision map data and includes information necessary for high-degree driving assistance and automatic driving such as three-dimensional shape information of roads, detailed information of lanes, and the like. The locator 35 reads the map data of the periphery of the present position from the map database 36 and provides it with the locator information to the driving assistance ECU 50a, the automatic driving ECU 50b, and the like.

The navigation ECU 38 grasps the present position of the vehicle Am on the basis of the locator information obtained from the locator 35. The navigation ECU 38 sets a route from the present position to the destination which is set by the driver or the like. The navigation ECU 38 provides route information indicating the set route to the destination to the HCU 100. The navigation ECU 38 combines a screen display, a voice message, and the like as a route guidance to the destination in cooperation with the HMI system to notify the driver of the travel direction of the vehicle Am at an intersection, a fork point, and the like.

A user terminal or the like such as a smartphone may be connected to the in-vehicle network 1 or the HCU 100. Such a user terminal may provide the position information, the direction information, the map data, and the like to the driving assistance ECU 50a and the automatic driving ECU 50b in place of the locator 35. The user terminal may provide the route information to the destination to the HCU 100 in place of the navigation ECU 38. Specifically, in an application executed by the user terminal, a route to the destination is set on the basis of the user operation of the driver or the like. The user terminal can guide the travel direction of the vehicle Am at an intersection, a fork point, or the like by combining the screen display, the voice message, and the like. The user terminal can provide the route information to the destination set in the application to the HCU 100.

The travel control ECU 40 is an electronic control unit including a microcontroller as a main body. The travel control ECU 40 has at least the functions of a brake control ECU, a drive control ECU, and a steering control ECU. The travel control ECU 40 continuously executes brake force control of each of the wheels, output control of an in-vehicle power source, and steering angle control on the basis of any one of an operation instruction based on the driving operation of the driver, a control instruction of the driving assistance ECU 50a, and a control instruction of the automatic driving ECU 50b. In addition, the travel control ECU 40 generates vehicle speed information indicating the present travel speed of the vehicle Am on the basis of the detection signal of a wheel speed sensor 41 provided for a hub part of each wheel and sequentially outputs it to the communication bus 99.

The driving assistance ECU 50a and the automatic driving ECU 50b are mounted, as in-vehicle ECUs constructing an automatic driving system 50, in the vehicle Am. By mounting the automatic driving system 50, the vehicle Am becomes an automatic driving vehicle having the automatic driving function.

The driving assistance ECU 50a is an in-vehicle ECU realizing the driving assistance function which assists the driving operation of the driver. The driving assistance ECU 50a enables high-degree driving assistance or partial automatic travel control at a degree of Level 2 in the automated driving levels specified by the Society of Automotive Engineers. The driving assistance ECU 50a is a computer including, as a main body, a control circuit having a processing unit, a RAM, a storage unit, an input/output interface, a bus connecting those units, and the like. The driving assistance ECU 50a has a plurality of function units realizing the high-degree driving assistance by execution of a program by the processing unit. Concretely, the driving assistance ECU 50a has an ACC (Adaptive Cruise Control) function unit, an LTA (Lane Tracing Assist) function unit, and an LCA (Lane Change Assist) function unit.

The automatic driving ECU 50b is an in-vehicle ECU realizing an automatic driving function which can perform the driving operation in place of the driver. The automatic driving ECU 50b enables autonomous travel of Level 3 or higher in which the system becomes a control main body only in an operational design domain (ODD) which is set in advance. The autonomous travel control by the automatic driving ECU 50b is conformed to the regulations of the country or region in which the vehicle Am is used and enables eyes-off automatic driving which does not require visual monitoring of the periphery of the vehicle by the driver. The automatic driving ECU 50b can execute automatic driving of the area-limited Level 3 in which the automatic travel of Level 3 is allowed within a specific automatic driving permitted area, automatic driving of Level 3 at the time of traffic congestion in which automatic travel of Level 3 is permitted in the case of travel in a traffic congestion, and the like. The automatic driving ECU 50b may realize the automatic driving function of Level 4 or higher.

The automatic driving ECU 50b is a computer including, as a main body, a control circuit having a processing unit (processor) 51, a RAM 52, a storage unit 53, an input/output interface 54, a bus connecting those components, and the like. The automatic driving ECU 50b has computing power higher than that of the driving assistance ECU 50a, and can execute at least travel controls corresponding to ACC, LTA, and LCA. The automatic driving ECU 50b has an environment recognition unit 61, an action determination unit 62, and an operation execution unit 63 as a plurality of function units realizing the automatic driving of the vehicle Am by execution of the program by the processing unit 51.

The environment recognition unit 61 recognizes the travel environment of the vehicle Am on the basis of the locator information and map data obtained from the locator 35 and the detection information obtained by the periphery monitoring sensor 30. Concretely, the environment recognition unit 61 grasps the position of the lane on which the subject vehicle travels in a plurality of lanes, the shape of the lane of the subject vehicle, relative positions and relative speeds of other vehicles around the subject vehicle, and the like. The position of the lane of the subject vehicle may be specified by the locator 35. A result of recognition of the travel environment by the environment recognition unit 61 is provided as recognition information to the HCU 100.

On the basis of the result of recognition of the travel environment by the environment recognition unit 61, the action determination unit 62 generates a scheduled travel line on which the vehicle Am is made travel. On the basis of the route information generated by the navigation ECU 38, the action determination unit 62 sequentially generates an optimum scheduled travel line toward the destination. For example, in the case where a branch point departing from a main lane exists in a set path, the action determination unit 62 generates a scheduled travel line in which lane change is performed toward a lane to which the main lane is branched on the route (hereinbelow, a route lane Lnr, refer to FIG. 7).

The operation execution unit 63 executes acceleration/deceleration control, steering control, and the like of the vehicle Am in accordance with the scheduled travel line generated by the action determination unit 62 in cooperation with the travel control ECU 40. Concretely, the operation execution unit 63 generates a control instruction based on the scheduled travel line and sequentially outputs it to the travel control ECU 40.

Next, the details of each of a plurality of display devices, the audio device 24, the operation device 26, and the HCU 100 included in the HMI system will be described in order.

The plurality of display devices include the meter display 21, the CID 22, a head-up display (hereinbelow, HUD) 23, and the like. The plurality of display devices may further include displays EMB, EML, and EMR of an electron mirror system (refer to FIG. 2). The meter display 21, the CID 22, and the HUD 23 present information through the vision of the driver.

The meter display 21 and the CID 22 are configured by using, for example, a liquid crystal display, an OLED (Organic Light Emitting Diode) display or the like as a main body. The meter display 21 and the CID 22 make various images displayed on a display screen on the basis of a control signal and video data obtained from the HCU 100. The meter display 21 is mounted, for example, in front of the driver's seat. The CID 22 is mounted in a center part of the instrument panel 9. As an example, the CID 22 is a vertically-long display of 10 inches or longer. The display screen of the CID 22 may be curved like a curved plane. Further, the display screen of the CID 22 may be continued to the display screen of the meter display 21. The CID 22 has the function of the touch panel and detects, for example, a touch operation to the display screen by the driver or the like, concretely, the operations of tapping, flicking, pinching, swiping, and the like.

Based on the control signal and video data obtained from the HCU 100, the HUD 23 projects the light of the image formed in front of the driver into a projection area PA specified in a windshield WS or the like. The light of the image reflected by the inside of the vehicle compartment by the windshield WS is perceived by the driver sitting on the driver's seat. In such a manner, the HUD 23 displays a virtual image in the space which is in front of the projection area PA. The driver visually recognizes the virtual image in a view angle VA displayed by the HUD 23, which overlaps the front view of the vehicle Am.

The audio device 24 has a plurality of speakers mounted in the vehicle compartment in arrangements surrounding the driver's seat. On the basis of the control signal and voice data obtained from the HCU 100, the audio device 24 reproduces a notice sound, a voice message, or the like by the speaker in the vehicle compartment. The audio device 24 presents the information through the auditory sense of the driver.

The operation device 26 is an input unit which accepts a user operation by a driver or the like. To the operation device 26, for example, a user operation or the like related to actuation and stop of the automatic driving function is input. A steering switch provided for the spoke part of the steering wheel, an operation lever provided for the steering column part, a voice input device recognizing an utterance of the driver, and the like are included in the operation device 26.

The HCU 100 is an in-vehicle computer controlling the meter display 21, the CID 22, the HUD 23, and the audio device 24 in the HMI system. The HCU 100 functions as a presentation control device which integratedly manages information presentation for the driver. The HCU 100 has a configuration including, as a main body, a control circuit having a processing unit (processor) 11, a RAM 12, a storage unit 13, an input/output interface 14, a bus connecting those units, and the like.

The processing unit 11 is hardware for computing process, which is coupled to the RAM 12. The processing unit 11 has a configuration including at least one processing core such as a CPU (Central Processing Unit) or a GPU (Graphics Processing Unit). The processing unit 11 may have a configuration further including an FPGA (Field-Programmable Gate Array), an NPU (Neural network Processing Unit), an IP core having another dedicated function, and the like. The RAM 12 may have a configuration including a video RAM for generating video data. The processing unit 11 executes various processes for realizing the presentation control method of the present disclosure by accessing the RAM 12. The storage unit 13 has a configuration including a non-volatile storing medium. In the storage unit 13, various programs (such as a presentation control program) executed by the processing unit 11 are stored.

The HCU 100 has a plurality of function units integratedly controlling information presentation to the driver using the display devices and the audio device 24 by executing the presentation control program stored in the storage unit 13 by the processing unit 11. Concretely, in the HCU 100, the function units such as an information acquisition unit 71 and a provision control unit 77 are configured.

The information acquisition unit 71 obtains vehicle information indicating the state of the vehicle Am from the communication bus 99. The vehicle information includes, for example, vehicle speed information, status information indicating the status of the automatic driving function, and recognition information obtained by recognizing the travel environment around the vehicle by the environment recognition unit 61. The information acquisition unit 71 obtains the operation information indicating the details of a user operation from the CID 22, the operation device 26, and the like. The information acquisition unit 71 obtains the driver state information from the driver monitor 29.

Figure 9:
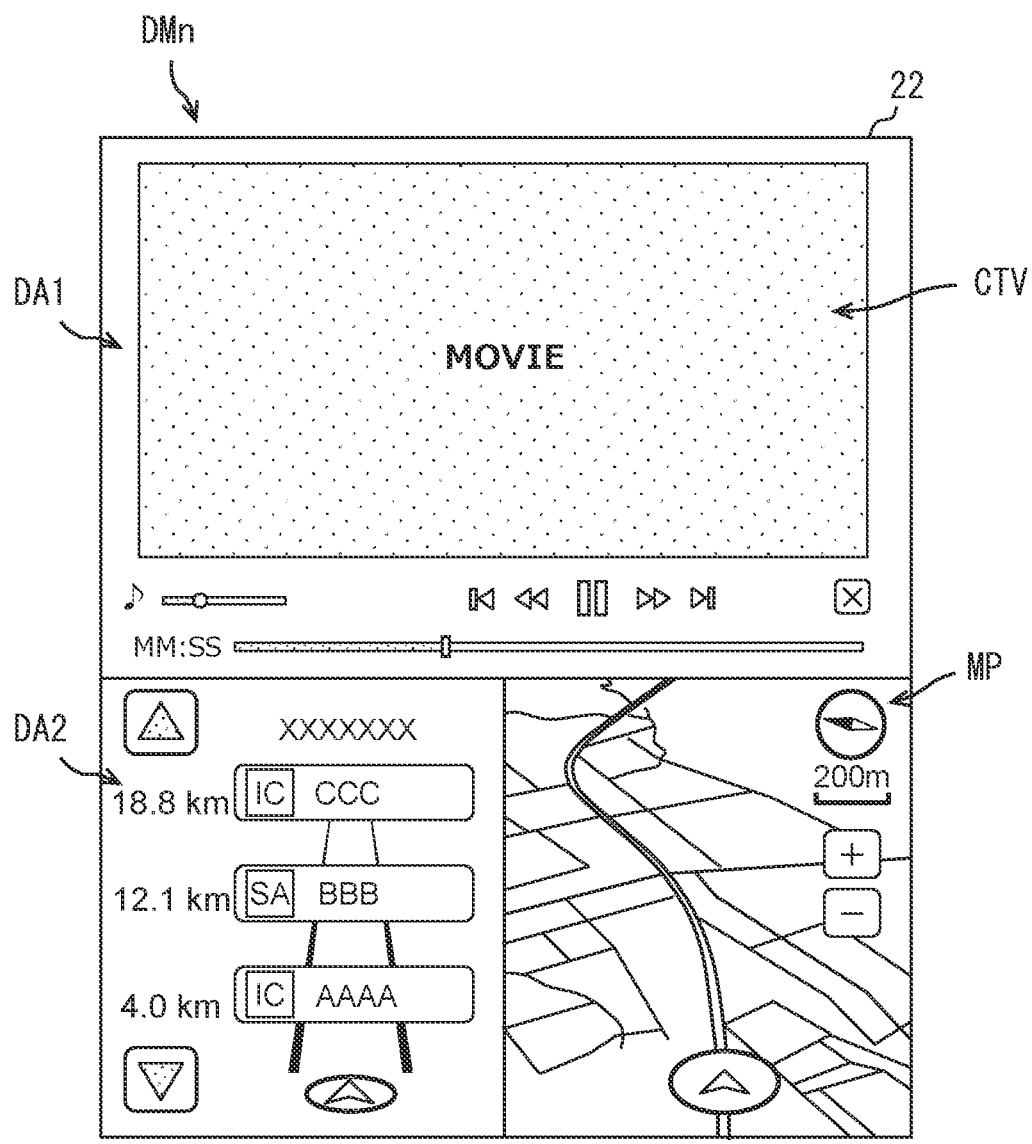
FIG. 9 is a diagram illustrating an example of display of a second task mode in an automatic travel period.

In addition, the information acquisition unit 71 obtains locator information, map data, route information, and the like necessary to generate a navigation map MP (refer to FIG. 9 and the like). The video data of the navigation map MP may be generated at a predetermined resolution by the navigation ECU 38 and provided to the information acquisition unit 71.

The information acquisition unit 71 obtains content data (such as a video file) necessary to display entertainment content such as video content CTV (refer to FIG. 9 and the like). The content data is provided to the information acquisition unit 71 by a TV tuner mounted in the vehicle Am, an external medium electrically connected to the HCU 100, a user terminal such as a smartphone paired to the HCU 100, or the like.

The provision control unit 77 performs integration control on provision of information to the driver using the display devices and the audio device 24. The provision control unit 77 can change the display size and display layout of each piece of content displayed in each of the display devices in accordance with the priority which is set for each content. As an example, the provision control unit 77 displays content so that, the higher the priority of content is, the larger the display size is or the more to the front side in appearance in the screen is.

Concretely, the provision control unit 77 has an arbitration function of arbitrating information to be presented to the driver and a data generation function of generating video data and voice data on the basis of the arbitration result. As the arbitration function, the provision control unit 77 sets the above-described priority on each of the pieces of content as a candidate to be provided on the basis of various information obtained by the information acquisition unit 71. The provision control unit 77 selects content which is determined as high-priority content as an object to be provided to the driver. On the basis of the content selection result, as the data generation function, the provision control unit 77 generates a control signal and video data to be provided to each of the display devices and a control signal and voice data to be provided to the audio device 24. The provision control 77 sequentially outputs the generated control signals, video data, voice data, and the like to each of the presentation devices.

The automatic driving ECU 50*b* and the HCU 100 described above temporarily allow execution of actions other than the driving by the driver. Specifically, in the automatic travel period in which the vehicle Am automatically travels by the automatic driving function of Level 3 by the automatic driving ECU 50*b*, a specific action (hereinbelow, a second task) which is preliminarily specified as an action other than driving can be allowed to the driver. The driver in this case is a person (occupant) who takes over the control right of driving from the automatic driving system 50 out of a limited area or at the time of emergency. Until a driving operation execution request, that is, a driving take-over request is generated by the automatic driving system 50, the driver can be legally allowed to execute a second task.

The second tasks can be also called secondary activities, other activities, and the like. The second task should not hinder the driver from responding to the driving operation take-over request from the automatic driving system 50. For example, actions such as watching of entertainment content such as the video content CTV (refer to FIG. 9), operation of a smartphone or the like, and eating are assumed as second tasks.

In the case where the driver executes a second task, the attention of the driver is away from the driving operation. Therefore, during execution of a second task, a behavior change in the automatic driving by the automatic driving ECU 50*b* makes the driver become nervous. As an example, in the case where the vehicle Am travels in a traffic congestion, cut-in of another vehicle often occurs depending on the situation of the traffic congestion. In such a scene, even when the automatic driving function normally operates, there is the possibility that the driver feels anxiety by a behavior change of the vehicle Am in response to the cut-in of another vehicle.

In the HCU 100, a plurality of function units for managing execution of a second task of the driver during the automatic travel in a traffic congestion section are further configured on the basis of the presentation control program. Concretely, the HCU 100 further has a traffic congestion determination unit 72, a cut-in prediction unit 73, a cut-in determination unit 74, and an integration state estimation unit 75.

The traffic congestion determination unit 72 determines whether there is a traffic congestion or not in the automatic travel period in which the vehicle Am travels by the automatic driving function. The traffic congestion determination unit 72 determines whether the vehicle Am (hereinbelow, also described as the subject vehicle) is in a traffic congestion state or not on the basis of the vehicle speed information, map data, route information, recognition information of the vehicle surrounding, and the like obtained by the information acquisition unit 71. As an example, the traffic congestion determination unit 72 determines that there is a traffic congestion in the case where the travel speed of the subject vehicle is equal to or less than a traffic congestion determination threshold (for example, 10 km/h) which is specified in advance and there is a forward vehicle Af in front of the subject vehicle. The forward vehicle Af is an another preceding vehicle the subject vehicle follows while assuring a common-sense distance (for example, a few meters to ten-odd meters) at the time of a traffic congestion. After the traffic congestion is determined, when the travel speed of the subject vehicle exceeds a traffic congestion clear-up threshold (for example, 50 km/h) which is specified in advance, the traffic congestion determination unit 72 determines that the traffic congestion is cleared up.

In addition, when it is determined that the traffic around the subject vehicle is congested, the traffic congestion determination unit 72 further determines a traffic congestion pattern of the surrounding of the subject vehicle. The traffic congestion determination unit 72 specifies a traffic congestion pattern to which the traffic congestion of the surrounding of the subject vehicle at present corresponds, from traffic congestion patterns A to D (refer to FIGS. 4 to 7) which are set in advance.

Figure 4:
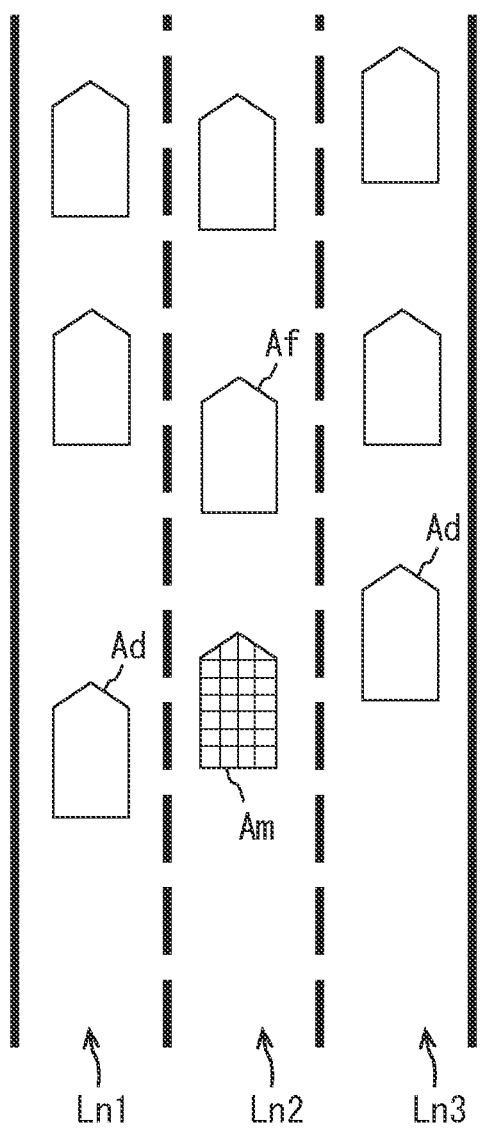
FIG. 4 is a diagram schematically illustrating a traffic congestion pattern A determined by a traffic congestion determination unit.

The traffic congestion pattern A illustrated in FIG. 4 is premised on that the subject vehicle travels in a center lane Ln2 in a road including three or more lanes. The center lane Ln2 is a lane other than a right-end lane Ln3 and a left-end lane Ln1. A plurality of center lanes Ln2 may exist in the road. The traffic congestion pattern A is a traffic congestion pattern in which other vehicles exist in front of and on both right and left sides of the subject vehicle traveling on the center lane Ln2. In the case where the travel speed of the subject vehicle is equal to or less than the traffic congestion determination threshold and all of the forward vehicle Af and adjacent vehicles Ad on the right and left sides are detected, the traffic congestion determination unit 72 determines that it is the traffic congestion of the pattern A.

The detection range of determining the presence/absence of an adjacent vehicle Ad may include not only sides of the subject vehicle but also include slightly (for example, about 5 m) forward and backward sides of the subject vehicle. Further, the detection range of the adjacent vehicle Ad may be fixed or adjusted according to the travel speed.

Figure 5:
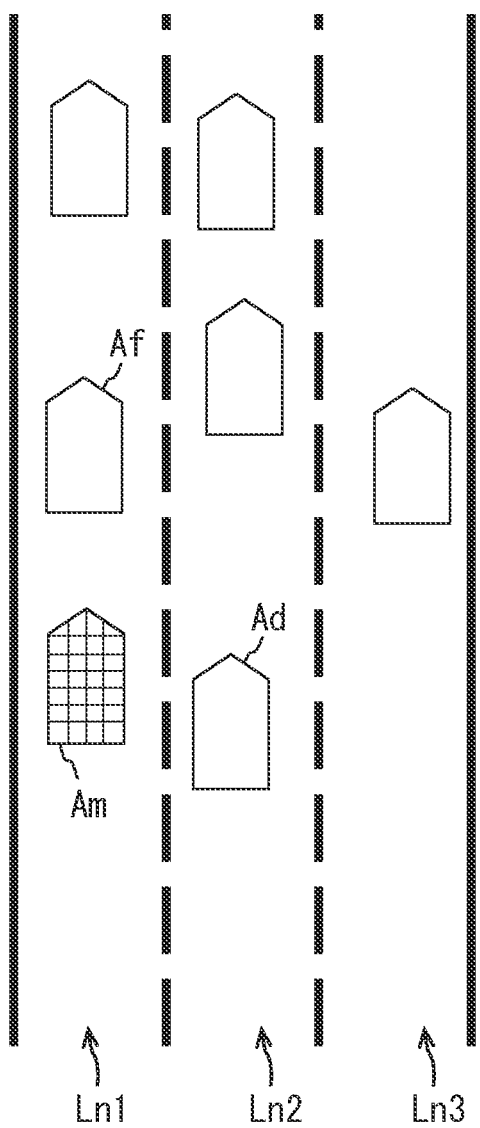
FIG. 5 is a diagram schematically illustrating a traffic congestion pattern B determined by the traffic congestion determination unit.

The traffic congestion pattern B illustrated in FIG. 5 is premised on that the subject vehicle travels in the right-end lane Ln3 or the left-end lane Ln1 in a road including a plurality of lanes. The traffic congestion pattern B is a traffic congestion pattern in which the forward vehicle Af exists in front of the subject vehicle and the adjacent vehicle Ad exists in the adjacent center lane Ln2. In the case where the travel speed of the subject vehicle is equal to or less than the traffic congestion determination threshold and both the forward vehicle Af and adjacent vehicle Ad are detected, the traffic congestion determination unit 72 determines that it is the traffic congestion of the pattern B.

Figure 6:
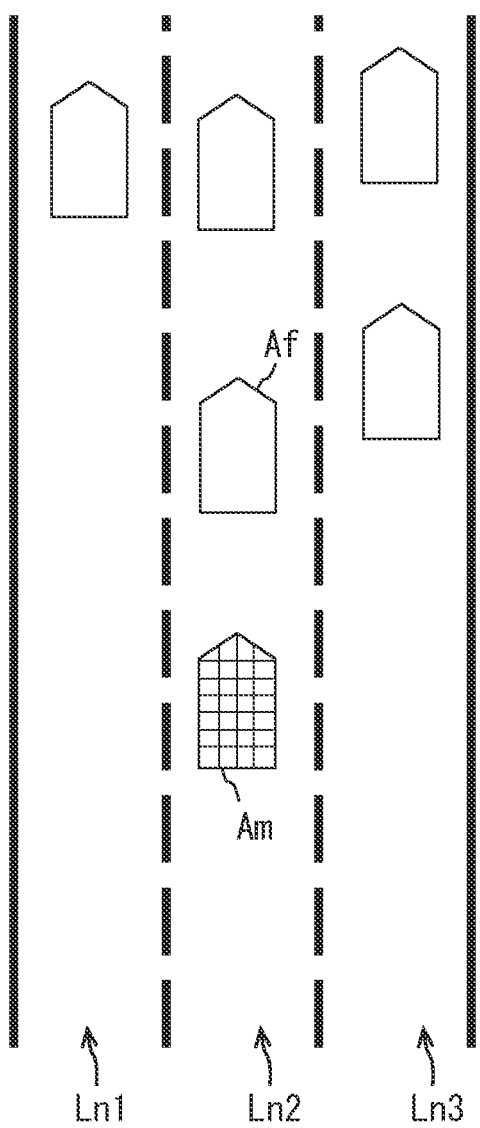
FIG. 6 is a diagram schematically illustrating a traffic congestion pattern C determined by the traffic congestion determination unit.

The traffic congestion pattern C illustrated in FIG. 6 is a traffic congestion pattern in which a traffic congestion occurs only in a subject vehicle lane on which the subject vehicle travels in a plurality of lanes. In the case where the travel speed of the subject vehicle is equal to or less than the traffic congestion determination threshold, the forward vehicle Af is detected, and no adjacent vehicle Ad is detected, the traffic congestion determination unit 72 determines that it is the traffic congestion of the pattern C.

Figure 7:
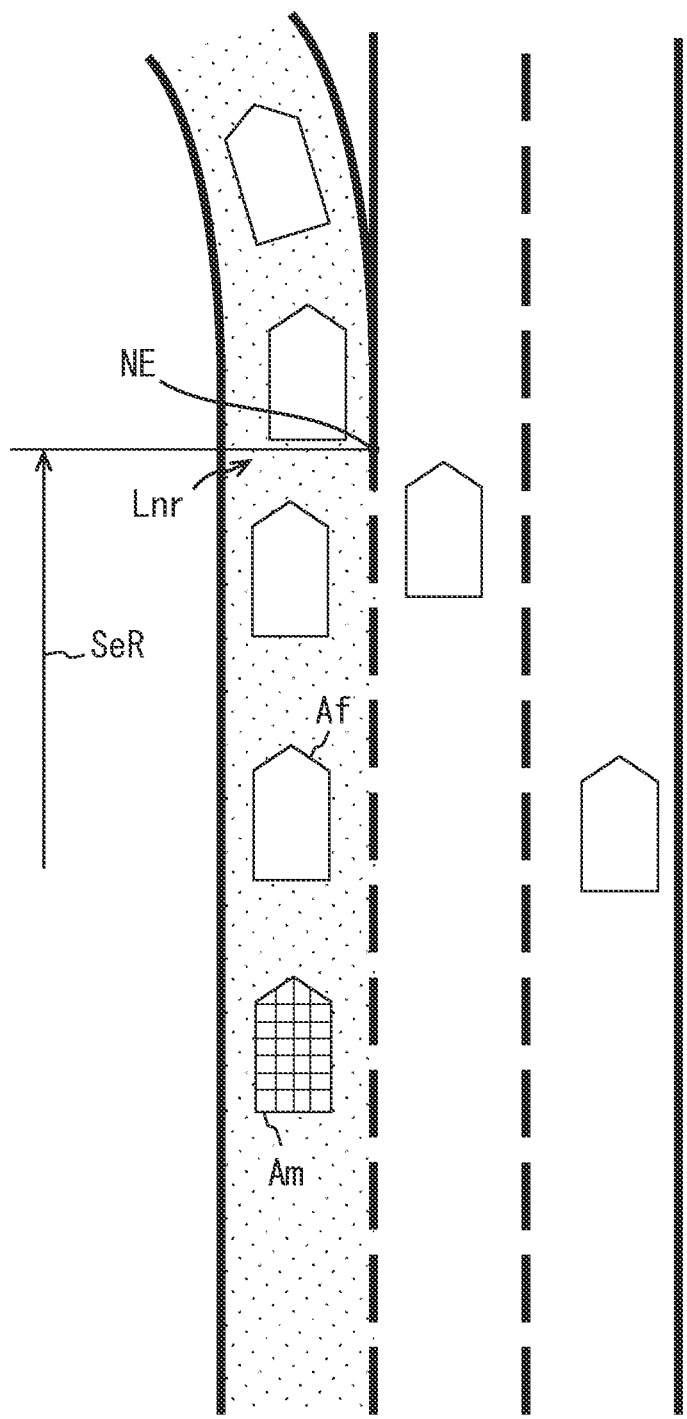
FIG. 7 is a diagram schematically illustrating a traffic congestion pattern D determined by the traffic congestion determination unit.

The traffic congestion pattern D illustrated in FIG. 7 is a traffic congestion pattern in which a traffic congestion occurs only in the route lane Lnr (refer to a dotted range) specified on the basis of route information. In the case where the travel speed of the subject vehicle is equal to or less than the traffic congestion determination threshold and the forward vehicle Af is detected in front of the subject vehicle travelling on the route lane Lnr, the traffic congestion determination unit 72 determines that it is the traffic congestion of the pattern D.

Figure 8:
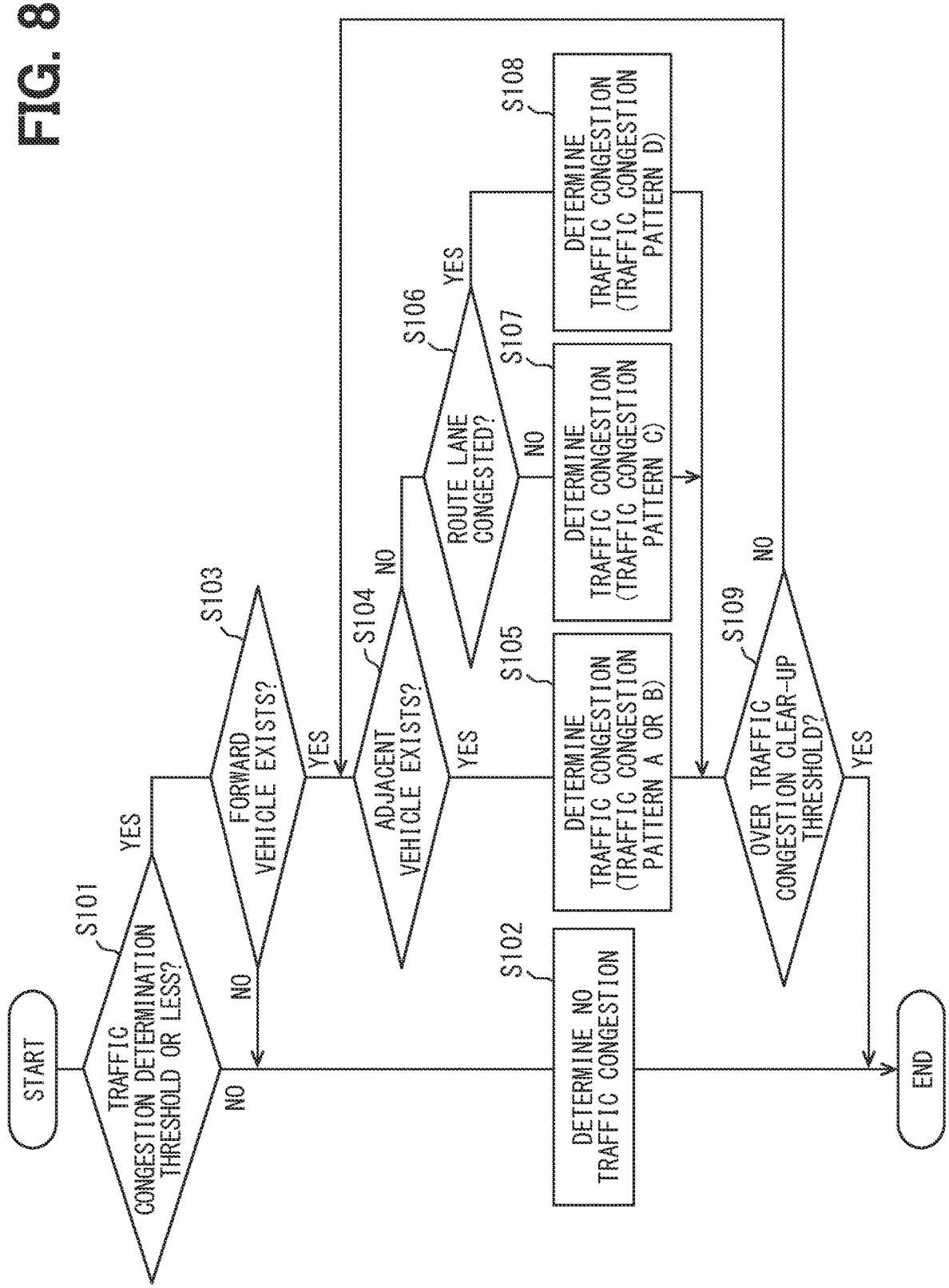
FIG. 8 is a flowchart illustrating the details of a traffic congestion determining process for determining a traffic congestion pattern.

Hereinafter, the details of the traffic congestion determining process executed by the above-described traffic congestion determination unit 72 will be described on the basis of FIG. 8 with reference to FIGS. 4 to 7. The traffic congestion determination unit 72 starts the traffic congestion determining process on the basis of acquisition of status information indicating automatic travel start by the automatic driving ECU 50*b*. The traffic congestion determination unit 72 repeatedly starts the traffic congestion determining process in predetermined cycles until the automatic travel by the automatic driving ECU 50*b* is finished.

In S101, whether the travel speed of the subject vehicle is equal to or less than the traffic congestion determination threshold or not is determined on the basis of latest vehicle speed information. When it is determined in S101 that the travel speed exceeds the traffic congestion determination threshold, the program advances to S102. In S102, it is determined that the surrounding of the subject vehicle is not being congested (no traffic congestion determination), and the traffic congestion determining process of this time is finished.

On the other hand, when it is determined in S102 that the travel speed is equal to or less than the traffic congestion determination threshold, the program advances to S103. In S103, the presence/absence of the forward vehicle Af traveling in front of the subject vehicle is determined. When it is determined in S103 that the forward vehicle Af is not detected, the program advances to S102 and "no traffic congestion" is determined. On the other hand, when it is determined in S103 that the forward vehicle Af is detected, the program advances to S104.

In S104, the presence/absence of the adjacent vehicle Ad is determined. When it is determined in S104 that the adjacent vehicles Ad are detected in all of adjacent lanes, the program advances to S105. In S105, it is determined that there is a traffic congestion in the surrounding of the subject vehicle (traffic congestion determination) and a traffic congestion pattern is determined. After that, the program advances to S109. In S105, according the position of the subject vehicle lane, the traffic congestion pattern A or B is determined.

When it is determined in S104 that there is an adjacent lane in which no adjacent vehicle Ad is detected, the program advances to S106. In S106, based on route information, whether the subject vehicle lane is the route lane Lnr or not is determined. When it is determined in S106 that the subject vehicle lane on which the subject vehicle is travelling is not the route lane Lnr, the program advances to S107. In S107, the traffic congestion determination of the subject vehicle lane is performed and it is determined that the traffic congestion of the traffic congestion pattern C occurs. After that, the program advances to S109.

On the other hand, when it is determined in S106 that the subject vehicle lane is the route lane Lnr and there is a traffic congestion in the route lane Lnr, the program advances to S108. In S108, the traffic congestion determination of the route lane Lnr is performed and it is determined that the traffic congestion of the traffic congestion pattern D occurs. After that, the program advances to S109.

In S109, based on the latest vehicle speed information, whether the travel speed of the subject vehicle exceeds the traffic congestion clear-up threshold or not is determined. When it is determined in S109 that the travel speed is equal to or less than the traffic congestion clear-up threshold, the program returns to S104. On the other hand, when it is determined in S109 that the travel speed exceeds the traffic congestion clear-up threshold, the traffic congestion determining process of this time is finished.

The cut-in prediction unit 73 illustrated in FIG. 3 predicts occurrence of cut-in by detecting a sign of cut-in to the front of the subject vehicle by the adjacent vehicle Ad. As an example, based on the recognition information of the environment recognition unit 61 or the result of analysis of image data of the camera unit 31, the cut-in prediction unit 73 determines whether the turn signal lamp (winker) on the side of the subject vehicle lane of the adjacent vehicle Ad blinks or not. When the turn signal lamp on the subject vehicle lane side of the adjacent vehicle Ad blinks, the cut-in prediction unit 73 detects the operation of the turn signal lamp as a sign of cut-in. As another example, the cut-in prediction unit 73 may obtain detection information of another vehicle of the adjacent lane by a blind-spot monitor. In this case, approach of the adjacent vehicle Ad having the vehicle speed difference from the subject vehicle is detected as a sign of cut-in to the front of the subject vehicle.

The cut-in prediction unit 73 may detect transverse movement of the adjacent vehicle Ad which is offset in the lane toward the compartment line between the adjacent lane and the subject vehicle lane, as a sign of cut-in. Further, when the adjacent vehicle Ad has the automatic driving function, the cut-in prediction unit 73 may obtain a scheduled travel line of the adjacent vehicle Ad by vehicle-to-vehicle communication with the adjacent vehicle Ad. In this case, the cut-in prediction unit 73 can detect a sign of cut-in from the scheduled travel line of the adjacent vehicle AD which is scheduled to change the lane to the subject vehicle lane.

The cut-in determination unit 74 determines whether cut-in to the front of the subject vehicle by the adjacent vehicle Ad is actually executed or not. As an example, the cut-in determination unit 74 determines whether the adjacent vehicle Ad entered the subject vehicle lane or not on the basis of a result of recognition by the environment recognition unit 61 or a result of analysis of the image data by the camera unit 31. In the case where at least a part of the adjacent vehicle Ad crosses over the compartment line between the adjacent lane and the subject vehicle lane and enters the subject vehicle lane, the cut-in determination unit 74 determines that cut-in of the adjacent vehicle Ad is performed. In addition, in the case where lateral motion speed of the adjacent vehicle Ad toward the subject vehicle lane exceeds predetermined speed, the cut-in determination unit 74 may determine that the adjacent vehicle Ad is cutting in.

A part or all of the traffic congestion determining process by the traffic congestion determination unit 72, the cut-in predicting process based on the sign detection by the cut-in prediction unit 73, and the process of determining execution of cut-in by the cut-in determination unit 74 may be executed by the automatic driving system 50. In such a mode, the traffic congestion determination unit 72, the cut-in prediction unit 73, and the cut-in determination unit 74 obtain information indicating a result of process of the automatic driving system 50 in cooperation with the information acquisition unit 71. Specifically, the traffic congestion determination unit 72 determines whether or not there is a traffic congestion on the basis of the information obtained from the automatic driving system 50 in the automatic travel period. Similarly, the cut-in prediction unit 73 detects a sign of cut-in by the adjacent vehicle Ad on the basis of the information obtained from the automatic driving system 50. The cut-in determination unit 74 determines whether the adjacent vehicle Ad is cutting in or not on the basis of the information obtained from the automatic driving system 50.

The integration state estimation unit 75 obtains the driver state information generated by the driver monitor 29 from the information acquisition unit 71. The integration state estimation unit 75 determines the kind of the second task executed by the driver at least during the automatic travel period. Concretely, the integration state estimation unit 75 specifies the second task presently executed by the driver from a plurality of kinds of second tasks which are assumed in advance.

For example, viewing of content such as a movie or an audio book, viewing of a television, using of a smartphone or the like, and other actions (such as eating) are assumed in advance as second tasks. Referring to information of reproduction of content by the provision control unit 77, operation information transmitted from a smartphone or the like, and the like, the integration state estimation unit 75 selects the second task being executed in combination with the state information of the driver monitor 29. The integration state estimation unit 75 may estimate a second task executed by the driver from an image captured by a near-infrared camera by using, for example, a determination device (determination logic) or the like generated by machine learning or the like.

The process of specifying the second task executed by the driver may be performed by the driver monitor 29. In such a mode, the integration state estimation unit 75 obtains the information indicating the kind of the second task generated by the driver monitor 29 through the communication bus 99 and the information acquisition unit 71.

In the automatic travel period in which execution of a second task is allowed, the provision control unit 77 controls a method of providing the video content CTV (refer to FIG. 9) or the like which is provided in relation to the second task in accordance with the travel environment of the subject vehicle. When the traffic congestion determination unit 72 determines that the traffic around the subject vehicle is congested, the provision control unit 77 restricts provision of entertainment content or the like by the CID 22 in accordance with a traffic congestion pattern and the behavior of the adjacent vehicle Ad.

Concretely, in the automatic travel period in which execution of a second task is allowed, the provision control unit 77 displays an image of the second task mode including entertainment content such as video content CTV in the screen of the CID 22. As an example, display of the second task mode includes the video content CTV and the navigation map MP. In the second task mode, the screen of the CID 22 is divided in two upper/lower screen areas. The video content CTV is displayed in the screen area on the upper side (hereinbelow, a main display area DA1) so that it can be easily visibly recognized by the driver. On the other hand, the navigation map MP is displayed in the screen area on the lower side (hereinbelow, a sub-display area DA2).

A display item which is displayed together with the video content CTV or the like in the second task mode may be properly changed. In the second task mode, the video content CTV may be displayed in the entire screen of the CID 22. Further, content displayed in the second task mode may be set in advance by the driver or the like.

By switching a plurality of second task modes on the basis of the information and the like provided by the traffic congestion determination unit 72, the cut-in prediction unit 73, and the cut-in determination unit 74, the provision control unit 77 restricts display of the video content CTV. Concretely, a second task mode DMn illustrated in FIG. 9 is a display mode in the case where display of the video content CTV is not restricted. In such a second task mode DMn without restriction, the video content CTV is normally displayed in the main display area DA1. On the other hand, in each of second task modes DMr1 to DMr3 illustrated in FIGS. 10 to 12, display of entertainment content such as the video content CTV is restricted.

Figure 10:
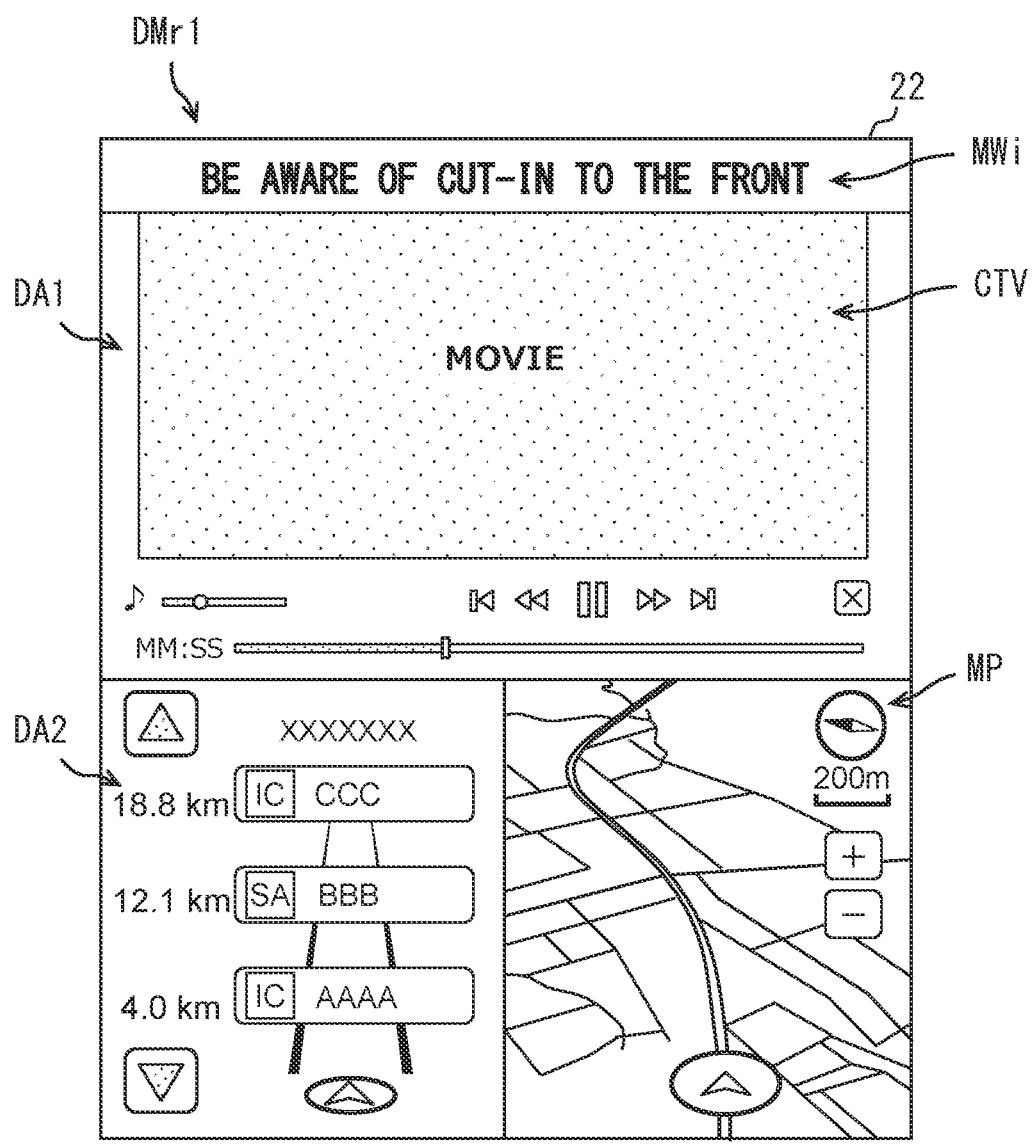

The second task mode DMr1 illustrated in FIG. 10 is a display mode in the case where display of the video content CTV is weakly restricted. The provision control unit 77 determines whether there is a traffic congestion in a specific pattern or not by referring to the result of determination of the traffic congestion pattern by the traffic congestion determination unit 72. In the traffic congestion patterns C and D, aggressive cut-in of the adjacent vehicle Ad desiring to move into the subject vehicle lane tends to occur. Consequently, in the provision control unit 77, the traffic congestion patterns C and D are registered as a traffic congestion in specific patterns in which cut-in to the front of the subject vehicle tends to occur. When the determination result by the traffic congestion determination unit 72 is the traffic congestion pattern C or D, the provision control unit 77 determines that there is a traffic congestion in the specific pattern and sets the second task mode DMr1.

In the second task mode DMr1, a cut-in possibility notice MWi is displayed in the main display area DA1. The cut-in possibility notice MWi is, for example, a display item including a message to call attention such as "be aware of cut-in to the front". The cut-in possibility notice MWi is displayed in a laterally-long band shape near the upper periphery of the main display area DA1. The cut-in possibility notice MWi overlaps a part of the video content CTV in the main display area DA1. Therefore, a most part of the video content CTV is displayed without being hidden by the cut-in possibility notice MWi. In addition, even when the cut-in possibility notice MWi is displayed, reproduction of the video image and sound of the video content CTV is continued. Consequently, viewing of the video content CTV by the driver can be continued without being substantially disturbed by additional display of the cut-in possibility notice MWi.

Figure 11:
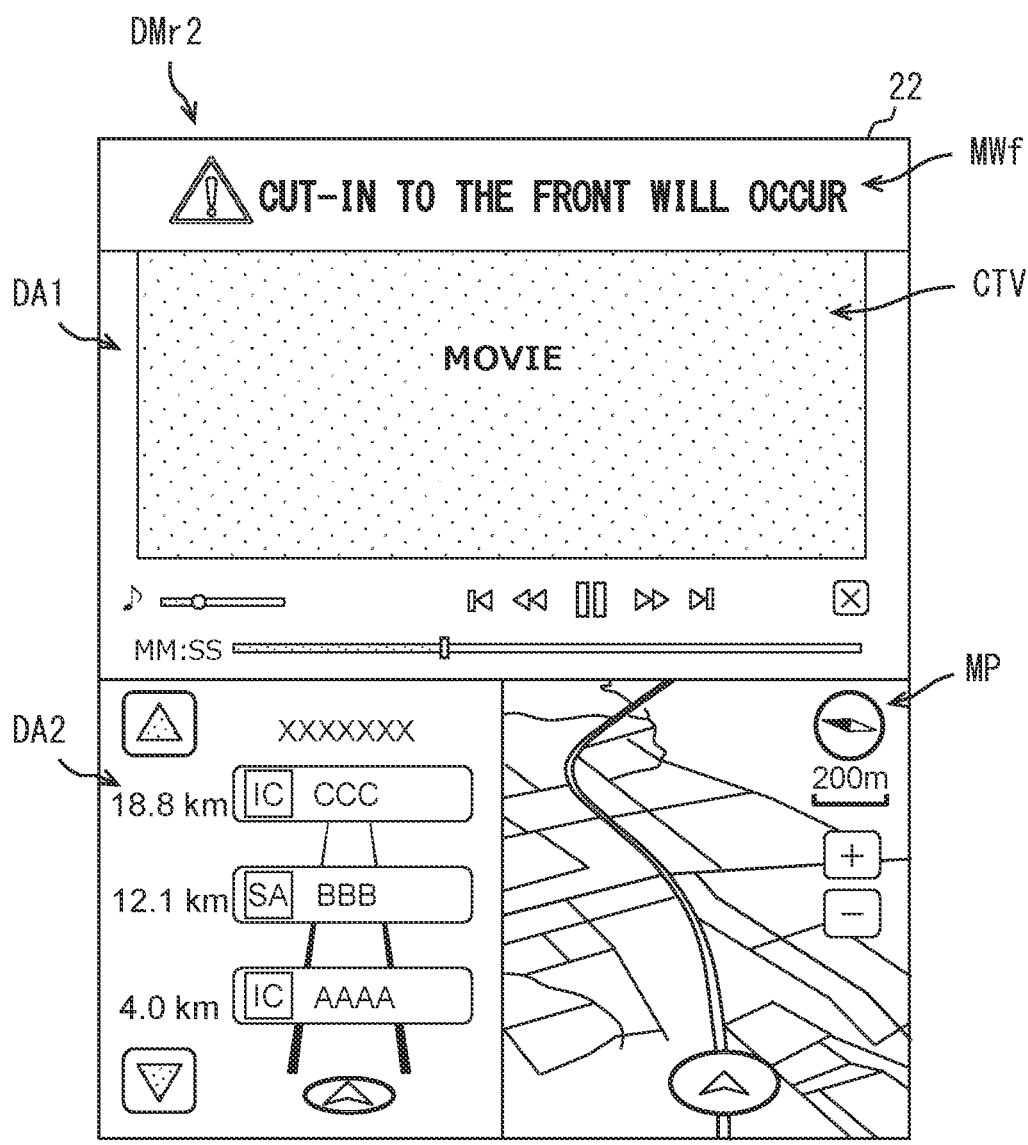

The second task mode DMr2 illustrated in FIG. 11 is a display mode in the case where intermediate restriction is applied to the display of the video content CTV. The provision control unit 77 refers to the result of detection of a cut-in sign by the cut-in prediction unit 73 and, in the case where the cut-in sign is detected, sets the display mode of the CID 22 to the second task mode DMr2. In the second task mode DMr2, the restriction on the display of the video content CTV is stronger than that in the second task mode DMr1. In such a manner, in the case where a cut-in sign is detected by the cut-in prediction unit 73, the provision control unit 77 restricts the display of the video content CTV more than the case where the traffic congestion determination unit 72 determines that there is a traffic congestion in the specific pattern.

In the second task mode DMr2, a cut-in prediction notice MWf is displayed in the main display area DA1. The cut-in prediction notice MWf is, for example, a display item including a message to call attention such as "cut-in to the front is occurring". The attention call by the cut-in prediction notice MWf is stronger than that by the cut-in possibility notice MWi (refer to FIG. 10) to make the driver recognize that the possibility of occurrence of cut-in is increasing.

Like the cut-in possibility notice MWi, the cut-in prediction notice MWf is displayed in a laterally-long band shape near the upper periphery of the main display area DA1 so as to overlap a part of the video content CTV. The height of the cut-in prediction notice MWf is larger than that of the cut-in possibility notice MWi. Therefore, the display area of the video content CTV in the second task mode DMr2 is narrower than that of the video content CTV in the second task mode DMr1 (refer to FIG. 10). As described above, in the second task mode DMr2, strengthening of the display restriction on the video content CTV is realized by decreasing the display area. On the other hand, although hidden by the cut-in prediction notice MWf, a large part of the video content CTV can be visibly recognized by the driver. In addition, even when the cut-in prediction notice MWf is added, reproduction of the video image and voice of the video content CTV is continued. Therefore, viewing of the video content CTV by the driver can be continued almost without hinderance also in the second task mode DMr2.

Figure 12:
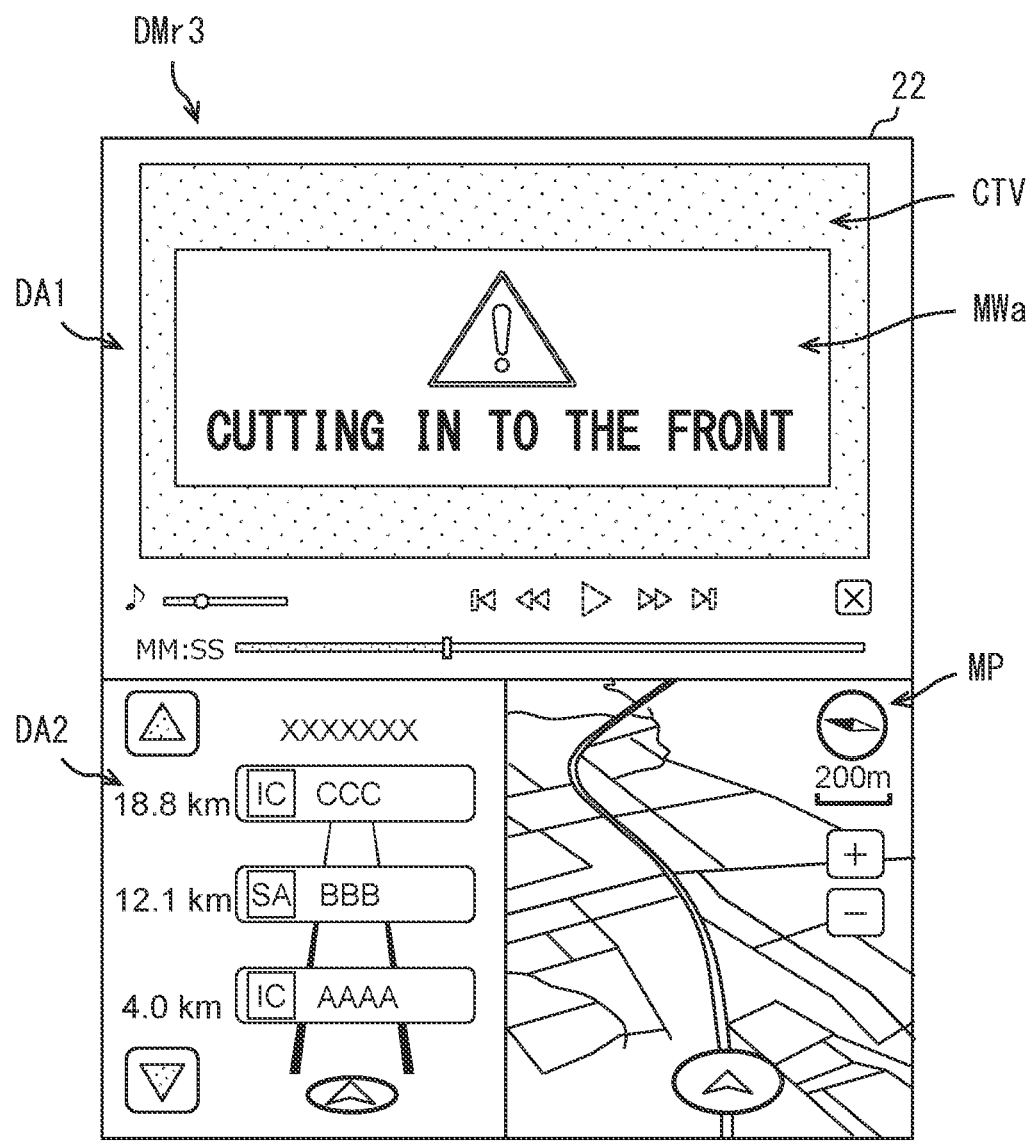
FIG. 12 is a diagram illustrating an example of display of a second task mode including a notice that a cut-in is occurring.

The second task mode DMr3 illustrated in FIG. 12 is a display mode in the case where strong restriction is applied to the display of the video content CTV. The provision control unit 77 refers to the result of determination of execution of the cut-in by the cut-in determination unit 74 and, in the case where the adjacent vehicle Ad is cutting in, sets the second task mode DMr3. In the second task mode DMr3, the restriction on display of the video content CTV is stronger than that in each of the second task modes DMr1 and DMr2. As described above, in the case where it is determined by the cut-in determination unit 74 that the adjacent vehicle Ad is cutting in, the provision control unit 77 restricts the display of the video content CTV more than the case where a sign of cutting-in is detected by the cut-in prediction unit 73. In addition, when it is determined by the cut-in determination unit 74 that the adjacent vehicle Ad is cutting in, the provision control unit 77 restricts the display of the video content CTV more than the case where the traffic congestion determination unit 72 determines that there is a traffic congestion in the specific pattern.

In the second task mode DMr3, a cut-in occurrence notice MWa is displayed in the main display area DA1. The cut-in occurrence notice MWa is, for example, a display item including an alert message such as "cut-in occurring". The alert by the cut-in occurrence notice MWa is stronger than the attention call by of the cut-in possibility notice MWi (refer to FIG. 10) and the cut-in prediction notice MWf (refer to FIG. 11).

The cut-in occurrence notice MWa is displayed so as to overlap the video content CTV in the center of the main display area DA1. The cut-in occurrence notice MWa has a laterally-long rectangular shape similar to the video content CTV. The display area of the cut-in occurrence notice MWa is larger than that of each of the cut-in possibility notice MWi and the cut-in prediction notice MWf. The cut-in occurrence notice MWa is displayed so as to overlap the center of the video content CTV and cover a most part of the video content CTV. In addition, when the cut-in occurrence notice MWa is displayed, reproduction of the video image and the voice of the video content CTV is interrupted. As described above, in the second task mode DMr3, strengthening of the display restriction on the video content CTV is realized by decrease of the display area and the reproduction interruption. As a result, viewing of the video content CTV by the driver is forcedly finished by determination on the system side.

Figure 13:
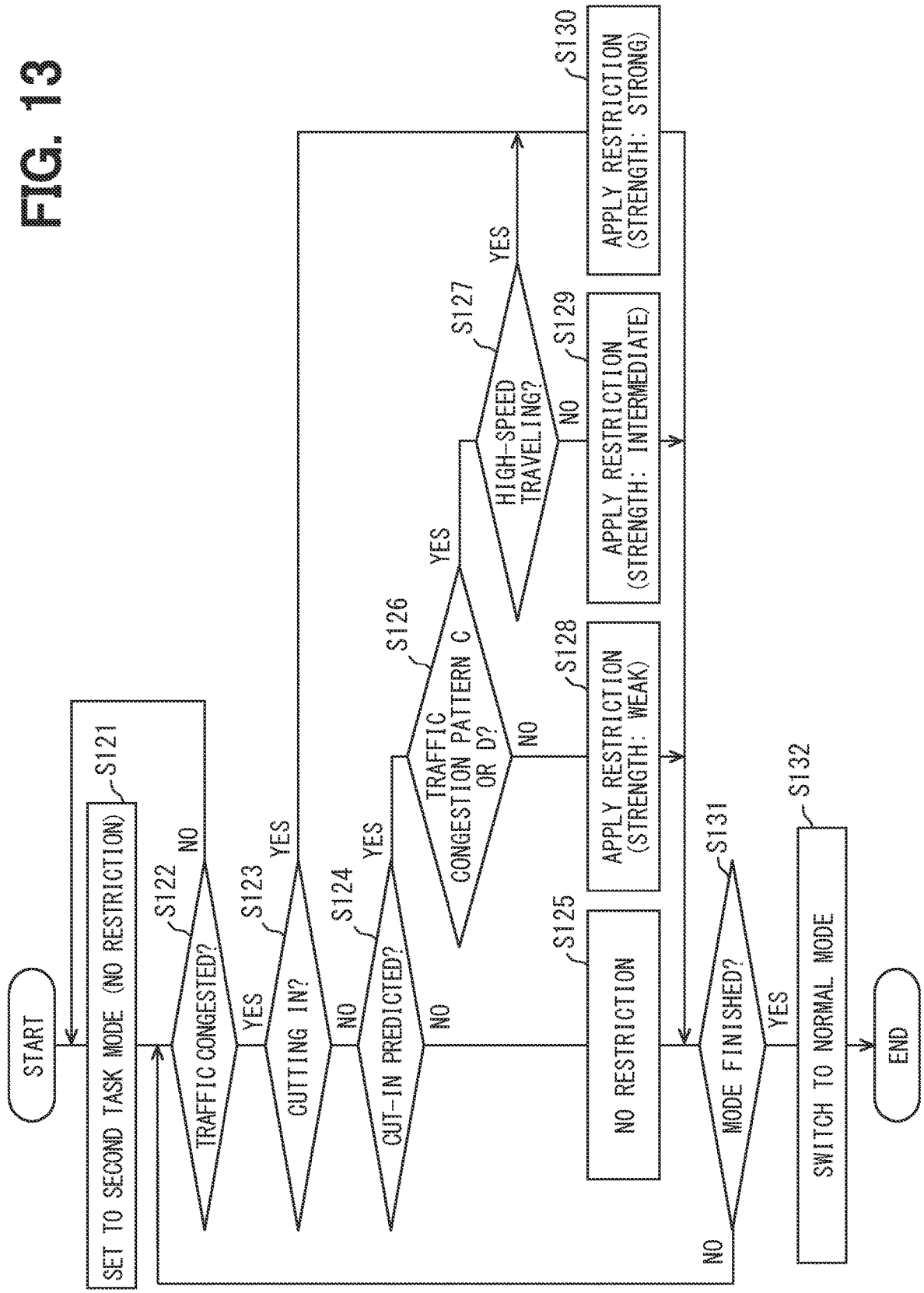
FIG. 13 is a flowchart illustrating the details of a content control process for adjusting restriction on display of entertainment content in a second task mode.

The details of the content control process of adjusting the restriction on the display of entertainment content by switching the second task mode as described above will be described with reference to FIGS. 9 to 12 on the basis of FIG. 13. The provision control unit 77 starts the content control process on the basis of a user operation of instructing reproduction start of the video content CTV or the like or acquisition of status information indicating the automatic travel start by the automatic driving ECU 50b.

In S121, the CID 22 is set to the second task mode DMn (refer to FIG. 9) in which display of the video content CTV is not restricted. After that, the program advances to S122. In S122, with reference to the result of determination of a traffic congestion by the traffic congestion determination unit 72, whether the surrounding of the subject vehicle is congested or not is determined. When it is determined in S122 that there is no traffic congestion, the program returns to S121 and makes the second task mode DMn without restriction continued. On the other hand, when it is determined in S122 that there is a traffic congestion, the program advances to S123.

In S123, referring to the result of determination of the cut-in determination unit 74, whether the adjacent vehicle Ad is cutting in to the front of the subject vehicle or not is determined. When it is determined in S123 that the adjacent vehicle Ad is cutting in, the program advances to S130. In S130, the second task mode DMr3 (refer to FIG. 12) in which display of the video content CTV is strongly restricted is set. After that, the program advances to S131. In S130, the cut-in occurrence notice MWa is displayed so as to overlay on the video content CTV. On the other hand, when it is determined in S123 that the adjacent vehicle Ad is not cutting in, the program advances to S124.

In S124, with reference to the result of determination by the cut-in prediction unit 73, whether a sign of cut-in by the adjacent vehicle Ad is detected or not, that is, the presence/absence of a sign of the cut-in prediction is determined. When it is determined in S124 that there is no cut-in predication of the adjacent vehicle Ad, the program advances to S125. In S125, the second task mode DMn without restriction (refer to FIG. 9) is set. After that, the program advances to S131. On the other hand, when it is determined in S124 that there is cut-in prediction of the adjacent vehicle Ad, the program advances to S126.

In S126, referring to the result of determination of the traffic congestion pattern by the traffic congestion determination unit 72, whether the subject vehicle is in a traffic congestion of a specific pattern or not is determined. When a traffic congestion which is not in a specific pattern (hereinbelow, non-specific pattern) is determined in S126, that is, the determination result indicates the traffic congestion pattern A or B, the program advances to S128. In S128, the second task mode DMr1 (refer to FIG. 10) in which display of the video content CTV is weakly restricted is set. After that, the program advances to S131. By S128, the cut-in possibility notice MWi is additionally displayed in the upper periphery of the main display area DA1.

When it is determined in S126 that there is a traffic congestion in the specific pattern, that is, when the determination result indicates the traffic congestion pattern C or D, the program advances to S127. In S127, whether the travel speed of the subject vehicle in the traffic congestion exceeds speed threshold (for example, about 30 km/h) or not is determined. When it is determined in S127 that the travel speed is less than the speed threshold and the subject vehicle is travelling at low speed (such as 0 to 29 km/h), the program advances to S129. In S129, the second task mode DMr2 (refer to FIG. 11) in which intermediate restriction is applied to the display of the video content CTV is set. After that, the program advances to S131. By S129, the cut-in prediction notice MWf is additionally displayed in the upper periphery of the main display area DA1.

When it is determined in S127 that the travel speed is equal to or higher than the speed threshold and the subject vehicle is traveling at high speed (about 30 to 50 km/h), the second task mode DMr3 is set in S130, and the program advances to S131.

In S131, whether the second task mode is finished or not is determined. As an example, in the case where a user operation for finishing the display of the video content CTV is performed, in S131, second task mode termination is determined. As another example, in the case where status information indicating termination or interruption of the automatic driving of Level 3 by the automatic driving ECU 50b is obtained, in S131, the second task mode termination is determined. When continuation of the second task mode is determined in S131, the program returns to S122 and continues provision of the video content CTV and the like to the driver. By the above operations, for example, even in the case where the traffic congestion pattern to be determined shifts from the non-specific pattern to the specific pattern, by switching the second task mode, adjustment of strengthening the restriction on display of the video content CTV is performed.

On the other hand, when it is determined in S131 to finish the second task mode, the program advances to S132. In S132, the screen of the CID 22 is switched from the second task mode to the normal mode, and the series of content control processes are finished. In the CID 22 in the normal mode, in addition to the navigation map MP, status display of the vehicle Am, an image of the rear camera, or the like may be displayed.

The provision control unit 77 illustrated in FIG. 3 changes the allowable range of second tasks allowed to the driver in the automatic travel period on the basis of the provision information of the traffic congestion determination unit 72. In the case of the traffic congestion in the non-specific pattern, the provision control unit 77 adjusts so as to widen the allowable range of the second tasks allowed to the driver more than the case of the traffic congestion in the specific pattern.

Specifically, in take-over of driving from the automatic driving system 50 to the driver, handover of handing over the control right to the driver in a planned manner by the decision on the system side and override of obtaining the control right by the determination of the driver himself/herself in a high emergency situation exist. The take-over of driving from the automatic driving system 50 to the driver by making the driver interrupt the second task which is being performed corresponds to the handover.

In the case of simply viewing the video content CTV displayed on the CID 22, both hands of the driver are free. Consequently, the driver can promptly respond to a request of driving take-over for the handover. Consequently, the operation of the CID 22 including viewing of the video content CTV is a second task which is easily allowed. On the other hand, in the case of performing the operation of the user terminal and having a meal, both hands or one of the hands of the driver are/is occupied. It is consequently not easy for a driver to promptly respond to the request of driving take-over for the handover. Therefore, the operation of the user operation and the action such as having a meal are second tasks which are not easily allowed.

By the above-described reasons, when the subject vehicle automatically travels in a traffic congestion of a non-specific pattern in which the frequency of cut-in occurrence is relatively low, the provision control unit 77 includes not only the operation of the CID 22 but also the operations of the user terminal and actions such as having a meal in the allowable range of the second tasks. On the other hand, when the subject vehicle automatically travels in a traffic congestion of a specific pattern in which the frequency of cut-in occurrence is relatively high, the operation of the CID 22 is included in the allowable range of the second tasks but the operation of the user terminal and the actions such as having a meal are excluded from the allowable range of the second tasks.

Figure 14:
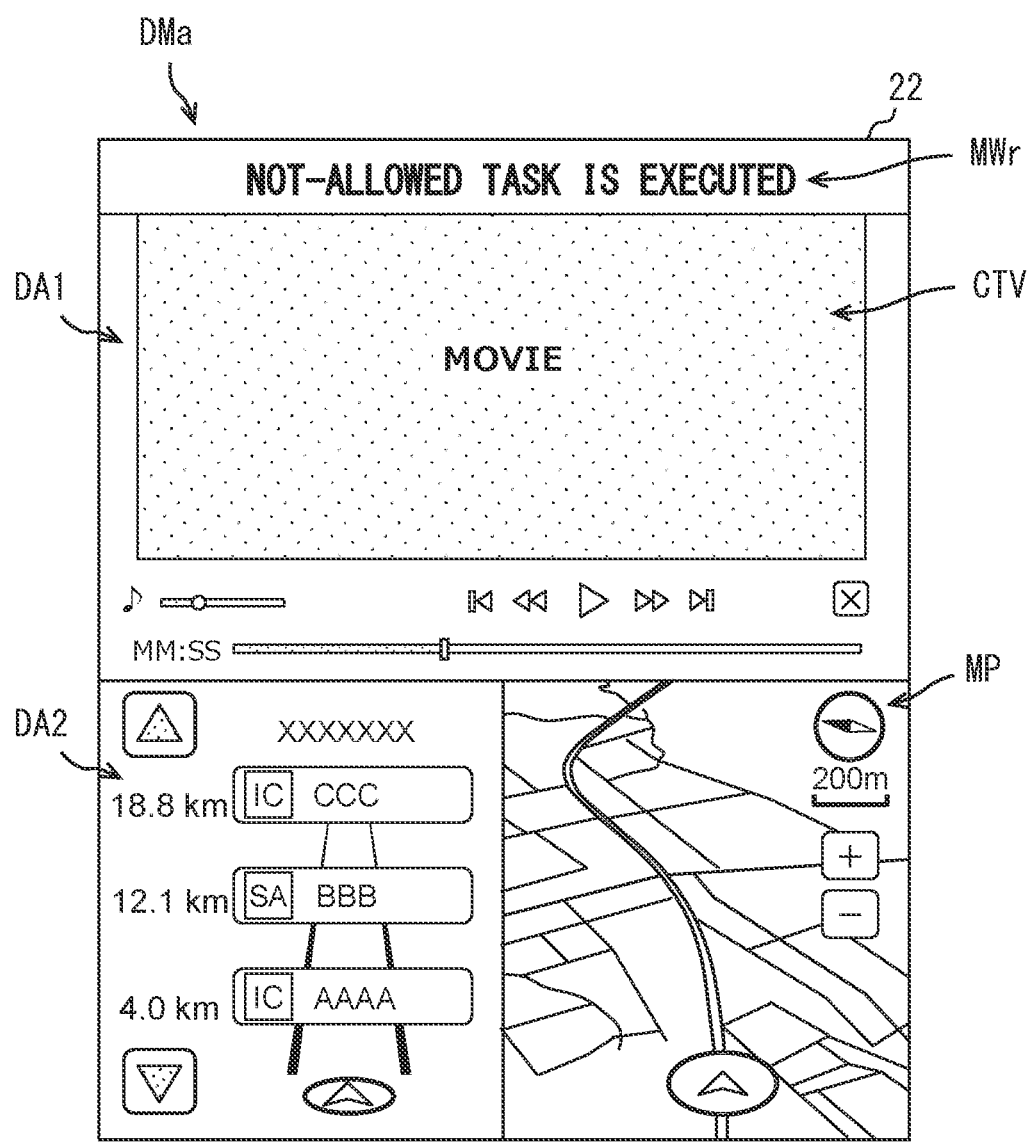
FIG. 14 is a diagram illustrating an example of display of a second task mode including a notice in the case where the driver performs an unallowed second task.

In the second task mode DMa in the case where a second task which is being executed and specified by the integration state estimation unit 75 is of a kind which is out of the allowable range, as illustrated in FIG. 14, the provision control unit 77 displays an interruption request notice MWr in the main display area DA1 of the CID 22. The interruption request notice MWr is, for example, a display item including a message to call attention such as "not-allowed task is executed". The interruption request notice MWr is displayed in a laterally-long band shape near the upper periphery of the main display area DA1 so as to overlap a part of the video content CTV. In addition, the provision control unit 77 makes the audio device 24 reproduce a voice message requesting interruption of the task being executed in addition to the display of the interruption request notice MWr.

Hereinafter, the details of the range control process of controlling the allowable range of second tasks and the state monitoring process of monitoring the driver state and calling attention to execution of a not-allowed task as described above will be described on the basis of FIGS. 15 and 16 with reference to FIGS. 3 and 14. Based on acquisition of status information indicating the automatic travel start by the automatic driving ECU 50b, the provision control unit 77 starts the range control process and the state monitoring process. Until the automatic travel by the automatic driving ECU 50b is finished, the provision control unit 77 repeatedly starts the range control process and the state monitoring process in predetermined cycles.

Figure 15:
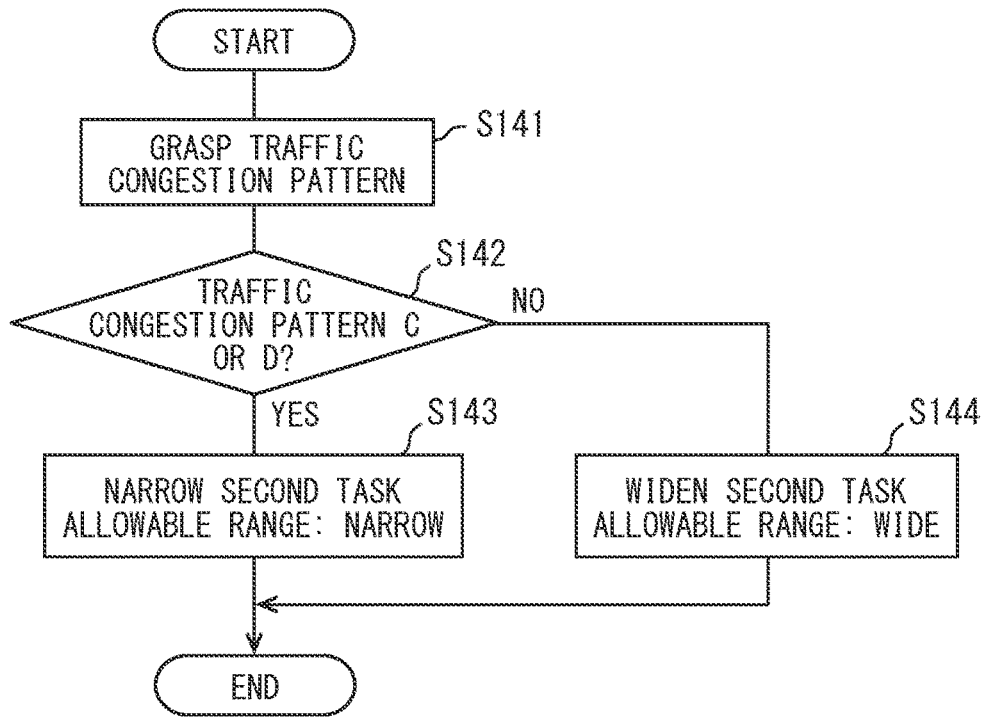
FIG. 15 is a flowchart illustrating the details of a range control process for controlling an allowable range of second tasks.

In S141 of the range control process illustrated in FIG. 15, with reference to a traffic congestion pattern determination result by the traffic congestion determination unit 72, the traffic congestion pattern of the surrounding of the subject vehicle is grasped. After that, the program advances to S142. In S142, whether there is a traffic congestion in the specific pattern or not is determined. When it is determined in S142 that there is a traffic congestion in the specific pattern, that is, when the determination result indicates the traffic congestion pattern C or D, the program advances to S143. In S143, the second task allowable range is narrowly set so that actions such as operation of the user terminal and having a meal are not allowed, and the range control process of this time is finished.

On the other hand, when it is determined in S142 that there is a traffic congestion in a not-specific pattern, that is, the determination result indicates the traffic congestion pattern A or B, the program advances to S144. In S144, the second task allowable range is set widely so as to allow actions such as operation of the user terminal and having a meal, and the range control process of this time is finished.

Figure 16:
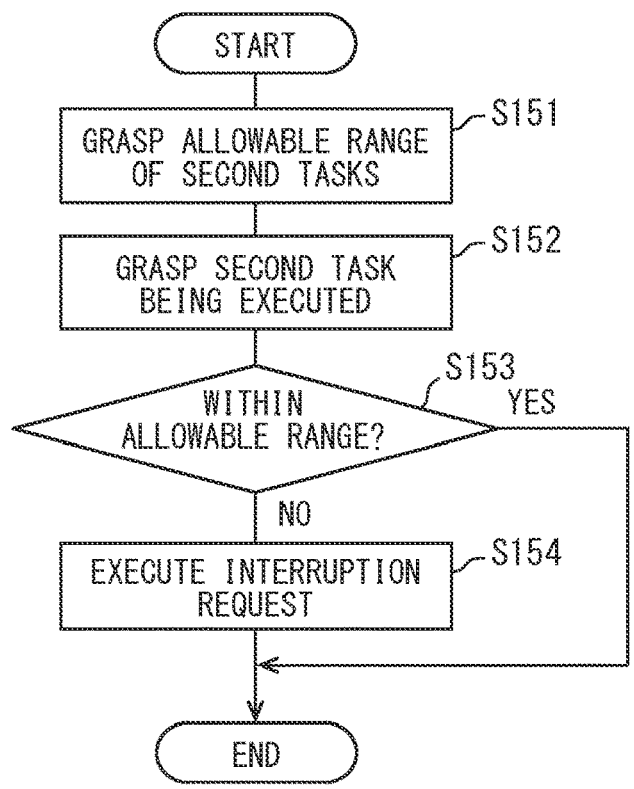
FIG. 16 is a diagram illustrating the details of a state monitoring process for monitoring the state of the driver on the basis of the allowable range of second tasks.

In S151 of the state monitoring process illustrated in FIG. 16, the second task allowable range which is set by the range control process (refer to FIG. 15) is grasped. After that, the program advances to S152. In S152, the second task being presently executed by the driver is grasped. After that, the program advances to S153. In S153, whether the second task being executed and grasped in S152 lies within the present allowable range which is grasped in S151 or not is determined. When it is determined in S153 that the second task being executed lies within the allowable range, the state monitoring process of this time is finished.

On the other hand, when it is determined in S153 that the second task being executed lies out of the allowable range, the program advances to S154. In S154, a request to interrupt the second task being executed is output to the driver, and the state monitoring process of this time is finished. By S154, the interruption request notice MWr is additionally displayed in the CID 22 (refer to FIG. 14).

In the first embodiment described above, at the time of travel in a traffic congestion by the automatic driving function, when a sign of cut-in to the front by the adjacent vehicle Ad is detected, display of the video content CTV provided to the driver is restricted. Therefore, prediction of occurrence of cut-in of the adjacent vehicle Ad is notified to the driver by a display change occurring in the video content CTV being provided. By such a notice, at the time of travel in a traffic congestion by the automatic driving function, anxiety of the driver is lessened.

Specifically, when cut-in of the adjacent vehicle Ad occurs, the automatic driving function executes, for example, braking control so as to assure the distance to the adjacent vehicle Ad. Such a behavior change of the vehicle gives an abrupt feeling to the driver who is paying attention to the video content CTV and does not grasp the situation around the subject vehicle, and it easily causes anxiety of the driver. Therefore, by making a display change in the video content CTV when a sign of cut-in is detected, the driver can recognize the possibility of occurrence of a behavior change in advance before a behavior change actually occurs in the subject vehicle. As a result, when cut-in occurs in reality, the anxiety of the driver caused by the behavior change in the subject vehicle can be lessened.

In addition, in the first embodiment, at the time of travel in a traffic congestion by the automatic driving function, when a traffic congestion of a specific pattern in which cut-in of the adjacent vehicle Ad tends to occur is determined, display of the video content CTV provided to the driver is restricted. Therefore, the possibility of occurrence of cut-in of the adjacent vehicle Ad can be notified to the driver by a display change made in the video content CTV which is being provided. By such a notice, at the time of travel in a traffic congestion by the automatic driving function, anxiety of the driver is lessened.

As described above, in the case of a traffic congestion in a specific pattern in which cut-in tends to occur, by making a display change in the video content CTV, the driver can preliminarily recognize the possibility of occurrence of a behavior change before a behavior change actually occurs in the subject vehicle. As a result, when cut-in occurs in reality, the anxiety of the driver for the behavior change in the subject vehicle can be lessened.

In the first embodiment, at the time of travel in a traffic congestion by the automatic driving function, when a traffic congestion of a specific pattern in which cut-in of the adjacent vehicle Ad tends to occur is determined, the allowable range of specific actions allowed to the driver is narrowed. Therefore, when there is the possibility of occurrence of cut-in of the adjacent vehicle Ad, a second task in which anxiety is easily caused is not allowed by a change of the allowable range. As a result, at the time of travel in a traffic congestion by the automatic driving function, anxiety of the driver is lessened.

As described above, in the case of a traffic congestion of a specific pattern in which cut-in tends to occur, by preliminarily interrupting a second task by which response is difficult, the driver can preliminarily recognize the possibility of occurrence of a behavior change before a behavior change actually occurs in the subject vehicle. As a result, when cut-in occurs in reality, the anxiety of the driver felt for the behavior change in the subject vehicle can be lessened.

Further, in the first embodiment, when it is determined by the cut-in determination unit 74 that the adjacent vehicle Ad is cutting in, display of the video content CTV is restricted more than the case where a sign of cut-in of the adjacent vehicle Ad is detected by the cut-in prediction unit 73.

In addition, in the first embodiment, when it is determined by the cut-in determination unit 74 that the adjacent vehicle Ad is cutting in, display of the video content CTV is restricted more than the case where a traffic congestion in a specific pattern is determined by the traffic congestion determination unit 72.

As described above, when display of the video content CTV is strongly restricted, the attention of the driver tends to be paid to the circumstance around the subject vehicle apart from the video content CTV. As a result, the driver can predict a behavior change of the subject vehicle caused by cut-in of the adjacent vehicle Ad. Therefore, the anxiety of the driver for an actual behavior change can be lessened.

On the other hand, in the case where cut-in is not executed actually, by lessening restriction on display of the video content CTV, the driver can continue viewing the video content CTV while paying attention to the situation around the subject vehicle. As a result, while lessening the anxiety of the driver, attention call which is not bothersome can be made.

In the first embodiment, the display restriction in the case where a traffic congestion of a specific pattern is determined by the traffic congestion determination unit 72 is made weaker than that in the case where a sign of cut-in of the adjacent vehicle Ad is detected by the cut-in prediction unit 73. According to the above, attention call which does not disturb viewing of the video content CTV can be made while making the attention of the driver being paid to the surround of the subject vehicle.

Further, in the first embodiment, whether the travel speed of the subject vehicle in a traffic congestion exceeds a speed threshold or not is determined by the provision control unit 77. In the case where the travel speed of the subject vehicle exceeds the speed threshold, display of content is restricted more than the case where the travel speed is less than the speed threshold. As described above, when the travel speed increases, it becomes difficult to assure time to call attention on the basis of detection of a sign. Therefore, by the process of strengthening the display restriction on the video content CTV during high-speed travel, the driver pays attention to the surrounding of the subject vehicle early and can recognize the possibility of occurrence of a behavior change with enough time.

In the foregoing embodiment, the video content CTV corresponds to "content", the provision control unit 77 corresponds to "provision restricting unit", and the HCU 100 corresponds to "presentation control device". As described above, the traffic congestion patterns A and B correspond to a traffic congestion of "non-specific pattern", and the traffic congestion patterns C and D correspond to a traffic congestion of "specific pattern".

Second Embodiment

A second embodiment of the present disclosure illustrated in FIGS. 17 to 35 is a modification of the first embodiment. In the second embodiment, in the case where the vehicle Am travels in a traffic congestion by the automatic driving function, the situation on the backward of the vehicle Am is grasped, and display restriction on the video content CTV is executed according to prediction of collision from the backward.

Figure 17:
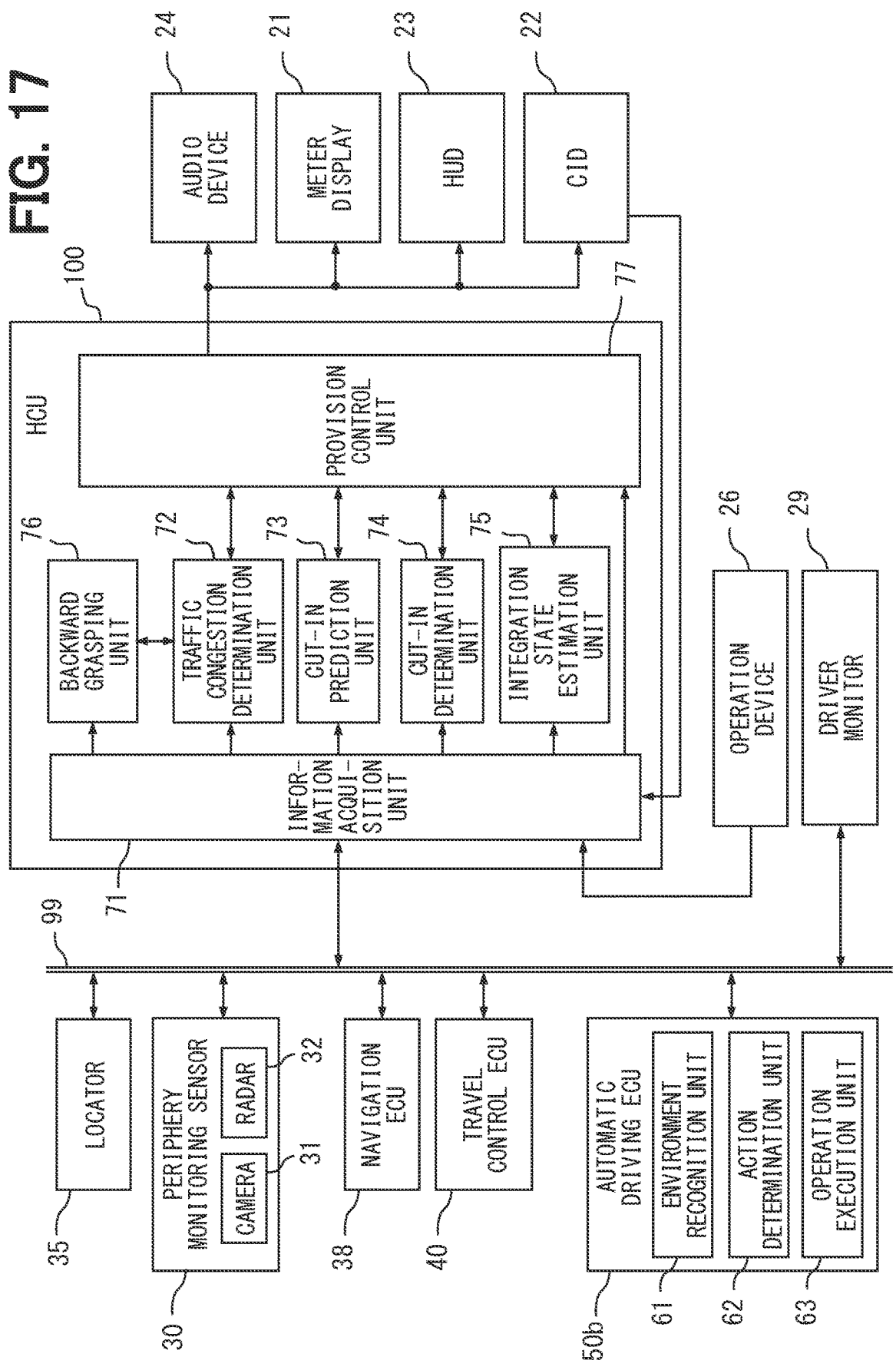
FIG. 17 is a diagram illustrating an example of function units configured in an HCU according to a second embodiment together with related components.

The periphery monitoring sensor 30 illustrated in FIG. 17 further has, in addition to the camera unit 31 and the millimeter-wave radar 32 detecting the front and sides of the subject vehicle, the camera unit 31 and the millimeter-wave radar 32 whose detection ranges are the backward and the diagonally backward sides of the subject vehicle. The periphery monitoring sensor 30 detects a backward vehicle Ab (refer to FIG. 18) and diagonally backward vehicles Abs (refer to FIG. 18) in addition to the forward vehicle Af and the adjacent vehicles Ad as other vehicles travelling around the subject vehicle. The periphery monitoring sensor 30 can use detection configurations such as a LiDAR and a sonar in addition to the camera unit 31 and the millimeter-wave radar 32 to detect the backward vehicle Ab and the diagonally backward vehicles Abs. The periphery monitoring sensor 30 provides detection information on the backward of the subject vehicle to the automatic driving system 50.

On the basis of the detection information of the backward of the subject vehicle by the peripheral monitoring sensor 30, the environment recognition unit 61 of the automatic driving system 50 grasps relative positions, relative speeds, and the like of the backward vehicle Ab and the diagonally backward vehicle Abs. The environment recognition unit 61 recognizes, as backward vehicles Ab, a close backward vehicle Ab1 (refer to FIG. 18) travelling in the subject vehicle lane in a position close to the subject vehicle and a far backward vehicle Abs (refer to FIG. 25) traveling in a position apart from the subject vehicle more than the close backward vehicle Ab1. The environment recognition unit 61 discriminates the close backward vehicle Ab1 and the far backward vehicle Ab2 from each other on the basis of the distance from the subject vehicle, relative speed (inter-vehicle time), and the like. As an example, the close backward vehicle Ab1 is another vehicle which travels and follows the subject vehicle with a common-sense interval (a few meters to ten-odd meters) at the time of a traffic congestion. The far backward vehicle Ab2 is not limited to another vehicle travelling on the subject vehicle lane but may be another vehicle travelling on an adjacent lane. Both the distance from the subject vehicle to the close backward vehicle Ab1 and the distance from the subject vehicle to the far backward vehicle Ab2 are stable. The environment recognition unit 61 recognizes, as the diagonally backward vehicle Abs, another vehicle positioned on the backward of the subject vehicle and travelling in an adjacent lane close to the subject vehicle. The environment recognition unit 61 provides the result of recognition of the backward vehicle Ab and the diagonally backward vehicle Abs together with the recognition result of other travel environments to the HCU 100.

The HCU 100 further has a backward grasping unit 76 as a function unit of managing execution of a second task of the driver during automatic travel in a traffic congestion section. The backward grasping unit 76 grasps the existence of the backward vehicle Ab and the diagonally backward vehicle Abs travelling backward of the vehicle Am on the basis of the recognition result obtained from the environment recognition unit 61 via the information acquisition unit 71.

Based on the information of the backward vehicle Ab and the diagonally backward vehicle Abs grasped by the backward grasping unit 76, the traffic congestion determination unit 72 determines a traffic congestion pattern of the surrounding of the subject vehicle in the automatic travel period in a traffic congestion (Level 3 at the time of a traffic congestion). The traffic congestion determination unit 72 specifies a traffic congestion pattern to which the traffic congestion of the surrounding of the subject vehicle at present corresponds among traffic congestion patterns E to H, J, and K (refer to FIGS. 18 to 26 and FIG. 31) in addition to the traffic congestion patterns A to D (refer to FIGS. 4 to 7) of the first embodiment.

Figure 18:
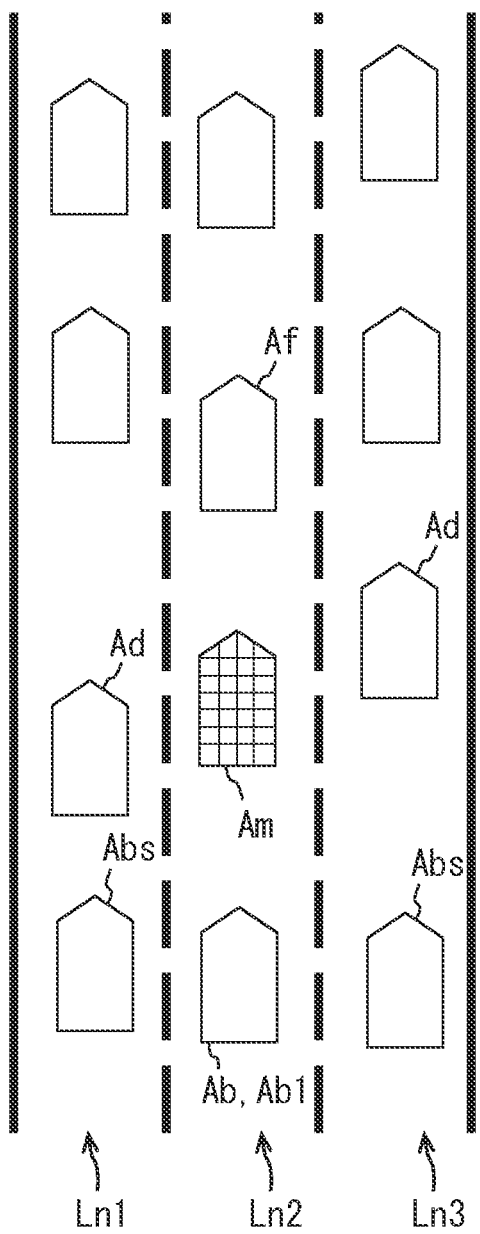
FIG. 18 is a diagram schematically illustrating an example of a traffic congestion pattern E.
Figure 19:
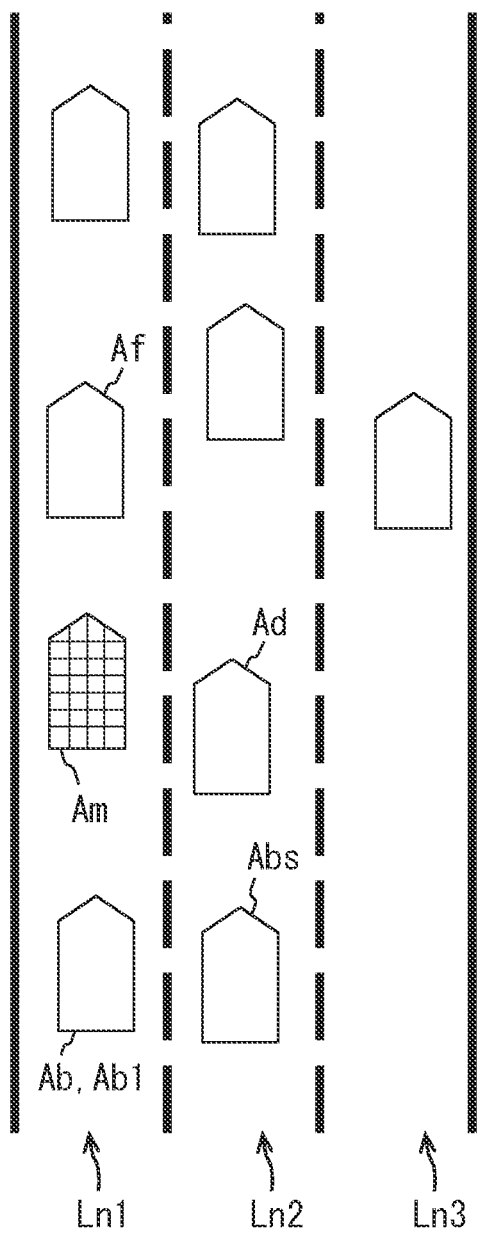
FIG. 19 is a diagram schematically illustrating another example of the traffic congestion pattern E.

The traffic congestion pattern E illustrated in FIGS. 18 and 19 is a state in which the surrounding of the vehicle Am is filled with other vehicles. In the case where all of the forward vehicle Af and the adjacent vehicles Ad, in addition, the close backward vehicle Ab1 and the diagonally backward vehicles Abs exist, the traffic congestion determination unit 72 determines the traffic congestion of the pattern E. The traffic congestion pattern E illustrated in FIG. 18 is premised on the traffic congestion pattern A (refer to FIG. 4), and the vehicle Am and the close backward vehicle Ab1 travel on the center lane Ln2 of the road including three or more lanes. The diagonally backward vehicles Abs exist on both the left-end lane Ln1 and the right-end lane Ln3. The traffic congestion pattern E illustrated in FIG. 19 is premised on the traffic congestion pattern B (refer to FIG. 5), and the vehicle Am and the close backward vehicle Ab1 travel on the left-end lane Ln1 or the right-end lane Ln3. The diagonally backward vehicle Abs travels on the center lane Ln2.

Figure 20:
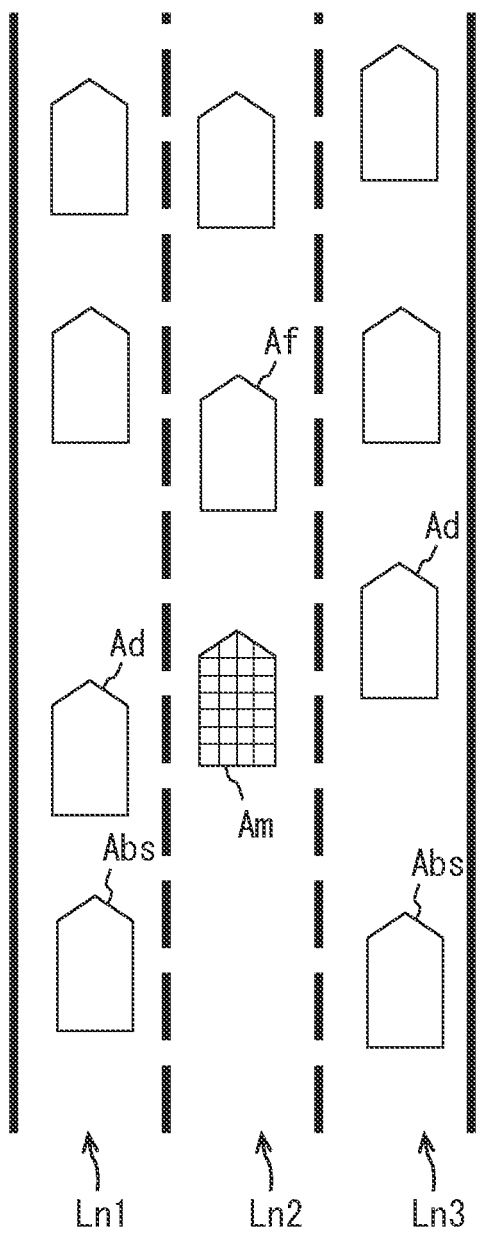
FIG. 20 is a diagram schematically illustrating an example of a traffic congestion pattern F.
Figure 21:
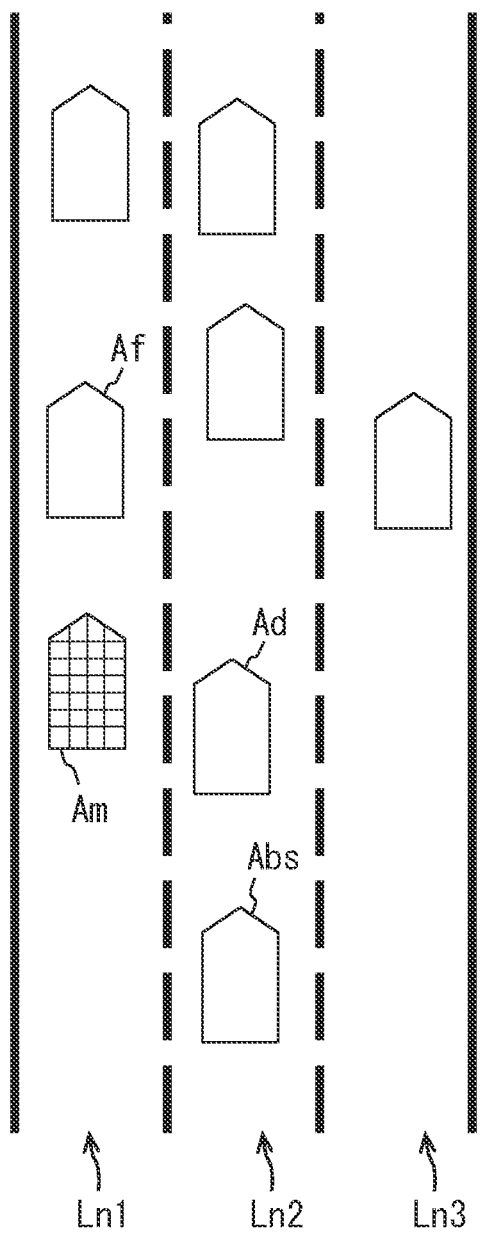
FIG. 21 is a diagram schematically illustrating another example of the traffic congestion pattern F.

The traffic congestion pattern F illustrated in FIGS. 20 and 21 indicates a state where only the backward of the subject vehicle lane is empty. In the case where the front vehicle Af, the adjacent vehicles Ad, and the diagonally backward vehicles Abs exist, on the other hand, the backward vehicle Ad (close backward vehicle Ab1) does not exist, the traffic congestion determination unit 72 determines a traffic congestion of the pattern F. The traffic congestion pattern F illustrated in FIG. 20 is premised on the traffic congestion pattern A (refer to FIG. 4), and illustrates a state that the backward of the vehicle Am travelling on the center lane Ln2 is empty. On the other hand, the diagonally backward vehicles Abs exist on both of the left-end lane Ln1 and the right-end lane Ln3. The traffic congestion pattern F illustrated in FIG. 21 is premised on the traffic congestion pattern B (refer to FIG. 5) and illustrates a state that the backward of the vehicle Am traveling on the left-end lane Ln1 or the right-end lane Ln3 is empty. On the other hand, the diagonally backward vehicle Abs exists in the center lane Ln2.

Figure 22:
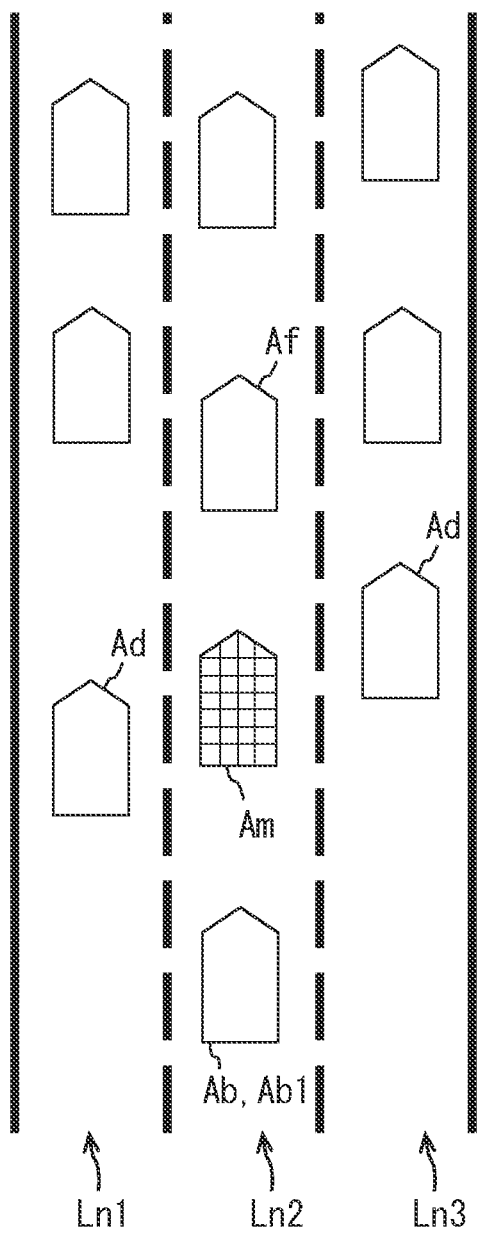
FIG. 22 is a diagram schematically illustrating an example of a traffic congestion pattern G.
Figure 23:
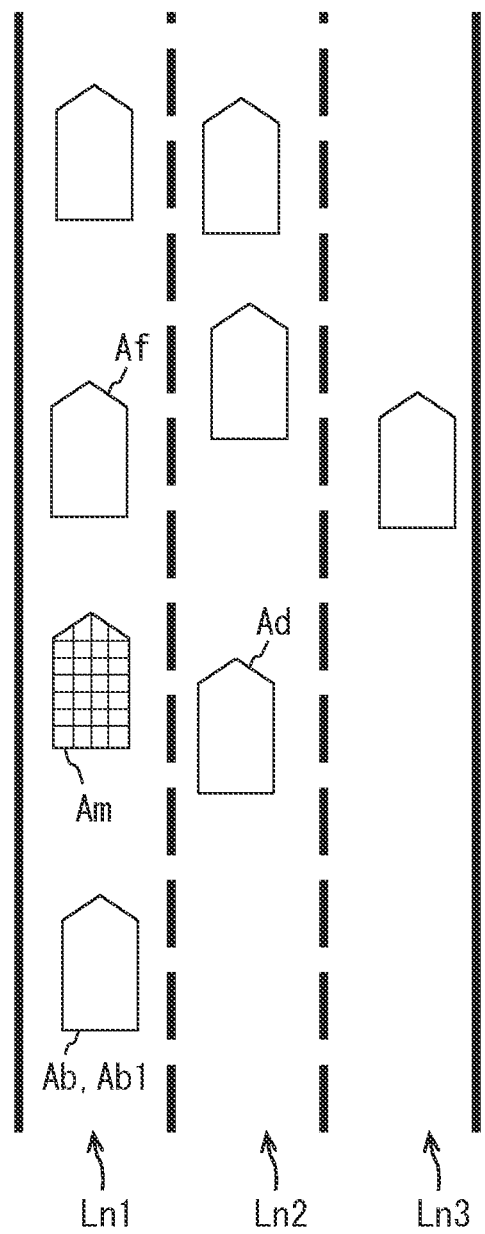
FIG. 23 is a diagram schematically illustrating another example of the traffic congestion pattern G.

The traffic congestion pattern G illustrated in FIGS. 22 and 23 illustrates a state where only the backwards of the lanes (adjacent lanes) other than the subject vehicle lane are empty. The traffic congestion determination unit 72 determines a traffic congestion of the pattern G in the case where the front vehicle Af, the adjacent vehicles Ad, and the backward vehicle Ab (close backward vehicle Ab1) exist, on the other hand, the diagonally backward vehicle Abs does not exist. The traffic congestion pattern G illustrated in FIG. 22 is premised on the traffic congestion pattern A (refer to FIG. 4), and the vehicle Am and the close backward vehicle Ab1 travel in the center lane Ln2. On the other hand, there is a space in which the diagonally backward vehicle Abs does not exist in at least one of the left-end lane Ln1 and the right-end lane Ln3. The traffic congestion pattern G illustrated in FIG. 23 is premised on the traffic congestion pattern B (refer to FIG. 5), and the vehicle Am and the close backward vehicle Ab1 travel on the left-end lane Ln1 or the right-end lane Ln3. On the other hand, there is a space in which the diagonally backward vehicle Abs does not exist in the center lane Ln2.

Figure 24:
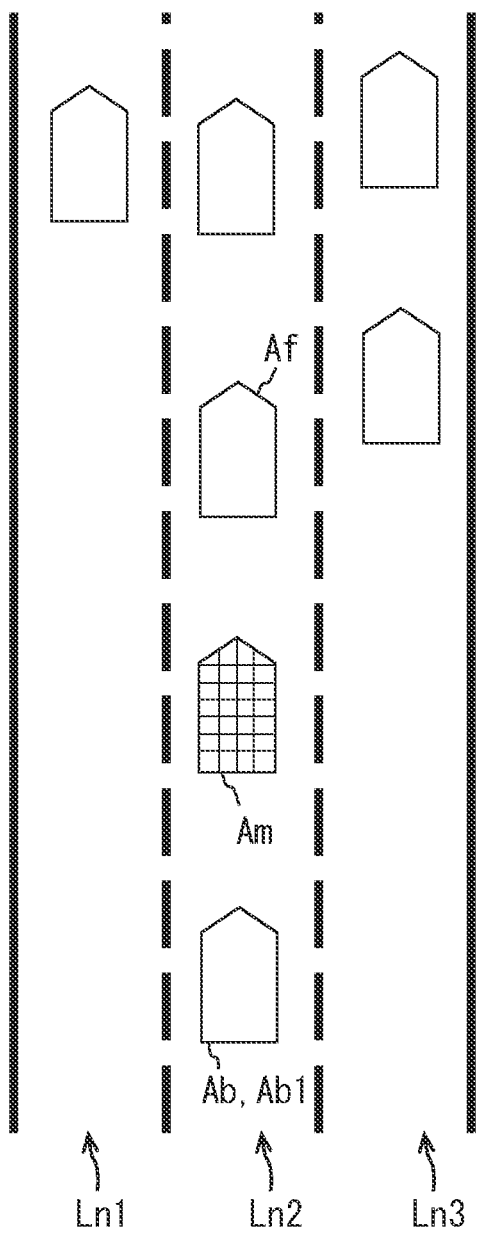
FIG. 24 is a diagram schematically illustrating an example of a traffic congestion pattern H.

The traffic congestion pattern H illustrated in FIG. 24 indicates a state where lanes (adjacent lanes) other than the subject vehicle lane are empty. The traffic congestion determination unit 72 determines a traffic congestion of the pattern H in the case where the forward vehicle Af and the backward vehicle (close backward vehicle Ab1) exist and, on the other hand, the diagonally backward vehicle Abs do not exist. The traffic congestion pattern H is premised on the traffic congestion pattern C (refer to FIG. 6), and the vehicle Am and the close backward vehicle Ab1 travel on the center lane Ln2. On the other hand, there is a space in which the adjacent vehicle Ad and the diagonally backward vehicle Abs do not exist in at least one of the left-end lane Ln1 and the right-end lane Ln3.

Figure 25:
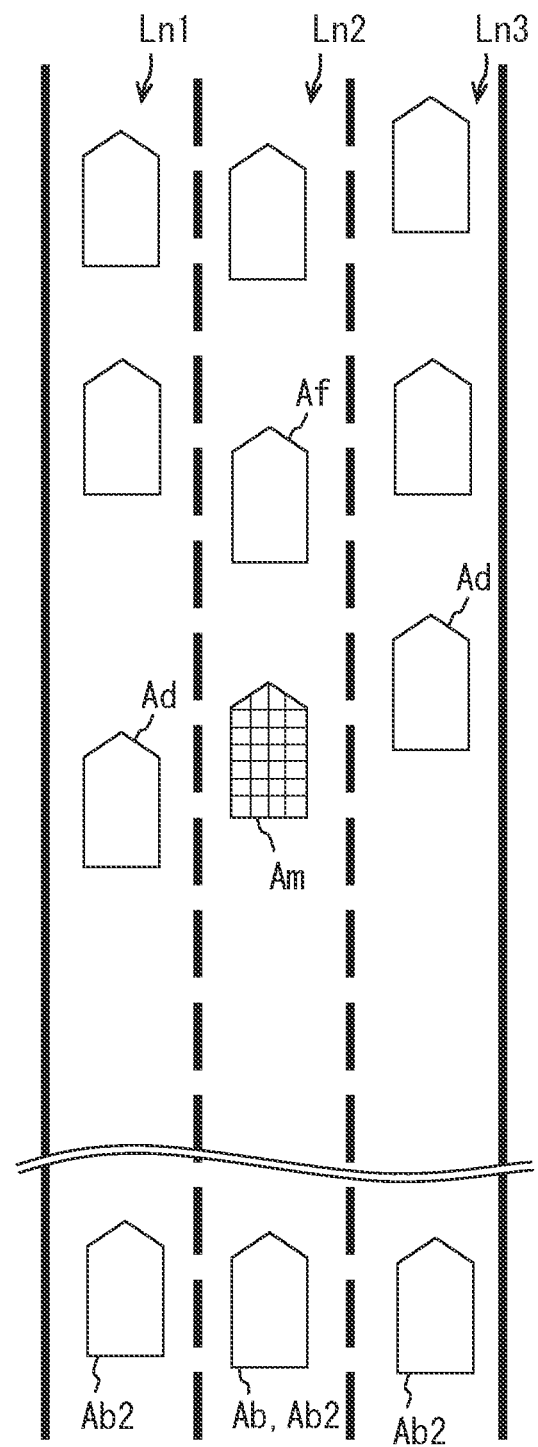
FIG. 25 is a diagram schematically illustrating an example of a traffic congestion pattern J.
Figure 26:
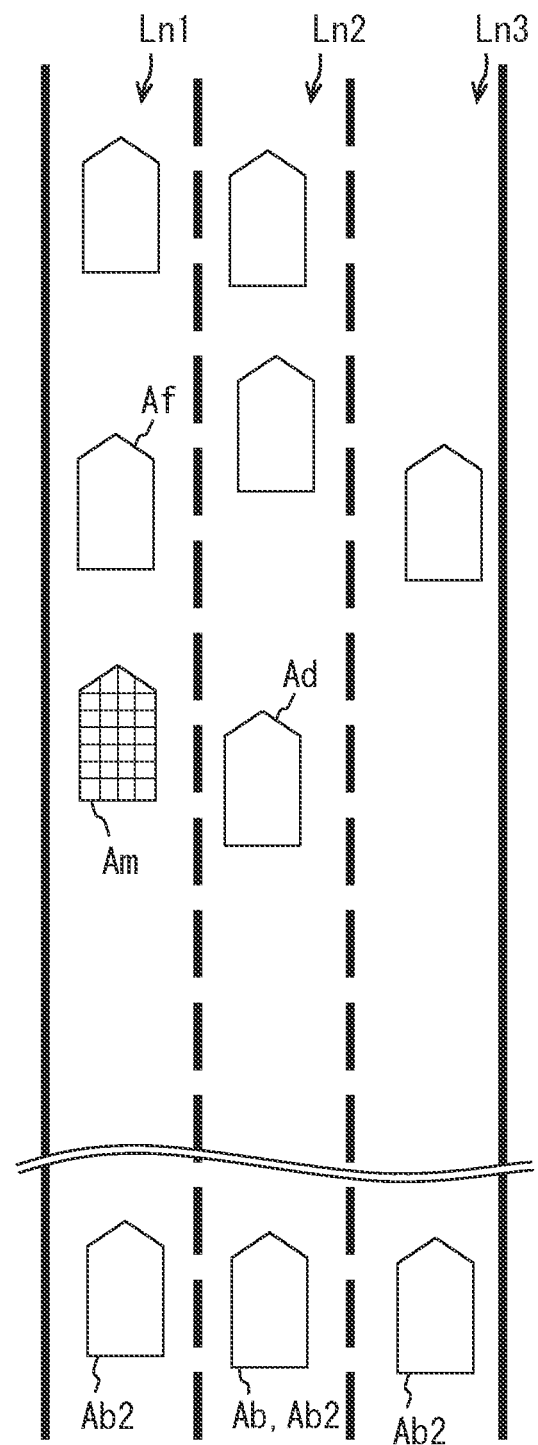
FIG. 26 is a diagram schematically illustrating another example of the traffic congestion pattern J.
Figure 27:
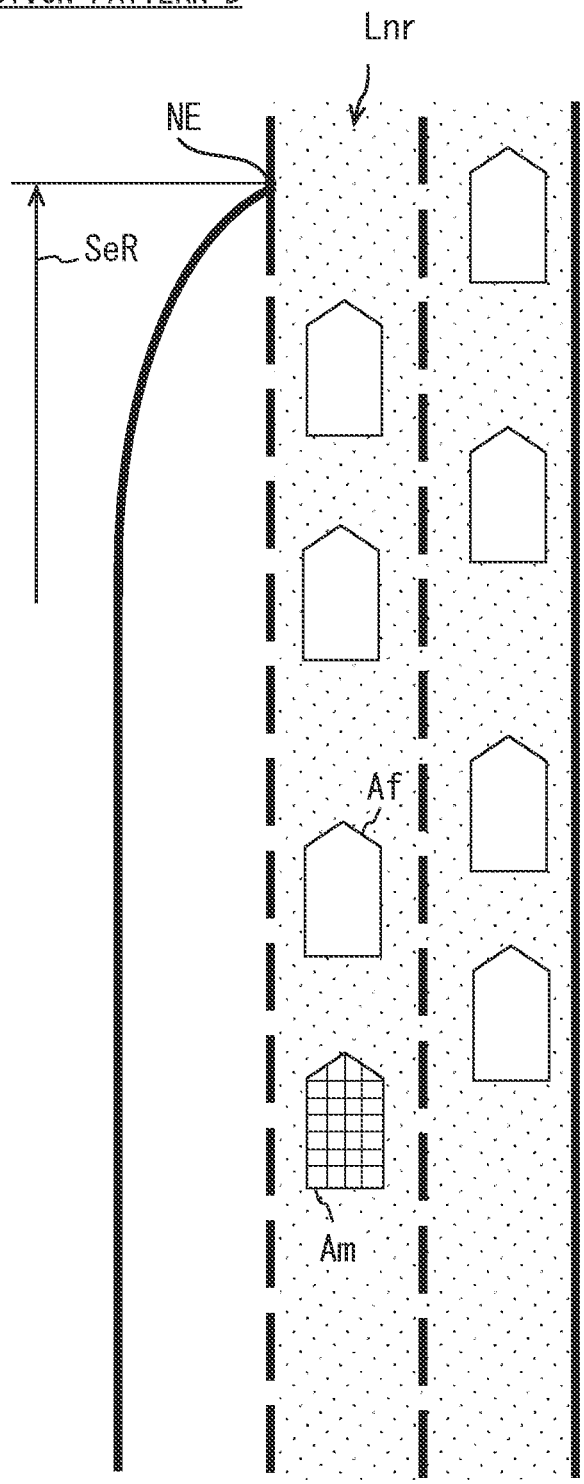
FIG. 27 is a diagram schematically illustrating another example of the traffic congestion pattern D.

The traffic congestion pattern J illustrated in FIGS. 25 and 26 indicates a state where the close backward vehicle Ab1 and the diagonally backward vehicle Abs do not exist and, on the other hand, far diagonally backward vehicles Ab2 travelling at almost the same speed as that of the vehicle Am as the subject vehicle exist. The traffic congestion pattern J illustrated in FIG. 25 is premised on the traffic congestion pattern A (refer to FIG. 4), and at least one far backward vehicle Ab2 exists backward of the vehicle Am travelling on the center lane Ln2. The traffic congestion pattern J illustrated in FIG. 26 is premised on the traffic congestion pattern B (refer to FIG. 5), and at least one far backward vehicle Ab2 exists backward of the vehicle Am travelling on the left-end lane Ln1 or the right-end lane Ln3.

The traffic congestion pattern K (refer to FIG. 31) illustrates a state where the close backward vehicle Ab1 and the diagonally backward vehicle Abs and, in addition, the far backward vehicle Ab2 do not exist. The traffic congestion determination unit 72 determines a traffic congestion of the pattern K in the case where the far backward vehicle Ab2 is not recognized by the periphery monitoring sensor 30.

The traffic congestion determination unit 72 illustrated in FIG. 17 further determines whether or not the route lane Lnr is in a risk section SeR in the traffic congestion pattern D in the case of traveling on the route lane Lnr (refer to the dot ranges in FIGS. 7 and 27) which is specified on the basis of the route information. The risk section SeR is a section related to a merge or branch. Concretely, a section in which a branch lane branched from the main lane and is in contact with the main lane (refer to FIG. 8), a section in a merged lane in the main lane, which is in contact with a merge lane (refer to FIG. 27), and the like are specified as the risk sections SeR. In the case of travel in the risk section SeR, as will be described later, display restriction on the video content CTV or restriction on a second task continues until the vehicle Am passes an end point NE of the risk section SeR.

In the case where the travel speed of the vehicle Am is equal to or less than the traffic congestion determination threshold and the forward vehicle Af is detected, the traffic congestion determination unit 72 determines whether the road on which the vehicle Am is traveling is a two-lane road (refer to FIG. 28) or not. On such a two-lane road, cut-in from the adjacent oncoming lane Lna to the subject vehicle lane Lns does not occur substantially. Therefore, when the traffic congestion determination unit 72 determines that the vehicle Am travels on a two-lane road, the display restriction on the video content CTV or restriction on a second task by the provision control unit 77 is cancelled.

Figure 29:
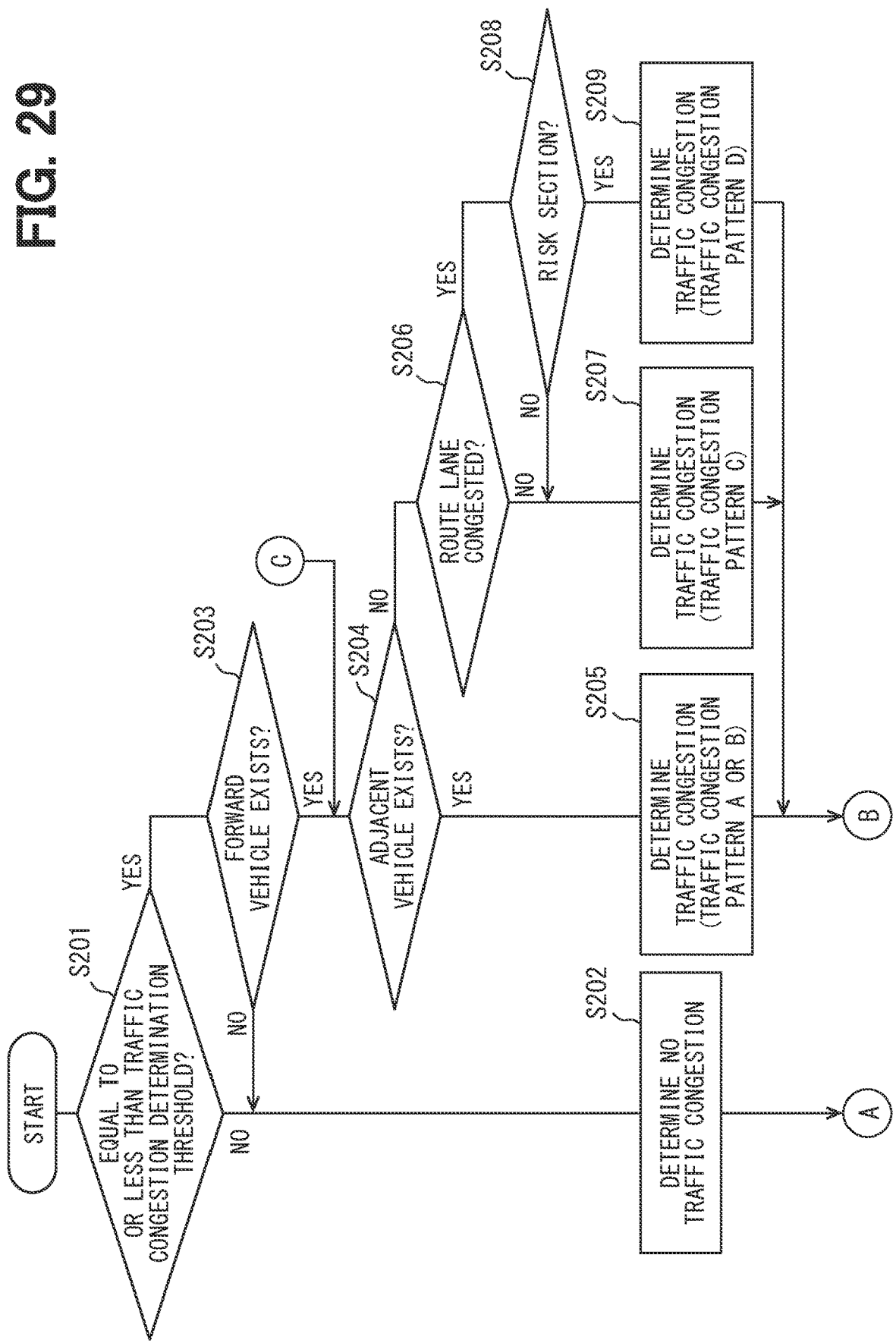
FIG. 29 is a flowchart illustrating the details of a traffic congestion determining process together with FIG. 30.
Figure 30:
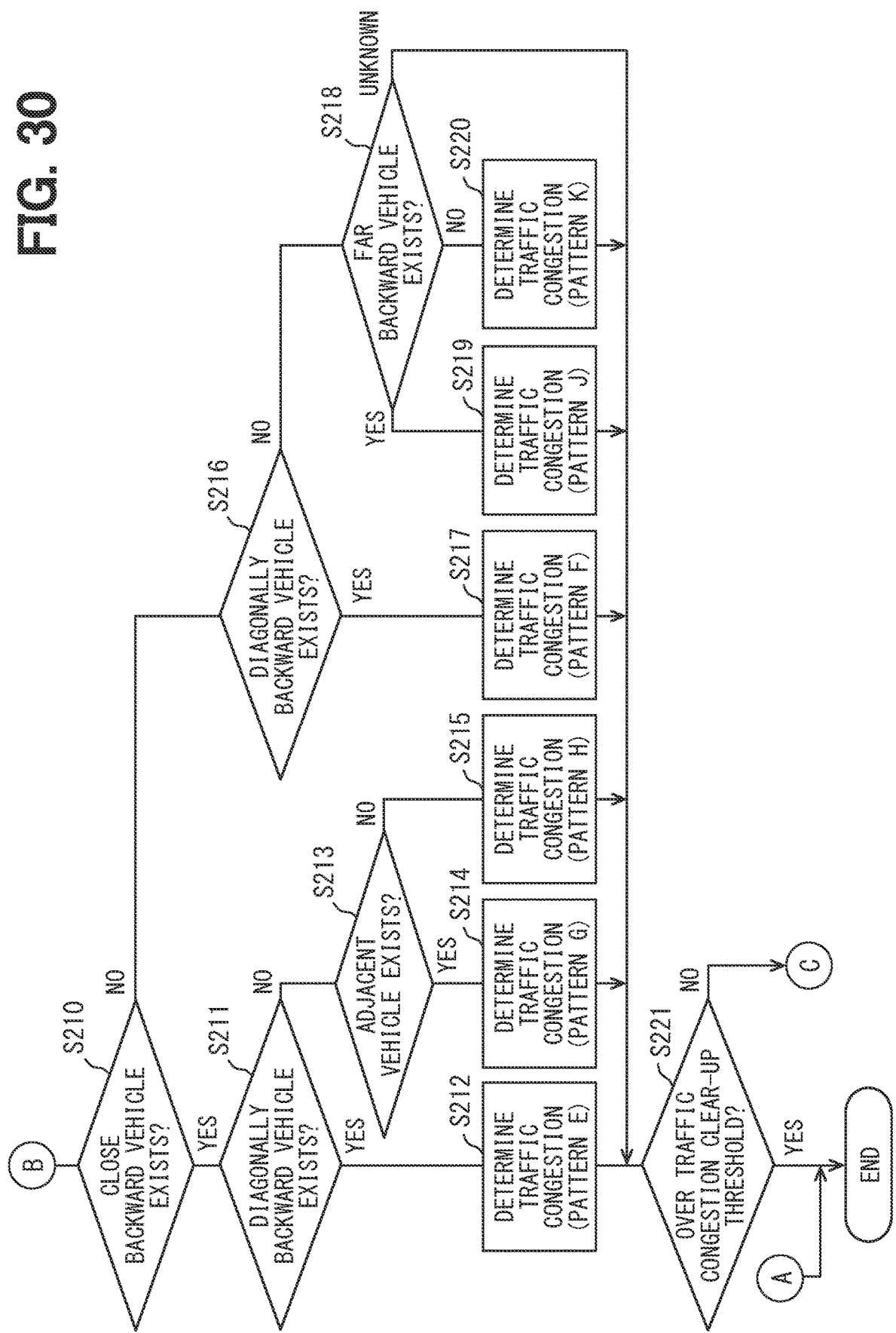
FIG. 30 is a flowchart illustrating the details of the traffic congestion determining process together with FIG. 29.

Hereinafter, the details of the above-described traffic congestion determining process of the second embodiment executed by the traffic congestion determination unit 72 will be described with reference to FIGS. 17 to 26 and FIG. 31 on the basis of FIGS. 29 and 30. The processes of S201 to S207 and S209 in the second embodiment are substantially the same as those of S101 to S108 (refer to FIG. 8) in the first embodiment. Consequently, the detailed description of the steps will not be repeated.

In S208, whether the route lane Lnr being in a traffic congestion is in the risk section SeR or not is determined. When it is determined in S208 that the lane is not in the risk section SeR, the program advances to S207 and determines that the surrounding of the subject vehicle is in a traffic congestion of the pattern C. On the other hand, when it is determined that the lane is in the risk section SeR, the program advances to S209 and determines the traffic congestion pattern D whose cut-in risk is higher than that in the traffic congestion pattern C.

In S210 after the traffic congestion pattern of the front and sides is specified by S203 to S209, the presence of a close backward vehicle Ab1 as a backward vehicle traveling backward of the subject vehicle and is close to the subject vehicle is grasped. When it is determined in S210 that the close backward vehicle Ab1 exists, the program advances to S211, and the presence of the diagonally backward vehicle Abs travelling in the adjacent lane is grasped. When it is determined in S211 that the diagonally backward vehicles Abs exist in all of the adjacent lanes, the program advances to S212. In S212, the surrounding of the subject vehicle is in the traffic congestion pattern E, and the determination results of the traffic congestion patterns A to D are updated. After that, the program advances to S221.

On the other hand, when it is determined in S211 that there is an adjacent lane in which the diagonally backward vehicle Abs does not exist, the program advances to S213. In S213, the presence/absence of the adjacent vehicle Ad traveling on the adjacent lane is determined. When it is determined in S213 that the adjacent vehicles Ad exist on all of the adjacent lanes, the program advances to S214. In S214, the surrounding of the subject vehicle is in the traffic congestion pattern G, and the determination result of the traffic congestion pattern A or B is updated. After that, the program advances to S221. On the other hand, when it is determined that there is an adjacent lane on which the adjacent vehicle Ad does not exist, the program advances from S213 to S215. In S215, it is determined that the surrounding of the subject vehicle is in the traffic congestion pattern H, and the determination result of the traffic congestion pattern C or D is updated. After that, the program advances to S221.

When it is determined in S210 that there is no close backward vehicle Ab1, the program advances to S216 and the presence of the diagonally backward vehicle Abs travelling on the adjacent lane is grasped. When it is determined in S216 that the diagonally backward vehicles Abs exist on all of the adjacent lanes, the program advances to S217. In S217, it is determined that the surrounding of the subject vehicle is in the traffic congestion pattern F, and the determination results of the traffic congestion patterns A to D are updated. After that, the program advances to S221.

On the other hand, when it is determined in S216 that there is an adjacent lane on which the diagonally backward vehicle Abs does not exist, the program advances to S218. In S218, the presence/absence of a far backward vehicle Ab2 is determined. When it is determined in S218 that at least one far backward vehicle Ab2 exists, the program advances to S219. In S219, it is determined that the surrounding of the subject vehicle is in the traffic congestion pattern J, and the determination results of the traffic congestion patterns A to D are updated. After that, the program advances to S221. On the other hand, when it is determined that the far backward vehicle Ab2 does not exist, the program advances to S220. In S220, it is determined that the surrounding of the subject vehicle is in the traffic congestion pattern K, and the determination results of the traffic congestion patterns A to D are updated. After that, the program advances to S221. Further, in the case where the situation of the backward of the subject vehicle is unknown due to factors of a road shape, weather information, and the like, the determination result of the traffic congestion patterns A to D is maintained and the program advances to S221.

In S221, whether the travel speed of the subject vehicle exceeds a traffic congestion clear-up threshold or not is determined on the basis of latest vehicle speed information. When it is determined in S221 that the travel speed is equal to or less than the traffic congestion clear-up threshold, the program returns to S204. On the other hand, when it is determined in S221 that the travel speed exceeds the traffic congestion clear-up threshold, the traffic congestion determining process of this time is finished.

The provision control unit 77 (refer to FIG. 17) changes the allowable range of second tasks allowed to the driver in the automatic travel period in accordance with the situation of the backward vehicle Ab grasped by the backward grasping unit 76 and restricts display of the video content CTV. Concretely, based on the determination result of the traffic congestion pattern by the traffic congestion determination unit 72 and the like, the provision control unit 77 predicts the risk of collision from the backward of the subject vehicle and switches the second task mode in accordance with the rear-end collision risk. The provision control unit 77 adjusts the display restriction on the entertainment content provided in the automatic travel period by the switching of the second task mode. In the case where a traffic congestion in a specific pattern is determined by the traffic congestion determination unit 72, the provision control unit 77 can strengthen restriction on display of the video content CTV provided.

Figure 31:
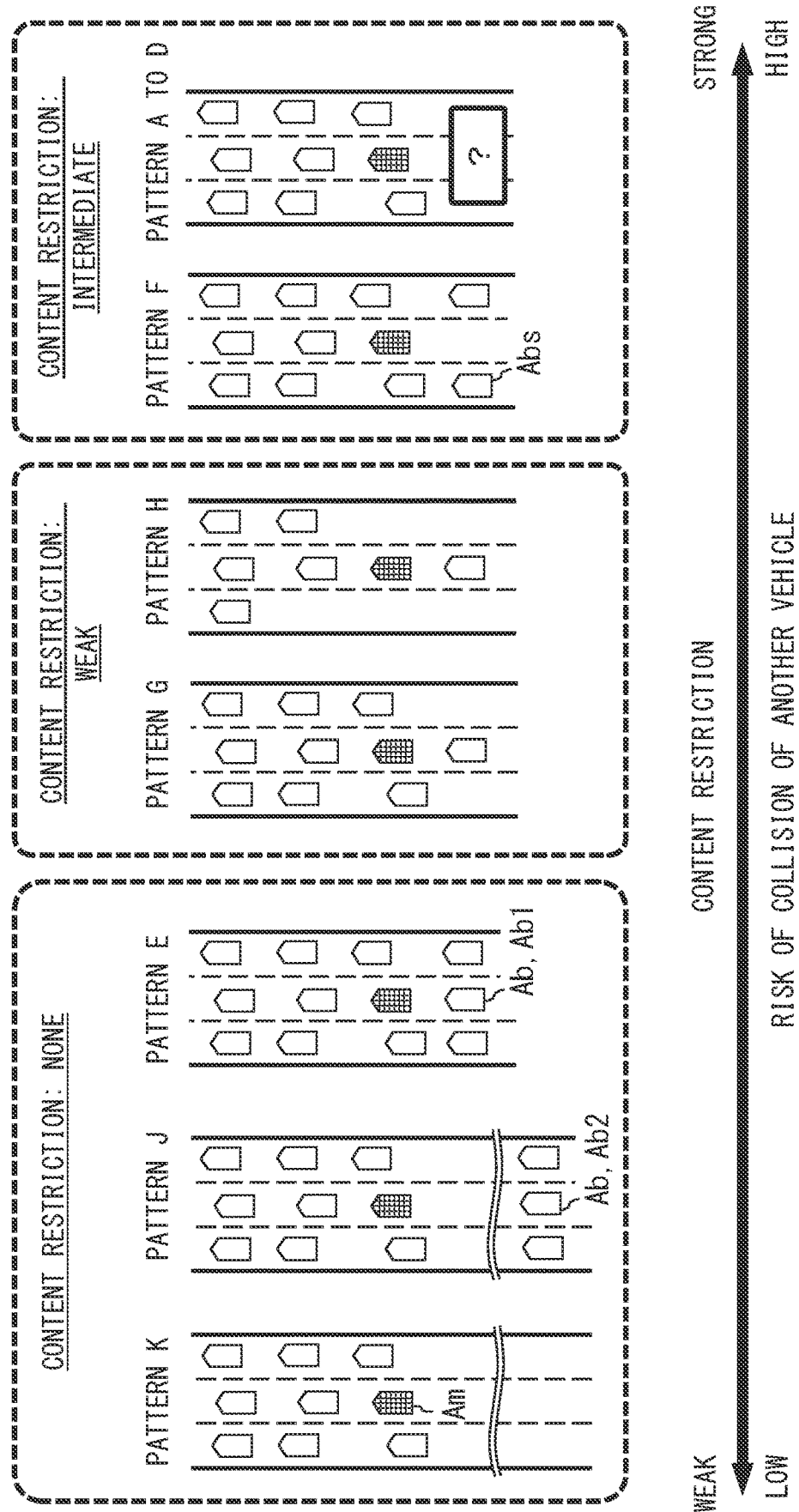
FIG. 31 is a diagram illustrating a list of relations between the degree (high/low) of risk of other vehicles in each of traffic congestion patterns and the degree of restriction on second tasks.
Figure 32:
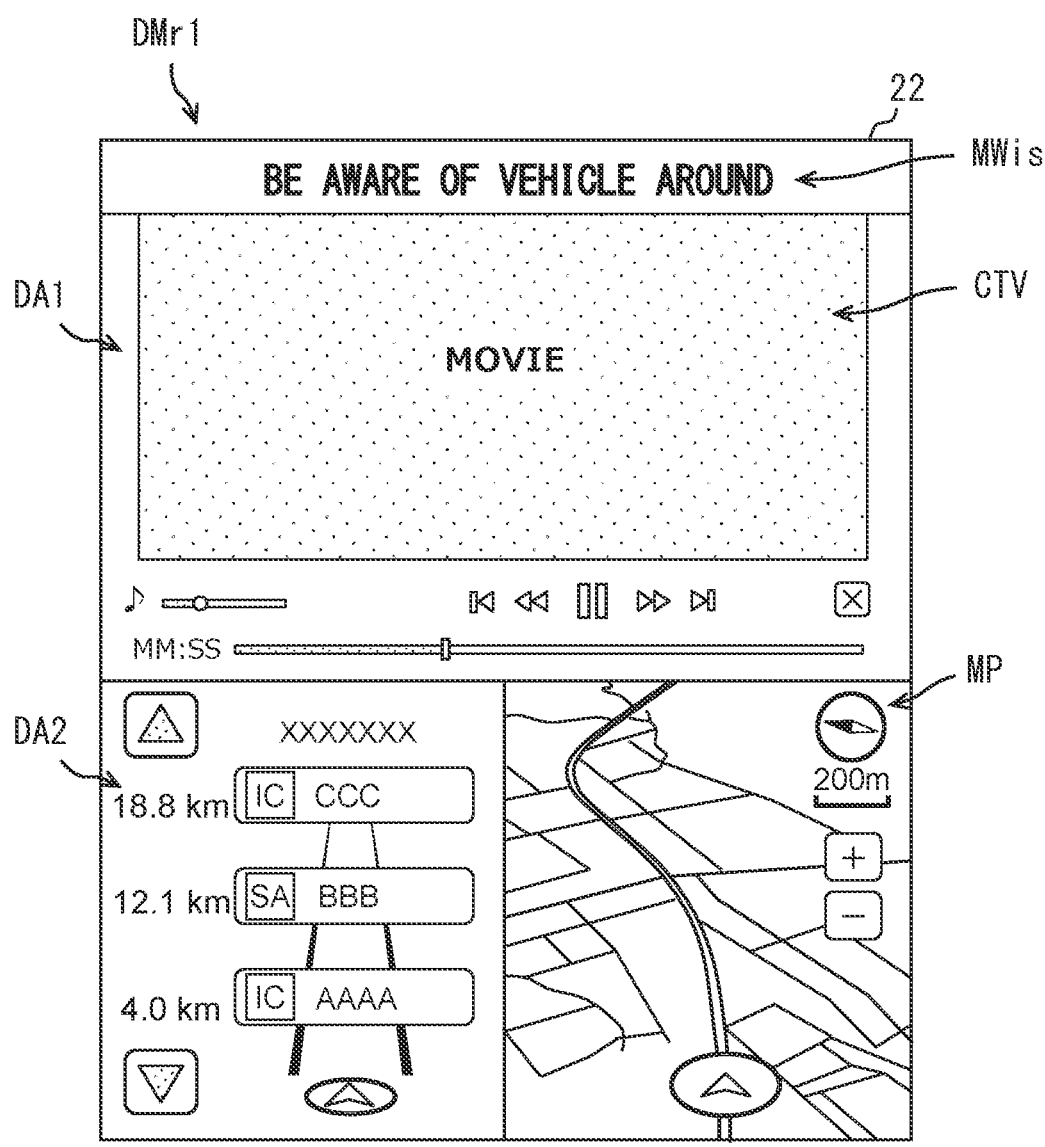
FIG. 32 is a diagram illustrating an example of display of a second task mode including a peripheral vehicle notice.
Figure 33:
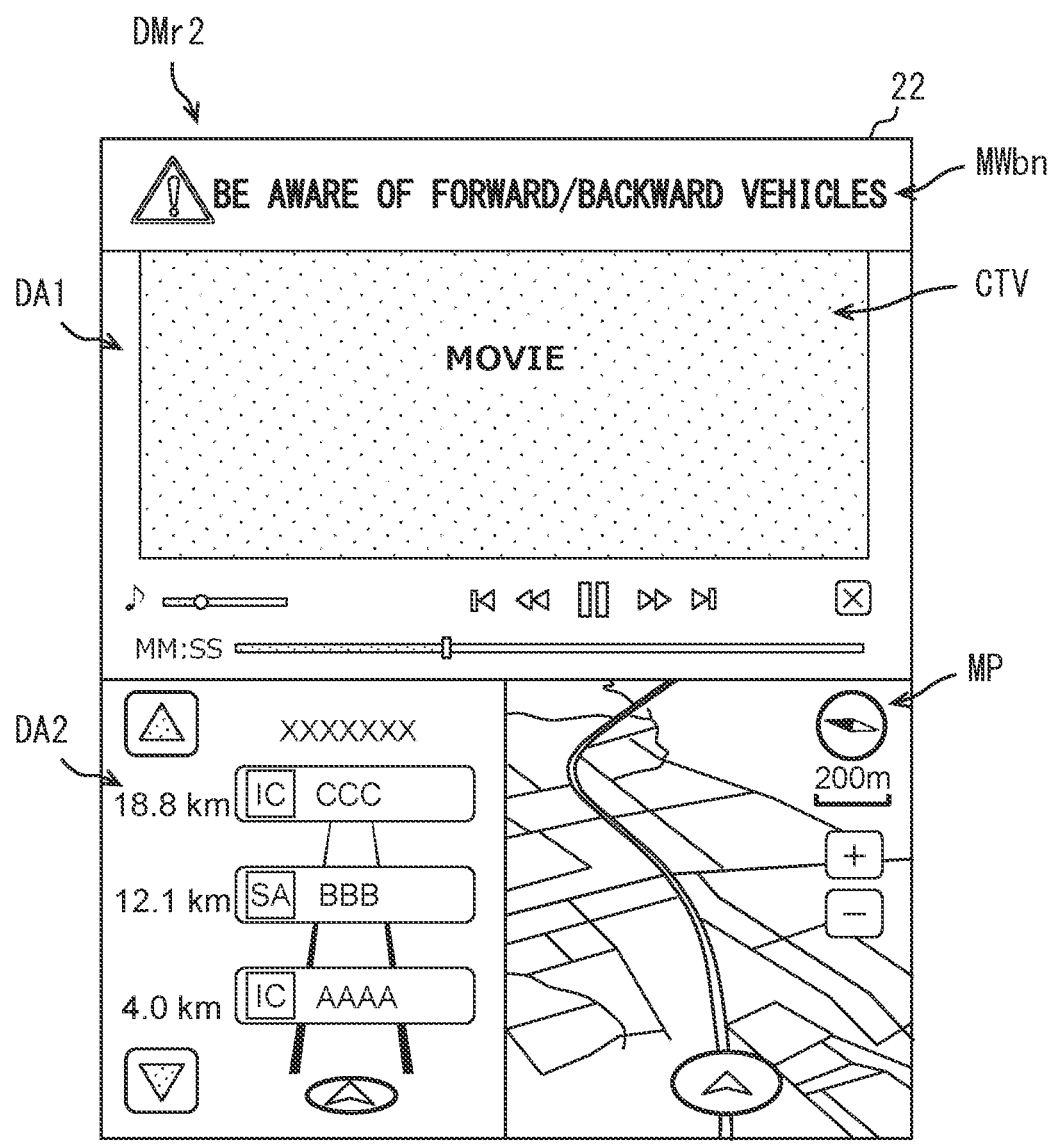
FIG. 33 is a diagram illustrating an example of display of a second task mode including a backward vehicle notice.

Specifically, the provision control unit 77 sets the degree of the rear-end collision risk for each of the traffic congestion patterns (refer to FIG. 31). As an example, the ranking of the rear-end collision is, the traffic congestion pattern K, the traffic congestion pattern J, the traffic congestion pattern E, the traffic congestion pattern G, the traffic congestion pattern H, the traffic congestion pattern F, and the traffic congestion patterns A to D. That is, the traffic congestion pattern K in which the backward vehicle Ab does not exist is the traffic congestion pattern having the lowest risk of rear-end collision. On the other hand, the states of the traffic congestion patterns A to D in which the presence of the backward vehicle Ab cannot be recognized are set as the traffic congestion patterns having the highest risk of rear-end collision. The provision control unit 77 weakens or eliminates the display restriction on the video content CTV by loosening the restriction on second tasks as the rear-end collision risk becomes lower.

In the case where the backward vehicle Ab travelling on the same lane as the subject vehicle is not grasped, the provision control unit 77 strengthens the display restriction on the video content CTV by setting the allowable range of second tasks narrower as compared with the case where the backward vehicle Ab is grasped. That is, in the provision control unit 77, the traffic congestion patterns F and A to D in which the backward vehicle Ab is not grasped are registered as a traffic congestion of a specific pattern in which the risk of rear-end collision of the backward vehicle Ab tends to be increased. On the other hand, a traffic congestion of a traffic congestion pattern other than the traffic congestion patterns F and A to D, which is not a traffic congestion pattern in which the backward of the subject vehicle is guarded by the close backward vehicle Ab1 or the far backward vehicle Ab2 is a traffic congestion of a non-specific pattern.

In the case where the traffic congestion determination unit 72 recognizes any of the traffic congestion patterns K, J, and E, the traffic congestion determination unit 77 sets the second task mode DMn (refer to FIG. 9) in which display of the video content CTV is not regulated. As a result, the video content CTV is normally displayed in the main display area DA1.

In the case where the traffic congestion determination unit 72 recognizes the traffic congestion pattern G or H, the provision control unit 77 sets a second task mode DMr1 (refer to FIG. 32) in which display of the video content CTV is slightly restricted. In the second task mode DMr1, a peripheral vehicle notice MWis is displayed in the main display area DA1. The peripheral vehicle notice MWis is a display item including a message to call attention such as, for example, "be aware of a vehicle around". The peripheral vehicle notice MWis is displayed in a laterally-long band shape near the upper periphery of the main display area DA1 and slightly hides the upper peripheral part of the video content CTV. In the second task mode DMr1, reproduction of the video and voice of the video content CTV is continued.

When any of the traffic congestion patterns F and A to D (specific patterns) is recognized by the traffic congestion determination unit 72, the provision control unit 77 sets the second task mode DMr2 (refer to FIG. 33) in which display of the video content CTV is further restricted. In the second task mode DMr2, a peripheral vehicle attention MWbn is displayed in the main display area DA1. The peripheral vehicle attention MWbn is, for example, a display item including a message to call attention such as "be aware of forward/backward vehicles". The attention call by the peripheral vehicle attention MWbn is stronger than the information presented by the peripheral vehicle notice MWis (refer to FIG. 32). The peripheral vehicle attention MWbn is displayed in a laterally-long band shape near the upper periphery of the main display area DA1 so as to overlap a part of the video content CTV like the peripheral vehicle notice MWis. Although hidden by the peripheral vehicle attention MWbn, a major part of the video content CTV can be visually recognized by the driver.

Figure 34:
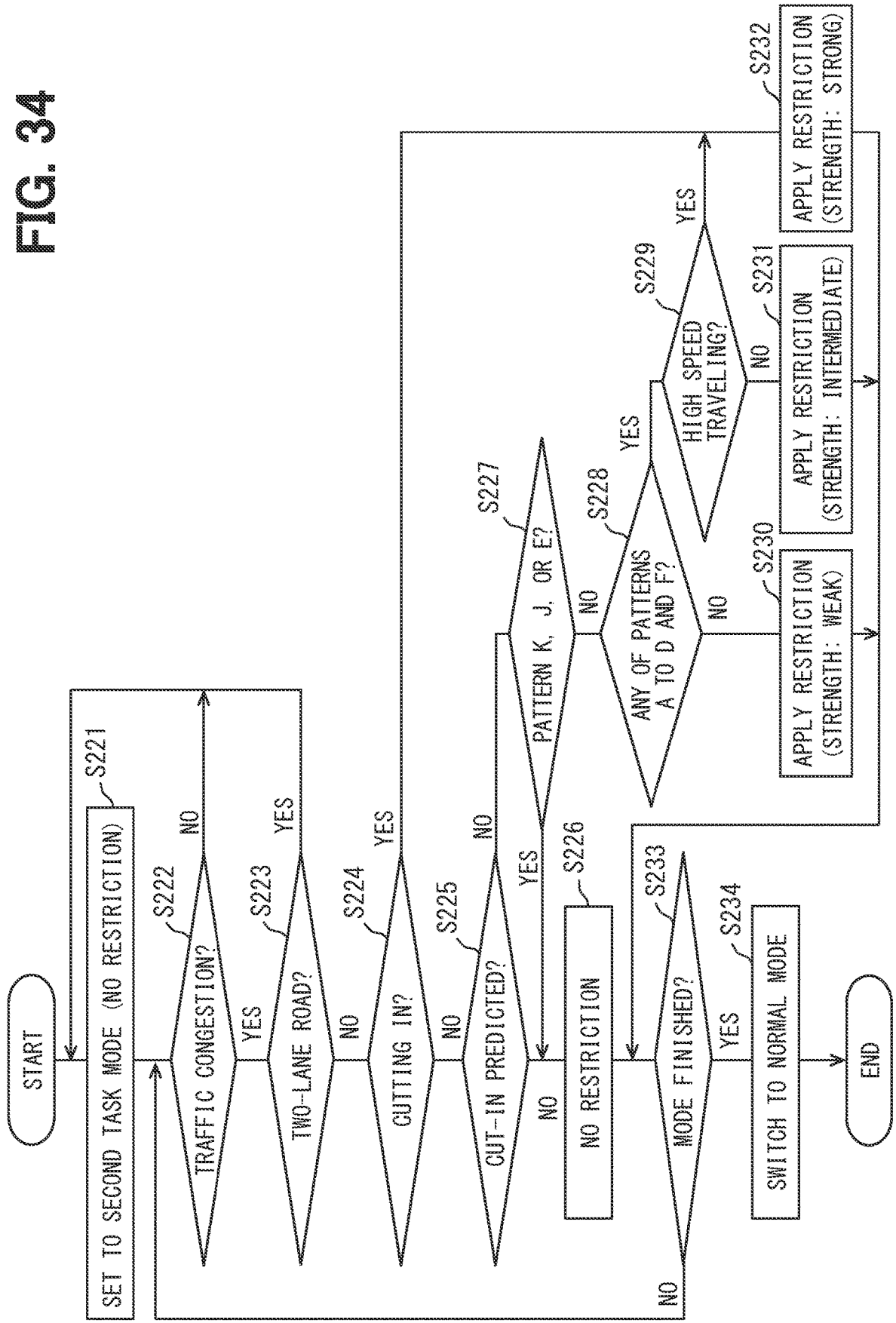
FIG. 34 is a flowchart illustrating the details of a content control process.

Hereinafter, the details of the content control process of the second embodiment of adjusting the content display restriction by switching the second task mode as described above will be described with reference to FIGS. 9, 12, 17, 31 to 33, and the like on the basis of FIG. 34. The content control process is executed by the provision control unit 77 in the automatic travel period in which the vehicle Am travels by the automatic driving function.

In S221, display of the CID 22 is set in the second task mode DMn (refer to FIG. 9). After that, the program advances to S222. In S222, whether the traffic in the surrounding of the subject vehicle is being congested or not is determined on the basis of the result of traffic congestion determination by the traffic congestion determination unit 72. When it is determined in S222 that the traffic is not being congested, the program returns to S221 and makes the second task mode DMn continued. On the other hand, when it is determined in S222 that there is a traffic congestion, the program advances to S223.

In S223, whether the road on which the vehicle is travelling is a two-lane road or not is determined. When it is determined in S223 that the vehicle is travelling on a two-lane road, the program returns to S221, and the second task mode DMn is continued. As a result, display restriction on the video content CTV in a traffic congestion is cancelled. On the other hand, when it is determined in S223 that the vehicle is travelling on a road including a plurality of lanes, the program advances to S224.

In S224, based on the determination result by the cut-in determination unit 74, whether the adjacent vehicle Ad is cutting in to the front of the subject vehicle or not is determined. When it is determined in S224 that the adjacent vehicle Ad is cutting in, the program advances to S232. In S232, the second task mode DMr3 (refer to FIG. 12) is set. After that, the program advances to S233. On the other hand, when it is determined in S224 that the adjacent vehicle Ad is not cutting in, the program advances to S225. In S225, the result of determination by the cut-in prediction unit 73 is referred to and the presence/absence cut-in prediction is determined. When it is determined in S225 that there is no prediction of cut-in of the adjacent vehicle Ad, the program advances to S226. In S226, the second task mode DMn is set. After that, the program advances to S233. On the other hand, when it is determined in S225 that there is prediction of cut-in of the adjacent vehicle Ad, the program advances to S227.

In S227, whether the traffic congestion in the surrounding of the subject vehicle corresponds to any of the patterns K, J, and E is determined. In the case where the traffic congestion of any of the patterns K, J, and E is determined in S227, the program advances to S226, and the second task mode DMn is set. On the other hand, when it is determined in S227 that the traffic congestion does not correspond to any of the patterns K, J, and E, the program advances to S228.

In S228, whether there is a traffic congestion of a specific pattern in which the rear-end collision risk tends to increase or not is determined. Concretely, in S228, whether the traffic congestion in the surrounding of the subject vehicle corresponds to any of the patterns A to D and F or not is determined. When it is determined in S228 that the traffic congestion does not correspond to any of the patterns A to D and F, that is, the traffic congestion in the pattern G or H is determined, the program advances to S230. In S230, the second task mode DMr1 (refer to FIG. 32) in which weak restriction is applied is set. After that, the program advances to S233. On the other hand, when it is determined in S228 that a traffic congestion in any of the patterns A to D and F, that is, the traffic congestion in the specific pattern is determined, the program advances to S229.

In S229, whether the travel speed during the traffic congestion exceeds the speed threshold or not is determined. When it is determined in S229 that the travel speed is less than the speed threshold, the program advances to S231. In S231, the second task mode DMr2 (refer to FIG. 33) in which display restriction on the video content CTV is made stronger than that in the second task mode DMr1 is set. After that, the program advances to S233. On the other hand, when it is determined in S229 that the travel speed exceeds the speed threshold, the program advances to S232, sets the second task mode DMr3 in which the display restriction on the video content CTV is further strengthened, and advances to S233.

In S233, whether the second task mode is finished or not is determined. When continuation of the second task mode is determined in S233, the program returns to S222 and makes provision of the video content CTV and the like continued. On the other hand, when it is determined in S233 that the second task mode is finished, the program advances to S234. The screen of the CID 22 is switched from the second task mode to the normal mode in S234, and the series of content control processes is finished.

Figure 35:
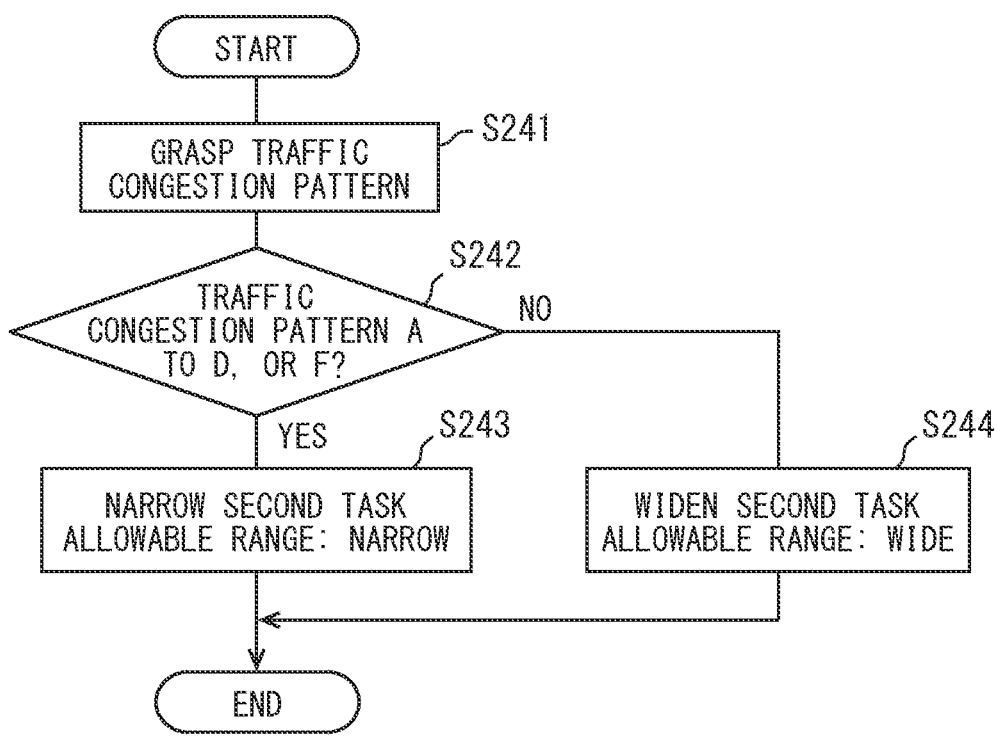
FIG. 35 is a flowchart illustrating the details of a range control process.

Next, the details of the range control process of the second embodiment controlling the allowable range of second tasks will be further described on the basis of FIG. 35 with reference to FIG. 17.

In S241, based on the result of determination of the traffic congestion pattern by the traffic congestion determination unit 72, the traffic congestion pattern of the surrounding of the subject vehicle is grasped. After that, the program advances to S242. Like S228 of the content control process (refer to FIG. 34), in S242, whether or not there is a traffic congestion in a specific pattern in which the rear-end collision risk tends to increase is determined. Concretely, when it is determined in S242 that the traffic congestion of the surrounding of the subject vehicle is in any of the specific patterns A to D and F, the program advances to S243. In S243, the allowable range of second tasks is narrowly set, and the range control process of this time is finished. On the other hand, when it is determined in S242 that the traffic configuration of the surrounding of the subject vehicle does not correspond to any of the patterns A to D and F, that is, it is the traffic congestion in the not-specified pattern, the program advances to S244. The allowable range of second tasks is widely set in S244, and the range control process of this time is finished.

By the above-described result, according to the situation of the backward vehicle Ab grasped by the backward grasping unit 76, the allowable range of second tasks allowed to the driver is changed. Concretely, actions such as operation of the user terminal or having a meal in a traffic congestion of a specific pattern having high rear-end collision risk are not allowed. On the other hand, in a traffic congestion of a non-specific pattern having low rear-end collision risk, actions such as operation of the user terminal and having a meal are allowed.

The second embodiment described above also produces effects similar to those of the first embodiment, and prediction of cut-in of the adjacent vehicle Ad is notified to the driver. As a result, the anxiety of the driver in a period of driving by the automatic driving function in a traffic congestion can be lessened.

In addition, in the second embodiment, at the time of travel in a traffic congestion by the automatic driving function, display of the video content CTV provided is restricted according to the situation of the backward vehicle Ab travelling behind the subject vehicle. Therefore, the risk of collision from the backward is notified to the driver by a display change which occurs in the video content CTV being provided. By such a notice, the anxiety of the driver is lessened at the time of travel in a traffic congestion by the automatic driving function.

In the second embodiment, at the time of travel in a traffic congestion by the automatic driving function, when a specific traffic congestion pattern in which the risk of collision by the backward vehicle Ab tends to increase is determined, display of the video content CTV provided to the driver is restricted. Therefore, the risk of the collision by the backward vehicle Ab can be notified to the driver by a display change occurring in the content being provided. By such a notice, at the time of travel in a traffic congestion by the automatic driving function, the anxiety of the driver is lessened.

Further, in the second embodiment, at the time of travel in a traffic congestion by the automatic driving function, the allowable range of second tasks allowed to the driver is changed according to the situation of the backward vehicle Ab travelling backward of the subject vehicle. Therefore, when there is a risk of collision from the backward, second tasks which easily cause anxiety can be made unallowed by the change of the allowable range. As a result, at the time of travel in a traffic congestion by the automatic driving function, the anxiety of the driver is lessened.

In addition, in the second embodiment, when a traffic congestion is determined by the traffic congestion determination unit 72, the provision control unit 77 determines whether or not the lane on which the vehicle travels is in the risk section SeR related to a merge, a branch, or the like. In the case of a scene such as the traffic congestion pattern D in which the subject vehicle travels in the risk section SeR (refer to FIGS. 7 and 27), the provision control unit 77 continues restriction on display of the video content CTV. In the risk section SeR in a traffic congestion, cut-in of the adjacent vehicle Ad tends to occur more than in the normal section having no merge, branch, or the like. Therefore, by adding the process of determining a road environment in which cut-in tends to occur and continuing the notice of the state of the high possibility of cut-in, the anxiety of the driver can be further lessened.

Figure 28:
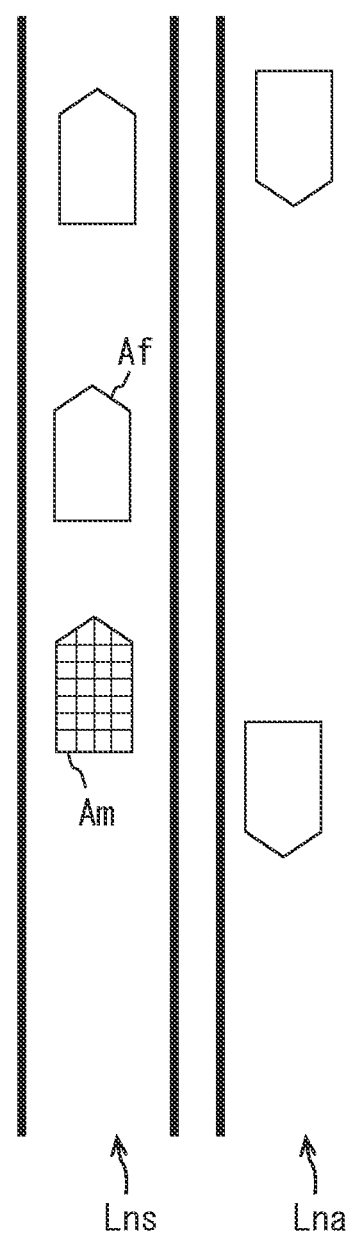
FIG. 28 is a diagram illustrating an example of a scene in which display of content is not restricted.

In the second embodiment, when the traffic congestion determination unit 72 determines that there is a traffic congestion, the provision control unit 77 determines the road on which the vehicle is travelling is a two-lane road or not (refer to FIG. 28). When the subject vehicle travels on a two-lane road, the provision control unit 77 cancels the display restriction on the video content CTV. On a two-lane road, cut-in does not occur even in a traffic congestion. Therefore, by the process of cancelling restriction on display of the video content CTV, in other words, notification of cut-in on a two-lane road, the convenience of the driver in the automatic driving can be improved.

Further, in the second embodiment, in the case where the backward vehicle Ab travelling on the same lane on which the subject vehicle travels is not grasped, the allowable range of second tasks allowed to the driver is set narrower than that in the case where the backward vehicle Ab is grasped. Specifically, in the case where a backward vehicle travelling on the same lane on which the subject vehicle travels is not grasped, display of the video content CTV is restricted more as compared with the case where the backward vehicle Ab is grasped. When the backward range of the subject vehicle is occupied by the backward vehicle Ab, the risk of collision from backward is lower than that in the case where the backward range is open. Therefore, when the backward vehicle Ab is grasped, by widening the allowable range of second tasks or lessening the display restriction on the video content CTV, both lower rear-end collision risk and higher convenience in automatic driving can be achieved.

As described above, in the second embodiment, each of the traffic congestion patterns A to D and F corresponds to a traffic congestion of a "specific pattern", and each of the other traffic congestion patterns E, G, H, J, and K corresponds to a traffic congestion of a "non-specific pattern".

Other Embodiments

Although the plurality of embodiments of the present disclosure have been described above, the present disclosure is not to be interpreted by being limited to the foregoing embodiments but can be applied to various embodiments and combinations without departing from the gist of the present disclosure.

In the embodiment, the display restriction on entertainment content is switched in three stages of "strong", "intermediate", and "weak". The degree of the display restriction may be switched in two stages or four or more stages. Further, switching of whether the display restriction is performed or not may be simply executed.

For example, in first and second modifications of the first embodiment, display restriction based on the determination of a traffic congestion of the specific pattern is omitted. The provision control unit 77 of the first modification sets a second task mode in which the display restriction is "weak" when a sign of cut-in is detected, and sets a second task mode in which the display restriction is "strong" when execution of cut-in is determined. Further, the provision control unit 77 of the second modification restricts display of the video content CTV when a sign of cut-in is detected, and does not restrict display of the video content CTV when a sign of cut-in is not detected.

In third and fourth modifications of the first embodiment, the display restriction based on detection of a sign of cut-in is omitted. The provision control unit 77 of the third modification sets the second task mode in which the display restriction is "weak" when a traffic congestion in the specific pattern is determined, and sets the second task mode in which the display restriction is "strong" when execution of cut-in is determined. Further, the provision control unit 77 of the fourth modification restricts display of the video content CTV when a traffic congestion of the specific pattern is determined, and does not restrict display of the video content CTV when a traffic congestion of the non-specific pattern is determined. As described above, the process of strengthening the display restriction on content includes the process of switching the restriction from "off" to "on" and the process of strengthening the weak restriction.

Further, in a fifth modification of the first embodiment, the display restriction of the same degree is performed in the case where a traffic congestion in the specific pattern is determined and the case where a sign of cut-in is detected. As an example, the provision control unit 77 sets the second task mode in which the display restriction is "weak" on the basis of determination of a traffic congestion in the specific pattern or cut-in prediction.

Further, in a sixth modification of the embodiment, the display restriction based on determination of execution of cut-in is omitted. The provision control unit 77 sets the second task mode in which the display restriction is "weak" in the case where a traffic congestion in the specific pattern is determined, and sets the second task mode in which the display restriction is "strong" in the case where a sign of cut-in is detected.

In a seventh modification of the embodiment, the display restriction on content is adjusted in multiple stages or continuously in accordance with the travel speed in a traffic congestion. Concretely, the higher the travel speed in a traffic congestion becomes, the more the provision control unit 77 expands the display area (for example, the height) of the cut-in prediction notice MWf (refer to FIG. 10) and narrows the display area of the video content CTV.

In an eighth modification of the embodiment, the display restriction on content according to the travel speed in a traffic congestion is omitted. In a ninth modification of the embodiment, the process of adjusting the allowable range of second tasks on the basis of the determination result of the traffic congestion pattern is omitted.

The provision control unit 77 of a tenth modification of the second embodiment switches the restriction on the video content CTV between "none" to "strong" in accordance with the situation of the backward vehicle Ab grasped in a traffic congestion. In an eleventh modification of the second embodiment, when a traffic congestion is determined even in the case of travel on a two-lane road, the display restriction is slightly applied on the video content CTV.

In the second embodiment, in the case of a traffic congestion of the non-specific pattern in which the rear-end collision risk is low, the restriction on the video content CTV is either "none" or "weak". On the other hand, in a twelfth modification, the restriction on the video content CTV is only one of "none" and "weak".

In a thirteenth modification of the embodiment, information indicating a backward inclination angle to the left plane part of the backrest part of the driver's seat is obtained as reclining information by the integration state estimation unit 75. The integration state estimation unit 75 grasps the state of reclining of the driver's seat. In the integration state estimation unit 75, as a kind of second tasks, relaxation by inclining the backrest part backward is set.

In such a thirteenth modification, when the allowable range of second tasks is widened, the provision control unit 77 allows a state where the driver's seat is reclined. On the other hand, when the allowable range of second tasks is narrowed, the provision control unit 77 does not allow the state where the driver's seat is reclined. When reclining of the driver's seat is out of the allowable range due to a shift of the traffic congestion pattern, the provision control unit 77 urges the driver to set the backrest part up by a voice message of the audio device 24.

In a fourteenth modification of the embodiment, the direction of the line of sight of the driver is detected by the driver monitor 29. The integration state estimation unit 75 determines whether or not the direction of the line of sight of the driver is toward the display device (for example, the CID 22 or the like) providing entertainment content. When the direction of the line of sight of the driver is not toward the CID 22, the provision control unit 77 executes only attention call by a voice message without displaying the interruption request notice MWr by the CID 22. Further, the provision control unit 77 can execute attention call to the driver who performs a second task which is out of the allowable range by using a vibration device provided for the driver's seat, a foot rest, or the like.

The provision control unit 77 of the embodiment makes the display restriction on entertainment content valid on the basis of information related to cut-in of the adjacent vehicle Ad to the front of the subject vehicle. However, the provision control unit 77 may execute the display restriction on content by using the information related to cut-in of the adjacent vehicle Ad to the backward of the subject vehicle. In addition, in the case of grasping the situation of the backward of the subject vehicle, hazard control to notify the backward vehicle Ab of a traffic congestion may be performed together with the notification or attention call to the driver. Further, the provision control unit 77 may execute the display restriction on content on the basis of the information related to cut-in of the adjacent vehicle Ad to the front of the forward vehicle.

The automatic driving system 50 of the foregoing embodiments has the two in-vehicle ECUs; the driving assistance ECU 50a, and the automatic driving ECU 50b. Alternatively, the automatic driving system 50 may be configured by one in-vehicle ECU having the functions of the driving assistance ECU 50a and the automatic driving ECU 50b.

The display device for displaying content related to second tasks is not limited to the CID 22. For example, the meter display 21 and the HUD 23 may be used to provide content. Further, displays EMB, EML, and EMR of an electronic mirror system may be used to provide content. A display device for displaying content can be selected by the driver. In addition, the shape, luminescent color, display position, and the like of each of images displayed in each of the display devices may be properly changed. The kind of the language of a message displayed in each of the display devices may be properly changed on the basis of user settings of the driver or the like and settings of the country, area, and the like in which the vehicle Am is used. Similarly, the kind of the language of a voice message reproduced by the audio device 24 may be also properly changed.

The second tasks allowed to the driver may be properly changed according to the regulations such as the road traffic act of the country and the area in which the vehicle Am is used. Further, the avoidance action to avoid interruption of a second task is not limited to the automatic LC but may be properly changed according to a travel scene.

In a fifteenth modification of the embodiment, any one of the meter display 21, the CID 22, and the HUD 23 is configured integrally with the HCU 100. In other words, the process function of the HCU 100 is provided in the control circuit of any one of the display devices. In such a tenth modification, the display device including the process functions of the HCU 100 corresponds to a "presentation control device".

In the embodiment, each of the functions provided by the HCU 100 can be provided by software and hardware executing it, only software, only hardware, or multiple combinations of them. In the case where such functions are provided by an electronic circuit as hardware, each of the functions can be provided by a digital circuit or analog circuit including a number of logic circuits.

The form of a storage medium (non-transitory tangible computer-readable medium, non-transitory tangible storage medium) storing a program or the like which can realize the above-described presentation control method may be also properly changed. For example, the storage medium is not limited to a configuration provided on a circuit board and may have a configuration which is provided in the form of a memory card or the like, inserted to a slot part, and electrically connected to the control circuit of the HCU. Further, the storage medium may be an optical disk, a hard disk drive, or the like from which the program is copied to the HCU.

The control unit and the control method described in the present disclosure may be realized by a dedicated computer constructing a processor programmed to execute one or plural functions embodied by a computer program. The device and its method described in the present disclosure may be realized by a dedicated hardware logic circuit. The device and its method described in the present disclosure may be realized by one or more dedicated computers constructed by a processor executing a computer program and one or more hardware logic circuits. The computer program may be stored, as an instruction executed by a computer, in a computer-readable non-transitory tangible storage medium.

What is claimed is:
1. A presentation control device to be used for a vehicle, which has an automatic driving function, and configured to control presentation of information for a driver of the vehicle, the presentation control device comprising:
a traffic congestion determination unit configured to determine whether a traffic congestion occurs in an auto- matic travel period in which the vehicle travels by the automatic driving function;
a cut-in prediction unit configured to detect a sign of cut-in of an adjacent vehicle which is adjacent to a subject vehicle as the vehicle on determination by the traffic congestion determination unit that a traffic congestion occurs;
a cut-in determination unit configured to determine whether the adjacent vehicle is cutting in; and
a provision restricting unit configured to restrict display of content provided in the automatic travel period on detection of the sign of cut-in of the adjacent vehicle by the cut-in prediction unit, wherein
on determination by the cut-in determination unit that the adjacent vehicle is cutting in, the provision restricting unit is configured to restrict display of the content more as compared with a case where the sign of cut-in of the adjacent vehicle is detected by the cut-in prediction unit.

2. A presentation control device to be used for a vehicle, which has an automatic driving function, and configured to control presentation of information for a driver of the vehicle, the presentation control device comprising:
a traffic congestion determination unit configured to determine whether a traffic congestion of a specific pattern occurs in an automatic travel period in which the vehicle travels by the automatic driving function, the specific pattern being set as a pattern in which cut-in of an adjacent vehicle adjacent to a subject vehicle as the vehicle tends to occur; and
a provision restricting unit configured to strengthen restriction on display of content provided in the automatic travel period on determination by the traffic congestion determination unit that a traffic congestion of the specific pattern occurs.

3. The presentation control device according to claim 2, wherein
on determination that a traffic congestion of the specific pattern occurs, the provision restricting unit is configured to set an allowable range of a specific action other than driving allowed to the driver to be narrower as compared to a case where a traffic congestion of a non-specific pattern, which is other than the specific pattern, occurs.

4. The presentation control device according to claim 2, further comprising:
a cut-in prediction unit configured to detect a sign of cut-in of the adjacent vehicle, wherein
on detection of the sign of cut-in of the adjacent vehicle by the cut-in prediction unit, the provision restricting unit is configured to restrict display of the content.

5. The presentation control device according to claim 2, further comprising:
a cut-in determination unit configured to determine whether the adjacent vehicle is cutting in, wherein
on determination by the cut-in determination unit that the adjacent vehicle is cutting in, the provision restricting unit is configured to restrict display of the content more as compared with a case where the traffic congestion determination unit determines that a traffic congestion of the specific pattern occurs.

6. The presentation control device according to claim 4, further comprising:
a cut-in determination unit configured to determine whether the adjacent vehicle is cutting in, wherein
on determination by the cut-in determination unit that the adjacent vehicle is cutting in, the provision restricting unit is configured to restrict display of the content more as compared with a case where the sign of cut-in of the adjacent vehicle is detected by the cut-in prediction unit.

7. The presentation control device according to claim 2, wherein
the provision restricting unit is configured to
determine whether travel speed of the subject vehicle exceeds a speed threshold on determination by the traffic congestion determination unit that a traffic congestion occurs, and
on determination that the travel speed exceeds the speed threshold, restrict display of the content more as compared with a case where the travel speed is less than the speed threshold.

8. The presentation control device according to claim 2, wherein
the provision restricting unit is configured to
on determination by the traffic congestion determination unit that a traffic congestion occurs, determine whether a lane on which the subject vehicle is traveling is in a risk section related to a merge or branch and,
on determination that the subject vehicle travels in the risk section, continue restriction on display of the content.

9. The presentation control device according to claim 2, wherein
the traffic congestion determination unit is configured to determine whether a road on which the subject vehicle is traveling is a two-lane road and,
in a case where the subject vehicle travels on the two-lane road, the provision restricting unit is configured to cancel display restriction on the content in a traffic congestion.

10. The presentation control device according to claim 2, further comprising:
a backward grasping unit configured to grasp existence of a backward vehicle traveling backward of the subject vehicle, wherein
the provision restricting unit is configured to restrict display of the content provided in the automatic travel period in accordance with a situation of the backward vehicle grasped by the backward grasping unit in a traffic congestion.

11. A presentation control device to be used for a vehicle, which has an automatic driving function, and configured to control presentation of information for a driver of the vehicle, the presentation control device comprising:
a traffic congestion determination unit configured to
determine whether a traffic congestion occurs in an automatic travel period in which the vehicle travels by the automatic driving function, and
determine whether a traffic congestion of a specific pattern occurs, the specific pattern being set as a pattern in which cut-in of an adjacent vehicle adjacent to a subject vehicle as the vehicle tends to occur; and
a provision restricting unit configured to, on determination that a traffic congestion of a non-specific pattern other than the specific pattern occurs, set an allowable range of a specific action other than driving allowed to the driver in the automatic travel period to be wider as compared with a case where a traffic congestion of the specific pattern occurs.

12. A presentation control device to be used for a vehicle, which has an automatic driving function, and configured to control presentation of information for a driver of the vehicle, the presentation control device comprising:
- a traffic congestion determination unit configured to determine whether a traffic congestion occurs in an automatic travel period in which the vehicle travels by the automatic driving function and in which a specific action, which is preset and other than driving, is allowed to the driver;
- a cut-in determination unit configured to detect cut-in of an adjacent vehicle which is adjacent to a subject vehicle as the vehicle, on determination by the traffic congestion determination unit that a traffic congestion occurs; and
- a provision restricting unit configured to, on detection of cut-in of the adjacent vehicle by the cut-in determination unit,
  - provide an alert to the driver without reducing a level of an automatic driving and
  - restrict display of content related to the specific action.

13. The presentation control device according to claim 12, wherein
the provision restricting unit is configured to
   provide the alert to the driver by display of an alert image overlapped with the content and
   continue display of the content overlapped with the alert image.

14. A non-transitory computer readable storage medium storing instructions to be executed by at least one processor to control presentation of information for a driver of a vehicle having an automatic driving function, the instructions configured to, when executed by the at least one processor, cause the at least one processer to implement:
- determining whether a traffic congestion occurs in an automatic travel period in which the vehicle travels by the automatic driving function;
- on determination that a traffic congestion occurs, determining whether an adjacent vehicle which is adjacent to a subject vehicle as the vehicle is cutting in;
- detecting a sign of cut-in of the adjacent vehicle;
- on detection of the sign of cut-in of the adjacent vehicle, restricting display of content provided in the automatic travel period; and
- on determination that the adjacent vehicle is cutting in, restricting display of the content more as compared to a case where the sign of cut-in of the adjacent vehicle is detected.

15. A non-transitory computer readable storage medium storing instructions to be executed by at least one processor to control presentation of information for a driver of a vehicle having an automatic driving function, the instructions configured to, when executed by the at least one processor, cause the at least one processer to implement:
- determining whether a traffic congestion of a specific pattern occurs, the specific pattern being set as a pattern in which cut-in of an adjacent vehicle adjacent to a subject vehicle as the vehicle tends to occur in an automatic travel period in which the vehicle travels by the automatic driving function; and
- on determination that a traffic congestion of the specific pattern occurs, strengthening restriction on display of content provided in the automatic travel period.

16. A non-transitory computer readable storage medium storing instructions to be executed by at least one processor to control presentation of information for a driver of a vehicle having an automatic driving function, the instructions configured to, when executed by the at least one processor, cause the at least one processer to implement:
- determining whether a traffic congestion of a specific pattern occurs, the specific pattern being set as a pattern in which cut-in of an adjacent vehicle adjacent to a subject vehicle as the vehicle tends to occur in an automatic travel period in which the vehicle travels by the automatic driving function; and
- on determination that a traffic congestion of a non-specific pattern other than the specific pattern occurs, setting an allowable range of a specific action other than driving allowed to the driver in the automatic travel period to be wider as compared with a case where a traffic congestion of the specific pattern occurs.

17. A non-transitory computer readable storage medium storing instructions to be executed by at least one processor to control presentation of information for a driver of a vehicle having an automatic driving function, the instructions configured to, when executed by the at least one processor, cause the at least one processer to implement:
- determining whether a traffic congestion occurs in an automatic travel period in which the vehicle travels by the automatic driving function and in which a specific action, which is preset and other than driving, is allowed to the driver;
- on determination that a traffic congestion occurs, detecting cut-in of an adjacent vehicle which is adjacent to a subject vehicle as the vehicle; and
- on detection of cut-in of the adjacent vehicle, providing an alert to the driver without reducing a level of the automatic driving and restricting display of content related to the specific action and provided in the automatic travel period.

* * * * *